(12) United States Patent
Rozbicki et al.

(10) Patent No.: US 11,342,791 B2
(45) Date of Patent: May 24, 2022

(54) WIRELESSLY POWERED AND POWERING ELECTROCHROMIC WINDOWS

(71) Applicant: View, Inc., Milpitas, CA (US)

(72) Inventors: Robert T. Rozbicki, Los Gatos, CA (US); Dhairya Shrivastava, Los Altos, CA (US); Erich R. Klawuhn, Los Altos, CA (US); Stephen Clark Brown, San Mateo, CA (US); Yuyang Ying, San Jose, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 16/334,716

(22) PCT Filed: Sep. 21, 2017

(86) PCT No.: PCT/US2017/052798
§ 371 (c)(1),
(2) Date: Mar. 19, 2019

(87) PCT Pub. No.: WO2018/063919
PCT Pub. Date: Apr. 5, 2018

(65) Prior Publication Data
US 2019/0267840 A1  Aug. 29, 2019

Related U.S. Application Data

(63) Continuation-in-part of application No. PCT/US2017/031106, filed on May 4, 2017, and a
(Continued)

(51) Int. Cl.
*H02J 50/10* (2016.01)
*H02J 50/30* (2016.01)
(Continued)

(52) U.S. Cl.
CPC ............... *H02J 50/10* (2016.02); *E06B 9/24* (2013.01); *G02F 1/153* (2013.01); *G02F 1/163* (2013.01);
(Continued)

(58) Field of Classification Search
CPC .......... G02F 1/163; G02F 1/153; H02J 50/12; H02J 50/50; H02J 5/005; H02J 7/0042;
(Continued)

(56) References Cited

U.S. PATENT DOCUMENTS

| 4,864,314 A | 9/1989 | Bond |
| 4,874,903 A | 10/1989 | Clarke et al. |

(Continued)

FOREIGN PATENT DOCUMENTS

| CN | 1267416 A | 9/2000 |
| CN | 1267416 A | 9/2000 |

(Continued)

OTHER PUBLICATIONS

U.S. Appl. No. 62/102,516, filed Jan. 12, 2015, Nagel et al.
(Continued)

*Primary Examiner* — Jared Fureman
*Assistant Examiner* — Duc M Pham
(74) *Attorney, Agent, or Firm* — Weaver Austin Villeneuve & Sampson LLP; Brian D. Griedel

(57) ABSTRACT

Electrochromic windows powered by wireless power transmission and powering other devices by wireless power transmission are described along with wireless power transmission networks that incorporate these electrochromic windows.

27 Claims, 27 Drawing Sheets

Related U.S. Application Data continuation-in-part of application No. 14/962,975, filed on Dec. 8, 2015, now Pat. No. 10,320,231, which is a continuation of application No. 14/735,016, filed on Jun. 9, 2015, now Pat. No. 9,664,976, which is a continuation of application No. 12/971,576, filed on Dec. 17, 2010, now Pat. No. 9,081,246.

(60) Provisional application No. 62/510,653, filed on May 24, 2017, provisional application No. 62/510,671, filed on May 24, 2017, provisional application No. 62/501,554, filed on May 4, 2017, provisional application No. 62/402,957, filed on Sep. 30, 2016, provisional application No. 62/379,163, filed on Aug. 24, 2016, provisional application No. 62/352,508, filed on Jun. 20, 2016, provisional application No. 62/340,936, filed on May 24, 2016, provisional application No. 62/333,103, filed on May 6, 2016, provisional application No. 61/289,319, filed on Dec. 22, 2009.

(51) Int. Cl.
| | | |
|---|---|---|
| *H02J 50/50* | (2016.01) | |
| *H02J 50/12* | (2016.01) | |
| *H02J 50/20* | (2016.01) | |
| *H02J 5/00* | (2016.01) | |
| *H02J 7/02* | (2016.01) | |
| *E06B 9/24* | (2006.01) | |
| *G02F 1/163* | (2006.01) | |
| *G02F 1/153* | (2006.01) | |
| *H02J 50/90* | (2016.01) | |
| *H02J 7/00* | (2006.01) | |

(52) U.S. Cl.
CPC ............ *H02J 5/005* (2013.01); *H02J 7/0042* (2013.01); *H02J 7/025* (2013.01); *H02J 50/12* (2016.02); *H02J 50/20* (2016.02); *H02J 50/30* (2016.02); *H02J 50/50* (2016.02); *H02J 50/90* (2016.02); *E06B 2009/2464* (2013.01)

(58) Field of Classification Search
CPC .. H02J 7/025; H02J 50/30; E06B 9/24; E06B 2009/2464
See application file for complete search history.

(56) References Cited

U.S. PATENT DOCUMENTS

| | | | |
|---|---|---|---|
| 4,932,755 A | 6/1990 | Holdridge et al. | |
| 5,139,850 A | 8/1992 | Clarke et al. | |
| 5,147,694 A | 9/1992 | Clarke | |
| 5,384,653 A | 1/1995 | Benson et al. | |
| 5,959,586 A | 9/1999 | Benham et al. | |
| 6,055,089 A | 4/2000 | Schulz et al. | |
| 6,104,513 A | 8/2000 | Bloom | |
| 6,128,471 A | 10/2000 | Quelch et al. | |
| 6,266,023 B1 | 7/2001 | Nagy et al. | |
| 6,407,847 B1 | 6/2002 | Poll et al. | |
| 6,456,239 B1 | 9/2002 | Werb et al. | |
| 6,703,981 B2 | 3/2004 | Meitzler et al. | |
| 6,795,226 B2 | 9/2004 | Agrawal et al. | |
| 6,809,692 B2 | 10/2004 | Baliarda et al. | |
| 6,897,936 B1 | 5/2005 | Li et al. | |
| 7,133,181 B2 | 11/2006 | Greer et al. | |
| 7,382,636 B2 | 6/2008 | Baarman et al. | |
| 7,722,948 B2 | 5/2010 | Dixon et al. | |
| 7,994,880 B2 | 8/2011 | Chen et al. | |
| 8,149,756 B2 | 4/2012 | Hottinen | |
| 8,213,074 B1 | 7/2012 | Shrivastava et al. | |
| 8,614,848 B2 | 12/2013 | Ueda et al. | |
| 8,634,764 B2 | 1/2014 | Cruz et al. | |
| 8,780,432 B1 | 7/2014 | Nguyen | |
| 8,924,076 B2 | 12/2014 | Boote et al. | |
| 8,927,069 B1 | 1/2015 | Estinto et al. | |
| 8,975,789 B2 | 3/2015 | Snyker et al. | |
| 8,976,440 B2 | 3/2015 | Berland et al. | |
| 9,081,246 B2 | 7/2015 | Rozbicki | |
| 9,128,346 B2 | 9/2015 | Shrivastava et al. | |
| 9,170,008 B2 | 10/2015 | Reul et al. | |
| 9,300,581 B1 | 3/2016 | Hui et al. | |
| 9,436,055 B2 | 9/2016 | Shrivastava et al. | |
| 9,442,341 B2 | 9/2016 | Shrivastava et al. | |
| 9,454,055 B2 | 9/2016 | Brown et al. | |
| 9,664,976 B2 | 5/2017 | Rozbicki | |
| 9,898,912 B1 | 2/2018 | Jordan, II et al. | |
| 9,946,138 B2 | 4/2018 | Shrivastava et al. | |
| 10,153,845 B2 | 12/2018 | Ashrafi | |
| 10,254,618 B2 | 4/2019 | Parker | |
| 10,299,101 B1 | 5/2019 | Lim et al. | |
| 10,303,035 B2 | 5/2019 | Brown et al. | |
| 10,320,231 B2 | 6/2019 | Rozbicki | |
| 10,673,121 B2 | 6/2020 | Hughes et al. | |
| 10,797,373 B2 | 10/2020 | Hughes et al. | |
| 11,054,711 B2 | 7/2021 | Shrivastava et al. | |
| 2002/0109634 A1 | 8/2002 | Aisenbrey | |
| 2002/0140611 A1 | 10/2002 | Ligander et al. | |
| 2003/0034926 A1 | 2/2003 | Veerasamy | |
| 2003/0098791 A1 | 5/2003 | Carlson et al. | |
| 2003/0227663 A1 | 12/2003 | Agrawal et al. | |
| 2003/0232181 A1 | 12/2003 | Simpson et al. | |
| 2004/0148057 A1 | 7/2004 | Breed et al. | |
| 2004/0160324 A1 | 8/2004 | Stilp | |
| 2004/0160657 A1 | 8/2004 | Tonar et al. | |
| 2004/0196179 A1 | 10/2004 | Turnbull | |
| 2005/0082639 A1 | 4/2005 | Kikuta et al. | |
| 2005/0117193 A1 | 6/2005 | Poll et al. | |
| 2005/0157675 A1 | 7/2005 | Feder et al. | |
| 2005/0254442 A1 | 11/2005 | Proctor et al. | |
| 2005/0260983 A1 | 11/2005 | DiPiazza | |
| 2006/0001683 A1 | 1/2006 | May et al. | |
| 2006/0018000 A1 | 1/2006 | Greer | |
| 2006/0033663 A1 | 2/2006 | Saint Clair et al. | |
| 2006/0107616 A1 | 5/2006 | Ratti et al. | |
| 2006/0270440 A1 | 11/2006 | Shearer et al. | |
| 2007/0042819 A1 | 2/2007 | Li et al. | |
| 2007/0053053 A1 | 3/2007 | Moskowitz | |
| 2007/0126637 A1 | 6/2007 | Habib et al. | |
| 2007/0191074 A1 | 8/2007 | Harrist et al. | |
| 2007/0222542 A1 | 9/2007 | Joannopoulos et al. | |
| 2007/0285759 A1 | 12/2007 | Ash et al. | |
| 2007/0292606 A1 | 12/2007 | Demiryont | |
| 2008/0018979 A1 | 1/2008 | Mahe et al. | |
| 2008/0042012 A1 | 2/2008 | Callahan et al. | |
| 2008/0122297 A1 | 5/2008 | Arai | |
| 2008/0166965 A1 | 7/2008 | Greene et al. | |
| 2008/0177919 A1 | 7/2008 | Miyazawa | |
| 2008/0185918 A1 | 8/2008 | Metz et al. | |
| 2008/0238706 A1 | 10/2008 | Kenwright | |
| 2008/0239451 A1 | 10/2008 | Mitchell et al. | |
| 2008/0278264 A1 | 11/2008 | Karalis et al. | |
| 2009/0047900 A1 | 2/2009 | Cruz et al. | |
| 2009/0054054 A1 | 2/2009 | Shao et al. | |
| 2009/0122430 A1 | 5/2009 | DeWard et al. | |
| 2009/0139052 A1 | 6/2009 | Boenisch | |
| 2009/0153273 A1 | 6/2009 | Chen et al. | |
| 2009/0189458 A1 | 7/2009 | Kawasaki | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0224980 A1 | 9/2009 | Cruz et al. | |
| 2010/0039410 A1 | 2/2010 | Becker et al. | |
| 2010/0039690 A1 | 2/2010 | Agrawal et al. | |
| 2010/0052718 A1 | 3/2010 | Baker et al. | |
| 2010/0156430 A1 | 6/2010 | Quaini et al. | |
| 2010/0165436 A1 | 7/2010 | Voss et al. | |
| 2010/0171667 A1 | 7/2010 | Knudsen | |
| 2010/0188057 A1 | 7/2010 | Tarng | |
| 2010/0243427 A1 | 9/2010 | Kozlowski et al. | |
| 2010/0245973 A1 | 9/2010 | Wang et al. | |
| 2010/0302624 A1 | 12/2010 | Moskowitz | |

(56) References Cited

U.S. PATENT DOCUMENTS

| | | |
|---|---|---|
| 2010/0315693 A1 | 12/2010 | Lam et al. |
| 2011/0031821 A1 | 2/2011 | Greene et al. |
| 2011/0050756 A1 | 3/2011 | Cassidy et al. |
| 2011/0051221 A1 | 3/2011 | Veerasamy |
| 2011/0074342 A1* | 3/2011 | MacLaughlin ......... H02J 50/12 |
| | | 320/108 |
| 2011/0080630 A1 | 4/2011 | Valentin et al. |
| 2011/0148218 A1 | 6/2011 | Rozbicki |
| 2011/0159821 A1 | 6/2011 | Park |
| 2011/0170170 A1 | 7/2011 | Boote |
| 2011/0248901 A1 | 10/2011 | Alexopoulos et al. |
| 2011/0260856 A1 | 10/2011 | Rossmann et al. |
| 2011/0266137 A1 | 11/2011 | Wang et al. |
| 2011/0266138 A1 | 11/2011 | Wang et al. |
| 2011/0267674 A1 | 11/2011 | Wang et al. |
| 2011/0267675 A1 | 11/2011 | Wang et al. |
| 2011/0304898 A1 | 12/2011 | Letocart |
| 2012/0133213 A1 | 5/2012 | Borke et al. |
| 2012/0133315 A1 | 5/2012 | Berman et al. |
| 2012/0140492 A1 | 6/2012 | Alvarez |
| 2012/0154241 A1 | 6/2012 | Tatarnikov et al. |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0217346 A1 | 8/2012 | Eberle et al. |
| 2012/0275008 A1 | 11/2012 | Pradhan et al. |
| 2012/0287017 A1 | 11/2012 | Parsche |
| 2012/0293855 A1 | 11/2012 | Shrivastava |
| 2012/0328849 A1 | 12/2012 | Neill et al. |
| 2013/0157493 A1 | 6/2013 | Brown |
| 2013/0194141 A1 | 8/2013 | Okajima et al. |
| 2013/0241299 A1 | 9/2013 | Snyker et al. |
| 2013/0243120 A1 | 9/2013 | Tsai et al. |
| 2013/0271812 A1 | 10/2013 | Brown et al. |
| 2013/0271814 A1 | 10/2013 | Brown et al. |
| 2013/0278989 A1 | 10/2013 | Lam et al. |
| 2014/0008992 A1 | 1/2014 | Leabman |
| 2014/0149416 A1 | 5/2014 | Wallace |
| 2014/0170863 A1 | 6/2014 | Brown |
| 2014/0182125 A1 | 7/2014 | Rozbicki et al. |
| 2014/0240474 A1 | 8/2014 | Kondo |
| 2014/0300945 A1 | 10/2014 | Parker |
| 2014/0333485 A1 | 11/2014 | Stone et al. |
| 2015/0155737 A1 | 6/2015 | Mayo |
| 2015/0222126 A1 | 8/2015 | Leabman et al. |
| 2015/0270724 A1 | 9/2015 | Rozbicki |
| 2015/0323287 A1 | 11/2015 | Durand |
| 2015/0378230 A1 | 12/2015 | Gudmunson et al. |
| 2015/0378231 A1 | 12/2015 | Greer et al. |
| 2016/0020647 A1 | 1/2016 | Leabman et al. |
| 2016/0028162 A1 | 1/2016 | Ou et al. |
| 2016/0070151 A1 | 3/2016 | Shrivastava et al. |
| 2016/0091769 A1 | 3/2016 | Rozbicki |
| 2016/0124283 A1 | 5/2016 | Brown et al. |
| 2016/0149635 A1 | 5/2016 | Hinman et al. |
| 2016/0154290 A1* | 6/2016 | Brown .................. E06B 3/6722 |
| | | 359/275 |
| 2016/0181873 A1 | 6/2016 | Mitcheson et al. |
| 2016/0183056 A1 | 6/2016 | Leabman |
| 2016/0248270 A1 | 8/2016 | Zeine et al. |
| 2017/0052753 A1 | 2/2017 | Paolini, Jr |
| 2017/0104374 A1* | 4/2017 | Zeine ..................... H02J 50/40 |
| 2017/0117754 A1 | 4/2017 | Noori et al. |
| 2017/0269451 A1 | 9/2017 | Shrivastava et al. |
| 2017/0272145 A1 | 9/2017 | Lilja |
| 2017/0288468 A1 | 10/2017 | Pearson |
| 2017/0365908 A1 | 12/2017 | Hughes et al. |
| 2018/0090992 A1 | 3/2018 | Shrivastava et al. |
| 2018/0138576 A1 | 5/2018 | Cohen |
| 2018/0301783 A1 | 10/2018 | Bulja et al. |
| 2019/0036209 A1 | 1/2019 | Au |
| 2019/0044606 A1 | 2/2019 | Mansikkamaki |
| 2019/0067826 A1 | 2/2019 | Achour et al. |
| 2019/0115786 A1 | 4/2019 | Rozbicki |
| 2019/0219881 A1 | 7/2019 | Shrivastava et al. |
| 2019/0294018 A1 | 9/2019 | Shrivastava et al. |
| 2019/0319335 A1 | 10/2019 | Hughes et al. |
| 2019/0324341 A1 | 10/2019 | Tonar et al. |
| 2020/0259237 A1 | 8/2020 | Shrivastava et al. |
| 2020/0321682 A1 | 10/2020 | Hughes et al. |
| 2021/0040789 A1 | 2/2021 | Rozbicki et al. |
| 2021/0119318 A1 | 4/2021 | Hughes et al. |
| 2022/0019117 A1 | 1/2022 | Shrivastava et al. |
| 2022/0021099 A1 | 1/2022 | Shrivastava et al. |

FOREIGN PATENT DOCUMENTS

| | | |
|---|---|---|
| CN | 101032052 A | 9/2007 |
| CN | 101032052 A | 9/2007 |
| CN | 101401312 A | 4/2009 |
| CN | 101401312 A | 4/2009 |
| CN | 101868346 A | 10/2010 |
| CN | 101868346 A | 10/2010 |
| CN | 102255119 A | 11/2011 |
| CN | 102255119 A | 11/2011 |
| CN | 203019761 U | 6/2013 |
| CN | 103547965 A | 1/2014 |
| CN | 103649826 A | 3/2014 |
| CN | 103987909 A | 8/2014 |
| CN | 104102060 A | 10/2014 |
| CN | 104102060 A | 10/2014 |
| CN | 104321497 A | 1/2015 |
| CN | 104321497 A | 1/2015 |
| CN | 104884248 A | 9/2015 |
| CN | 104884248 A | 9/2015 |
| CN | 104730795 B | 5/2018 |
| EP | 0413580 A1 | 2/1991 |
| EP | 0413580 A1 | 2/1991 |
| EP | 08588514 A1 | 3/1994 |
| EP | 0917667 A1 | 5/1999 |
| EP | 1297380 | 11/2008 |
| EP | 1297380 B1 | 11/2008 |
| EP | 1995845 A2 | 11/2008 |
| EP | 2357544 | 8/2011 |
| EP | 2648086 A2 | 10/2013 |
| EP | 2733998 A1 | 5/2014 |
| EP | 2764998 A1 | 8/2014 |
| EP | 2851993 A1 | 3/2015 |
| JP | S58-091727 U1 | 6/1983 |
| JP | S58-187097 | 6/1983 |
| JP | S63-271320 A | 11/1988 |
| JP | S6478237 A | 3/1989 |
| JP | H05147983 A | 6/1993 |
| JP | 2005-303348 A | 9/1998 |
| JP | H10233612 A | 9/1998 |
| JP | 2004-12818 | 1/2004 |
| JP | 2004-171008 | 6/2004 |
| JP | 2005303348 A | 10/2005 |
| JP | H10-233612 A | 10/2005 |
| JP | 2006252886 A | 9/2006 |
| JP | 2007-066143 | 3/2007 |
| JP | 2007/169960 A | 7/2007 |
| JP | 2007-252090 | 9/2007 |
| JP | 2008-502949 A | 1/2008 |
| JP | 2008-500842 | 3/2008 |
| JP | 2008-518397 | 5/2008 |
| JP | 2008/148520 A | 6/2008 |
| JP | 2008-154446 | 7/2008 |
| JP | 2008-543255 | 11/2008 |
| JP | 2008-544730 A | 12/2008 |
| JP | 2009-508387 | 2/2009 |
| JP | 2013-515457 A | 5/2013 |
| JP | 2013515457 A | 5/2013 |
| JP | 2014-204550 A | 10/2014 |
| KR | 10-2005-0089380 | 9/2005 |
| KR | 20110128213 A | 11/2011 |
| TW | 201344874 A | 11/2013 |
| TW | 201344874 A | 11/2013 |
| TW | 201423773 A | 6/2014 |
| TW | 201423773 A | 6/2014 |
| TW | M519749 U | 4/2016 |
| TW | I607269 B | 12/2017 |
| WO | WO98/008137 | 2/1998 |
| WO | WO01/82410 A1 | 11/2001 |

(56) References Cited

FOREIGN PATENT DOCUMENTS

| WO | WO2006/133204 | 12/2006 |
|---|---|---|
| WO | WO07/146862 | 12/2007 |
| WO | WO2008/058881 | 5/2008 |
| WO | WO2008/073372 A2 | 6/2008 |
| WO | WO2010/014648 A1 | 2/2010 |
| WO | WO-2010079388 A1 | 7/2010 |
| WO | WO2011/082208 A2 | 7/2011 |
| WO | WO-2011082208 A2 | 7/2011 |
| WO | WO2012/079159 | 6/2012 |
| WO | WO2013/121103 A1 | 8/2013 |
| WO | WO2013/155467 A1 | 10/2013 |
| WO | WO2013/158365 A1 | 10/2013 |
| WO | WO2013/158464 A1 | 10/2013 |
| WO | WO-2013155467 A1 | 10/2013 |
| WO | WO-2013158365 A1 | 10/2013 |
| WO | WO-2013158464 A1 | 10/2013 |
| WO | WO2014/082092 | 5/2014 |
| WO | WO2014/121809 | 8/2014 |
| WO | WO2015/013578 A1 | 1/2015 |
| WO | WO2015/051262 A1 | 4/2015 |
| WO | WO2015/075007 A1 | 5/2015 |
| WO | WO2015/077829 A1 | 6/2015 |
| WO | WO2016/072620 A1 | 5/2016 |
| WO | WO-2016072620 A1 | 5/2016 |
| WO | WO2016/085964 | 6/2016 |
| WO | WO2016/174228 A1 | 11/2016 |
| WO | WO2017/062915 A1 | 4/2017 |
| WO | WO2017/129855 | 8/2017 |
| WO | WO2017/192881 | 11/2017 |
| WO | WO2017/192881 A1 | 11/2017 |
| WO | WO2018/039080 A1 | 3/2018 |
| WO | WO2018/063919 | 4/2018 |
| WO | WO2018/094203 A1 | 5/2018 |
| WO | WO-2018200702 A1 | 11/2018 |
| WO | WO2019/022129 A1 | 9/2019 |
| WO | WO2020/227702 A2 | 11/2020 |
| WO | WO2020/227702 A3 | 11/2020 |
| WO | WO-2020227702 A2 | 11/2020 |
| WO | WO2020/243690 A1 | 12/2020 |
| WO | WO-2020243690 A1 | 12/2020 |
| WO | WO-2020227702 A3 | 1/2021 |

OTHER PUBLICATIONS

U.S. Appl. No. 62/102,515, filed Jan. 12, 2015, Nagar et al.
Preliminary Amendment filed Jun. 8, 2017 for U.S. Appl. No. 15/616,843.
Preliminary Amendment filed Feb. 20, 2019 for U.S. Appl. No. 16/212,258.
U.S. Office Action dated Feb. 19, 2013 for U.S. Appl. No. 12/971,576.
U.S. Final Office Action dated Aug. 15, 2013 for U.S. Appl. No. 12/971,576.
U.S. Office Action dated May 12, 2014 for U.S. Appl. No. 12/971,576.
U.S. Final Office Action dated Oct. 9, 2014 for U.S. Appl. No. 12/971,576.
U.S. Notice of Allowance dated Mar. 11, 2015 for U.S. Appl. No. 12/971,576.
U.S. Office Action dated Jul. 28, 2016 for U.S. Appl. No. 14/735,016.
U.S. Notice of Allowance dated Sep. 20, 2016 for U.S. Appl. No. 14/735,016.
U.S. Notice of Allowance dated Dec. 27, 2016 for U.S. Appl. No. 14/735,016.
U.S. Notice of Allowance dated Apr. 4, 2017 for U.S. Appl. No. 14/735,016.
U.S. Office Action dated Jan. 17, 2018 for U.S. Appl. No. 14/962,975.
U.S. Notice of Allowance dated Oct. 4, 2018 for U.S. Appl. No. 14/962,975.
U.S. Supplemental Notice of Allowance dated Jan. 7, 2019 for U.S. Appl. No. 14/962,975.
U.S. Notice of Allowance dated Feb. 4, 2019 for U.S. Appl. No. 14/962,975.
U.S. Office Action dated Sep. 23, 2013 for U.S. Appl. No. 13/479,137.
U.S. Final Office Action dated Jan. 27, 2014 in U.S. Appl. No. 13/479,137.
U.S. Office Action dated Jul. 3, 2014 in U.S. Appl. No. 13/479,137.
U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Dec. 31, 2015 in U.S. Appl. No. 14/855,284.
U.S. Notice of Allowance dated Jul. 21, 2016 in U.S. Appl. No. 14/855,284.
U.S. Office Action dated Sep. 11, 2017 in U.S. Appl. No. 14/951,410.
U.S. Final Office Action dated Mar. 15, 2018 in U.S. Appl. No. 14/951,410.
U.S. Notice of Allowance dated Oct. 22, 2018 in U.S. Appl. No. 14/951,410.
U.S. Office Action dated Aug. 25, 2017 in U.S. Appl. No. 15/616,843.
U.S. Notice of Allowance dated Dec. 14, 2017 in U.S. Appl. No. 15/616,843.
European Search Report dated Sep. 28, 2012 for EP application No. 10843504.1.
European Office Action dated Jun. 6, 2017 for EP application No. 10843504.1.
European Extended Search Report dated Dec. 7, 2018 for EP Application No. 18189681.2.
Japanese Office Action dated Sep. 2, 2014 for JP Application No. 2012-546090.
Japanese Office Action dated Oct. 25, 2016 for JP Application No. 2015-172962.
Japanese Office Action dated Sep. 5, 2017 for JP Application No. 2015-172962.
Japanese Decision of Refusal dated Apr. 3, 2018 for JP Application No. 2015-172962.
International Preliminary Report on Patentability, dated Jul. 5, 2012, in PCT/US2010/061091.
International Search Report and Written Opinion, dated Sep. 14, 2011, issued in PCT/US2010/061091.
Chinese Office Action dated Aug. 28, 2018 in CN Application No. 201580070776.3.
EP Extended Search Report dated Nov. 8, 2018 in EP Application No. 15863112.7.
International Preliminary Report on Patentability dated Jun. 8, 2017 in PCT/US2015/062480.
International Search Report and Written Opinion dated Feb. 15, 2016 in PCT/US2015/062480.
International Search Report and Written Opinion dated Feb. 6, 2018 in PCT/US2017/052798.
International Preliminary Report on Patentability dated Apr. 11, 2019 in PCT/US2017/052798.
CN Office Action dated Mar. 19, 2019 in CN Application No. 201580070776.3.
Taiwanese Office Action dated May 13, 2019 in TW Application No. 104139217.
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"Sage Product Highlights" screenshot, accessed Aug. 28, 2015, 1 page.
"SageGlass Unplugged" screenshot, accessed Aug. 28, 2015, 1 page.
"Power Unplugged" Energous Corp. Product Overview, 2016, 4 pages, <http://www.energous.com/product-overview/>.
"RF Energy Harvesting and Wireless Power for Low-Power Applications", Powercast Corp., 2012 <http://www.powercastco.com/PDF/powercast-overview%20(2012).pdf>.
International Search Report and Written Opinion (ISA/KR) dated Mar. 8, 2016 in PCT Application No. PCT/US2015/062387.
International Preliminary Report on Patentability dated Jun. 8, 2017 in PCT Application No. PCT/US2015/062387.

(56) References Cited

OTHER PUBLICATIONS

International Search Report and Written Opinion (ISA/KR) dated Aug. 22, 2017 in PCT Application No. PCT/US2017/031106.
International Preliminary Report on Patentability dated Nov. 15, 2018 in PCT Application No. PCT/US2017/031106.
International Search Report and Written Opinion (ISA/KR) dated Feb. 6, 2018 in PCT/US2017/052798.
International Search Report and Written Opinion (ISA/KR) dated Dec. 13, 2017 in PCT/US2017/047664.
EP Partial Supplementary Search Report dated May 23, 2018 in EP Application No. 15863433.7.
EP Extended Search Report dated Sep. 6, 2018 in EP Application No. 15863433.7.
Saberin, J. R., "Optically Transparent Antennas for Small Satellites," University of Utah, Dept. of Electrical and Computer Engineering, Masters Thesis, Aug. 2010, 55 pp.
Pasternack Enterprises, Inc. Technical Data Sheet for MCX Jack Connector Solder Attachment Surface Mount PCB (PE4889), 2013, 2 pp.
Rolith Inc., "NanoWeb: sub-micron transparent metal mesh conductors," [http://www.rolith.com/applications/transparent-conductive-electrodes] retrieved Jan. 29, 2016, 3 pp.
Yasin, T. et al., "A Study on the Efficiency of Transparent Patch Antennas Designed from Conductive Oxide Films," IEEE International Symposium on Antennas and Propagation (APSURSI), Spokane, WA, Jul. 3-8, 2011, pp. 3085-.087.
Azini, A.S. et al., "Transparent Antenna Design for Wireless Access Point Application," PIERS Proceedings, Taipei, Mar. 25-28, 2013, pp. 910-913.
Yasin, T., "Transparent Antennas for Solar Cell Integration," Utah State University, Dept. of Electrical Engineering, Doctoral Thesis, 2013, 98 pp.
WeBoost Connect 3G Cell Phone Booster 472205 [https://store.weboost.com/products/connect-3g-directional] retrieved Apr. 1, 2016, 12 pp.
SunPartner Technologies web page, "Smart Building-Design Glass", [http://sunpartnertechnologies.com/vitrage-intelligent/]; 3 pages; retrieved Jan. 24, 2018.
SunPartner Technologies web page, "Smart Building-Cameleon", [http://sunpartnertechnologies.com/vitrage-intelligent/]; 3 pages; retrieved Jan. 24, 2018.
SunPartner Technologies web page, "Smart Building-Vision Glass", [http://sunpartnertechnologies.com/vitrage-intelligent/]; 3 pages; retrieved Jan. 24, 2018.
SunPartner Technologies web page, "Li-Fi", [http://sunpartnertechnologies.com/li-fi/]; 3 pages; retrieved Jan. 24, 2018.
SunPartner Technologies White Paper, "Wysips Connect, the first solution for the indoor/outdoor VLC lighting saturation problematics," Feb. 26, 2015, 6 pages, [http://sunpartnertechnologies.com/wp-content/uploads/2012/08/White_Paper_LiFi_26_02_2015.pdf].
"That's right, 5G could depend on Coming glass in your antenna," by Robert Triggs, Android Authority, Mar. 2, 2018, 5 pp.. [https://www.androidauthority.com/coming-glass-5g-antenna-842341/] downloaded Nov. 13, 2018.
U.S. Appl. No. 16/253,971, filed Jan. 22, 2019 Brown et al.
U.S. Appl. No. 15/529,677, filed May 25, 2017 Hughes, et al.
Preliminary Amendment dated Jun. 8, 2017 in U.S. Appl. No. 15/529,677.
U.S. Office Action dated May 1, 2020 for U.S. Appl. No. 16/212,258.
U.S. Office Action dated Jan. 29, 2021 for U.S. Appl. No. 16/212,258.
European Office Action dated Nov. 29, 2019 for EP Application No. 18189681.2.
European Summons dated Oct. 29, 2020 for EP Application No. 18189681.2.
Japanese Decision of Refusal dated Jun. 11, 2019 for JP Application No. 2018-145159.
EP Extended Search Report dated Mar. 31, 2020 in EP Application No. 17857230.1.
Taiwanese Office Action dated Dec. 31, 2020 in TW Application No. 106133563.
International Preliminary Report on Patentability dated Sep. 24, 2020 in PCT/US2019/022129.
International Search Report and Written Opinion (ISA/EP) dated May 9, 2019 in PCT/US2019/022129.
Australian Office Action dated Mar. 2, 2020 in AU Application No. 2015353569.
CN Office Action dated Oct. 9, 2019 in CN Application No. 201580070776.3.
European Office Action dated Feb. 25, 2021 in EP Application No. 15863112.7.
Indian Office Action dated Feb. 24, 2021 in IN Application No. 201737021981.
U.S. Appl. No. 63/080,899, filed Sep. 21, 2020, Makker et atl.
U.S. Appl. No. 16/949,978, filed Nov. 23, 2020 Hughes, et al.
U.S. Appl. No. 63/146,365, filed Feb. 5, 2021, Brown et al.
U.S. Appl. No. 63/171,871, filed Apr. 7, 2021, Gomez-Martinez et al.
U.S. Appl. No. 16/980,305, filed Sep. 11, 2020, Rozbicki et al.
U.S. Appl. No. 63/154,352, filed Feb. 26, 2021, Martinson et al.
U.S. Appl. No. 63/170,245, filed Apr. 2, 2021, Martinson et al.
U.S.Notice of Allowance dated Apr. 19, 2021 in U.S. Appl. No. Apr. 19, 2021.
CN Office Action dated Apr. 6, 2021 in CN Application No. 201911227990.1.
CN Office Action dated Apr. 6, 2021 in CN Application No. 201780038353.2.
KR Office Action dated Apr. 16, 2021 in KR Application No. 10-2018-7035235.
PCT Application No. PCT/US2021/017946 filed Feb. 12, 2021.
AGC, Inc., "AGC completes development of 5G-compatible 'Glass Antenna that adds cellular base station capabilities to windows,'" Press Release, Jun. 3, 2020, 2 pp.
AU examination report dated Oct. 1, 2021, in application No. AU2020220165.
Australian Office Action dated Apr. 8, 2020 in AU Application No. 2015353606.
Australian Office Action dated Aug. 20, 2019 in AU Application No. 2015353606.
Australian Office Action dated Feb. 19, 2021 in AU Application No. 2017260101.
Australian Office Action dated Jun. 3, 2021 in AU Application No. AU 2020220165.
Australian Office Action dated Mar. 4, 2020 in AU Application No. 2015353606.
Australian Office Action dated May 10, 2019 in AU Application No. 2015353606.
Balzano Q., et al., "RF Energy In Cars From Window-mounted Antennas", 36th IEEE Vehicular Technology Conference, 2006, pp. 32-39.
CN Office Action dated Apr. 29, 2020 in CN Application No. 201780038353.2.
CN Office Action dated Aug. 2, 2021, in CN Application No. 201780038353.2.
CN Office Action dated Aug. 3, 2021, in CN Application No. 201780063202.2.
CN Office Action dated Aug. 6, 2019 in CN Application No. 201580070207.9.
CN Office Action dated Jul. 28, 2021 in CN Application No. 201780057293.9.
CN Office Action dated Jun. 29, 2021 in CN Application No. 202010466929.9.
CN Office Action dated Mar. 5, 2019 in CN Application No. 201580070207.9.
CN Office Action dated Nov. 6, 2020 in CN Application No. 201780038353.2.
CN Office Action dated Oct. 22, 2020 in CN Application No. 201911227990.1.
CN Office Action dated Sep. 15, 2021, in application No. CN201911227990.1.
EP Extended Search Report dated Dec. 4, 2019 in EP Application No. 17793364.5.
EP Extended Search Report dated Feb. 25, 2020 in EP Application No. 17844188.7.

(56) References Cited

OTHER PUBLICATIONS

EP Office Action dated Oct. 1, 2021, in application No. EP17857230.1.
European Office Action dated Jul. 8, 2020 in EP Application No. 15863433.7.
European Office Action dated May 7, 2021 in EP Application No. 15863433.7.
European Office Action dated Oct. 17, 2019 in EP Application No. 15863433.7.
Indian Office Action dated Mar. 24, 2021 in IN Application No. 201817042545.
Indian Office Action dated Sep. 25, 2020 in IN Application No. 201737018864.
International Preliminary Report on Patentability dated Mar. 7, 2019 in PCT/US2017/047664.
International Search Report and Written Opinion (ISA/EP) dated Dec. 7, 2020 in PCT Application No. PCT/US2020/032269.
International Search Report and Written Opinion (ISA/EP) dated Sep. 30, 2020 in PCT Application No. PCT/US2020/035485.
International Search Report and Written Opinion (ISA/KR) dated Aug. 5, 2021 in PCT Application No. PCT/US2021/027418.
Japanese Decision of Refusal dated Jul. 13, 2021 for JP Application No. 2020-109176.
JP Office Action dated Mar. 2, 2021 in JP Application No. 2018-557808.
Saad, A. "Printed millimeter-wave MIMO-based slot antenna arrays for 5G networks," AEU—International Journal of Electronics and Communications, vol. 99, Feb. 2019, pp. 59-69.
Taiwan Office Action dated Jan. 25, 2021 issued in TW Application No. 106128249.
Taiwanese First Office Action dated May 21, 2021 in TW 109134283.
Taiwanese Office Action dated Mar. 16, 2020 in TW Application No. 104139297.
Taiwanese Office Action dated Oct. 1, 2019 in TW Application No. 104139297.
TW Office Action dated May 31, 2021 in TW Application No. TW 106114947.
U.S. Corrected Notice of Allowability for U.S. Appl. No. 16/327,789 dated Mar. 1, 2021.
U.S. Final Office Action dated Feb. 6, 2020 in U.S. Appl. No. 16/451,784.
U.S. Non-Final Office Action dated Oct. 18, 2021, in U.S. Appl. No. 16/212,258.
U.S. Notice of Allowance dated Apr. 19, 2021 in U.S. Appl. No. 16/099,424.
U.S. Notice of Allowance dated May 25, 2021 in U.S. Appl. No. 15/709,339.
U.S. Notice of Allowance dated May 26, 2020 in U.S. Appl. No. 16/451,784.
U.S. Notice of Allowance dated Sep. 10, 2021, in the U.S. Appl. No. 15/709,339.
U.S. Notice of Allowance for U.S. Appl. No. 16/327,789 dated Feb. 4, 2021.
U.S. Office Action dated Jan. 16, 2020 in U.S. Appl. No. 15/529,677.
U.S. Office Action dated Jan. 21, 2021 in U.S. Appl. No. 15/709,339.
U.S. Office Action dated Jul. 25, 2019 in U.S. Appl. No. 15/529,677.
U.S. Office Action dated Sep. 23, 2019 in U.S. Appl. No. 16/451,784.
U.S. Office Action for U.S. Appl. No. 16/327,789 dated Sep. 28, 2020.
U.S. Appl. No. 16/949,978, inventors Hughes, et al., filed Nov. 23, 2020.
U.S. Appl. No. 17/307,848, inventors Shrivastava et al., filed May 4, 2021.
U.S. Appl. No. 17/406,301, inventors Shrivastava et al., filed Aug. 19, 2021.
U.S. Appl. No. 63/146,365, inventors Brown et al., filed Feb. 5, 2021.
U.S. Appl. No. 63/171,871, inventors Gomez-Martinez et al., filed Apr. 7, 2021.
U.S. Appl. No. 63/187,632, inventors Hur et al., filed May 12, 2021.
U.S. Appl. No. 63/226,127, inventors Lee et al., filed Jul. 21, 2021.
U.S. Pat. Appl. No. PCT/US2021/027418, inventors Makker et al., filed on Apr. 15, 2021.
U.S. Appl. No. 63/212,483, inventors Martinson et al., filed Jun. 18, 2021.
U.S. Appl. No. 63/080,899, inventor Makker et al., filed Sep. 21, 2020.
International Preliminary Report on Patentability dated Nov. 18, 2021, issued in PCT/US2020/032269.
Restriction requirement dated Oct. 18, 2021, for U.S. Appl. No. 16/849,540.
AU Office Action dated Jan. 11, 2022, in Application No. AU2021201145.
CA Office Action dated Dec. 22, 2021, in Application No. 2968665.
CN Office Action dated Dec. 29, 2021, in application No. 202010466929.9 with English translation.
Co-pending U.S. Appl. No. 17/597,701, filed Jan. 19, 2022.
EP Search report dated Feb. 16, 2022, in Application No. EP21209968.3.
IN Office Action dated Dec. 24, 2021, in Application No. IN202138004005.
TW Office Action dated Mar. 15, 2022, in Application No. TW109112242.
U.S. Non Final Office Action dated Jan. 31, 2022 in U.S. Appl. No. 16/849,540.
U.S Notice of Allowance dated Dec. 22, 2021, in U.S. Appl. No. 16/212,258.
U.S. Office Action dated Mar. 16, 2022, in Application No. 116/212,258.

\* cited by examiner

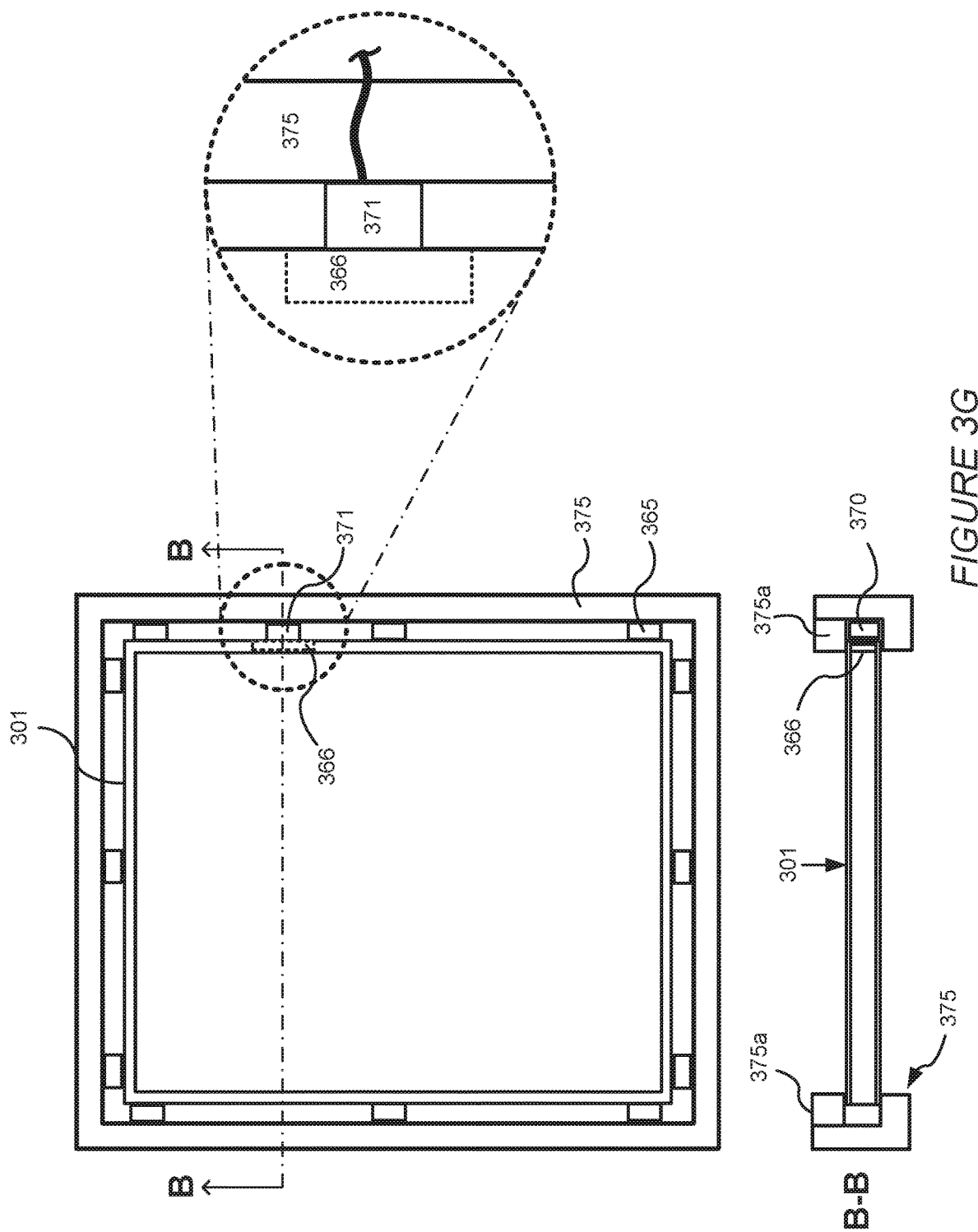

WIRELESSLY POWERED AND POWERING ELECTROCHROMIC WINDOWS

CROSS-REFERENCES TO RELATED APPLICATIONS

This is a national stage application under 35 U.S.C. §371 to International Application PCT/US17/52798 (designating the United States), filed on Sep. 21, 2017; International Application PCT/US17/52798 claims benefit of and priority to U.S. Provisional Application No. 62/510,671, titled "WIRELESSLY POWERED AND POWERING ELECTROCHROMIC WINDOWS" and filed on May 24, 2017, U.S. Provisional Application No. 62/402,957, filed on Sep. 30, 2016 and titled "WIRELESS POWERED ELECTROCHROMIC WINDOWS," and to U.S. Provisional Application No. 62/501,554, filed on May 4, 2017 and titled "WIRELESS POWERED AND POWERING ELECTROCHROMIC WINDOWS;" International Application PCT/US17/52798 is also a continuation-in-part of U.S. patent application Ser. No. 14/962,975, filed on Dec. 8, 2015 and titled "WIRELESS POWERED ELECTROCHROMIC WINDOWS," which is a continuation of U.S. patent application Ser. No. 14/735,016, filed on Jun. 9, 2015 (now U.S. Pat. No. 9,664,976) and titled "WIRELESS POWERED ELECTROCHROMIC WINDOWS," which is a continuation of U.S. patent application Ser. No. 12/971,576, filed on Dec. 17, 2010 (now U.S. Pat. No. 9,081,246) and titled "WIRELESS POWERED ELECTROCHROMIC WINDOWS;" U.S. patent application Ser. No. 12/971,576 claims benefit of and priority to U.S. Provisional Application No. 61/289,319, filed on Dec. 22, 2009 and titled "WIRELESS POWERED ELECTROCHROMIC WINDOWS;" International Application PCT/US17/52798 is also a continuation-in-part of International Application No. PCT/US17/31106 (designating the United States), titled "WINDOW ANTENNAS" and filed on May 4, 2017; International Application PCT/US17/31106 claims benefit of and priority to U.S. Provisional Application No. 62/333,103, filed on May 6, 2016 and titled "WINDOW ANTENNAS," to U.S. Provisional Application No. 62/340,936, filed on May 24, 2016 and titled "WINDOW ANTENNAS," to U.S. Provisional Application No. 62/352,508 filed on Jun. 20, 2016, and to U.S. Provisional Application No. 62/379,163 filed on Aug. 24, 2016 and titled "WINDOW ANTENNAS;" International Application PCT/US17/52798 also claims benefit of and priority to U.S. Provisional Application No. 62/510,653, titled "WINDOW ANTENNAS" and filed on May 24, 2017; and International Application PCT/US17/52798 is also a continuation-in-part of International Application No. PCT/US15/62387 (designating the United States), titled "WINDOW ANTENNA" and filed on Jun. 2, 2016, which claims benefit of U.S. Provisional Application No. 62/084,502 filed on Nov. 25, 2014; each of these applications is hereby incorporated by reference in its entirety and for all purposes.

FIELD

The disclosure relates generally to the field of electrochromic (EC) devices coupled with wireless power transmission technology. More specifically, the disclosure relates to EC windows configured to use wireless power transmission technology.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known EC material, for example, is tungsten oxide ($WO_3$). Tungsten oxide is a cathodic EC material in which a coloration transition, transparent to blue, occurs by electrochemical reduction. While electrochromism was discovered in the 1960's, electrochromic devices (EC devices) and apparatus and systems containing EC devices have not begun to realize their full commercial potential.

Electrochromic materials may be incorporated into, for example, windows. One drawback of conventional EC windows is that the power used, although small in amount, requires a hard wired connection to a power source of a building. This creates problems when builders are installing, for example, a large number of windows in an office building. Having to deal with hard wiring required for windows is just another impediment that a builder must deal with in the long list of items necessary to build a modern structure. Also, although EC windows offer an elegant solution for the management of heat zones in a modern building, for example, when controlled by an automated heat and/or energy management system, EC windows that require hard wired power sources create impediments to integration into automated energy management systems. Thus the additional installation costs and risks associated with wires could delay the adoption of EC windows in new construction projects and may prevent retrofit applications in many cases because retrofit requires additional installation of wiring infrastructure for the new EC windows.

SUMMARY

Electrochromic devices, particularly in EC windows, powered by wireless power transmission are described. The combination of low-defectivity, highly-reliable EC windows with wireless power transmission is one aspect of the disclosure.

Scalable EC window technology that integrates wireless power transmission technology to create a wirelessly-powered EC window is described. Such technology may optionally include environmental sensors, wireless control and/or in some aspects photovoltaic power. The disclosure enables full benefits of EC window technology to be realized at national level savings of quads of energy and hundreds of tons of carbon annually. New construction will benefit greatly from wirelessly powered EC windows, and there is particular advantage in retrofit applications, where installing wires for replacement windows would be problematic. Generally speaking, EC windows that integrate wireless power transmission technology can make their installation and/or repair easier.

One embodiment is an electrochromic device (EC device) powered by wireless power transmission. In one embodiment, the EC device is an EC window. Wireless power transmission is utilized to provide power to one or more EC devices in an EC window. Wireless power can be used to directly power an EC device in the window or, in an alternative embodiment, charge an internal battery which powers the EC transitions and/or EC states of the EC device(s) in the window. In one embodiment, wireless power transmission is received by a receiver that powers more than one EC window. Wireless power can also be used to power other active devices which are part of, or directly support, the EC window: for example, motion sensors, light sensors, heat sensors, moisture sensors, wireless communication sensors and the like. Wireless communication technology can also be used to control the wirelessly powered EC window.

Wireless power transmission of any suitable type can be used in conjunction with EC windows. Wireless power transmission includes, for example, but not limited to, magnetic induction, resonance induction, radio frequency power transfer, microwave power transfer and laser power transfer. In one embodiment, power is transmitted to a receiver via radio frequency, and the receiver converts the power into electrical current utilizing polarized waves, for example circularly polarized, elliptically polarized and/or dually polarized waves, and/or various frequencies and vectors. In another embodiment, power is wirelessly transferred via inductive coupling of magnetic fields. In a specific embodiment, power is wirelessly transferred via a first resonator (a coil that converts electrical energy, e.g. AC, running through the coil into a magnetic field), which receives power from an external supply hard wired to the first resonator, and a second resonator (a coil that is coupled to the magnetic field and thereby produces electrical energy via induction), which acts as the receiver by producing an electric current or potential via coupling of the magnetic resonance fields of the first and second resonators. Although embodiments utilizing magnetic induction need not necessarily use resonance coupled magnetic fields, in those that do, near-field resonance from localized evanescent magnetic field patterns is a relatively efficient method of wireless power transfer.

In one embodiment, the window receiver is an RF antenna. In another embodiment, the RF antenna converts RF power into an electrical potential used to function the EC device. In another embodiment the receiver is a second resonator which is resonance coupled to a first resonator, configured so that power is transmitted wirelessly from the first resonator to the second resonator. The second resonator converts the wirelessly transferred power into electricity to power the EC window.

In certain embodiments, the receiver is an onboard receiver, meaning that the receiver is attached to or disposed on or in an electrochromic window during manufacture or prior to installation. In some cases a receiver such as an RF antenna or secondary resonance coil, is located, e.g., near or in the (secondary) outer seal of the IGU and/or somewhere in a window frame so as not to obscure the viewable area through the glass of the IGU. Thus, in particular embodiments, the receiver is of relatively small dimensions. In one embodiment, the receiver is of sufficiently small dimensions that the user of the window may not recognize the receiver as being part of the window, but rather the receiver is hidden from the view of the user.

In one embodiment, the wireless power transmission is carried out via a wireless power transmission network which includes one or more power nodes for transmitting power to window receivers in particular areas. Depending on the building or need, one or more, sometimes several nodes are used to form a network of power nodes which feed power to their respective window receivers. In one embodiment, where radio frequency is used to transmit power and there is more than one power node, there are more than one frequency and/or polarization vector used in the power nodes, so that different levels or types of power are transferred from the various nodes to windows having different power needs. In another embodiment, where magnetic induction is used for wireless power transfer, there also are one or more power nodes, but in this embodiment, the power nodes are themselves resonators. For example, in one embodiment, a first resonator, which receives power via a power supply, is resonance coupled to a second resonator, and the second resonator is resonance coupled to a third resonator, for example, that delivers power to an EC window. In this way, the second resonator acts as a power node in a power transfer network from the first resonator, to the second resonator, to the third resonator, the third resonator acting as the receiver and transmitting power to the EC window via conversion of magnetic field to electrical power.

Another aspect is a method of powering an EC device, the method including: i) generating and/or transmitting a wireless power to a receiver, said receiver configured to convert the wireless power to electrical energy (e.g., electrical current or potential) used to power the EC device; and ii) delivering the electrical energy to the EC device. In one embodiment, the EC device is an EC window as described above. In another embodiment, i) is performed via RF; in another embodiment, i) is performed via magnetic induction. In one embodiment, the electrical energy from the receiver is used to charge a battery, which in turn is used to power to the EC device(s) of the EC window. In one embodiment, a single window has a wireless power receiver, and the electrical energy created by the receiver is used to power more than one EC window, directly and/or by charging a battery or system of batteries associated with the windows.

Another aspect is a wireless power transmission network including: i) a wireless power transmitter configured to transmit a wireless power; ii) a power node, configured to receive the wireless power and relay the wireless power; iii) a receiver configured to receive the relayed wireless power and convert the wireless power to an electrical energy; and, iv) an EC device configured to receive the electrical energy to power a transition between optical states and/or maintain an optical state. The electrical energy can be received by the EC device either directly or indirectly. In one embodiment, the electrical energy is received directly from the receiver, in another embodiment, the electrical energy is directed from the receiver to a battery, and then to the EC device. In one embodiment, the EC device is part of an EC window.

In certain embodiments, an EC device receives some of its electrical energy from a wireless power source as described above and additional electrical energy from a photovoltaic source that may optionally be integrated with the EC device (e.g., in or near an IGU, for example in a window frame). Such systems may require no wiring to power the EC device and associated controller, sensors and the like.

Another aspect is direct to an insulated glass unit base station (IGU base station) having a first lite, a second lite, a spacer disposed between the first lite and the second lite, a primary seal between the spacer and the first lite and between the spacer and the second lite, and a transmitter in electrical communication with at least one power source. The transmitter is configured to convert electrical energy from the at least one power source into wireless power transmissions configured to be transmitted to a wireless receiver in electrical communication with a device. The wireless power transmissions are configured to be converted by the wireless receiver into electrical energy to power the device. The transmitter is further configured to receive a beacon signal from the wireless receiver.

Another aspect is directed to a power transmission network of a building, the power transmission network comprising a window base station, a wireless receiver, and a controller. The window base station comprises an insulated glass unit having a first lite and a second lite. The window base station further comprises a transmitter in electrical communication with at least one power source. The transmitter is configured to convert electrical energy from the at least one power source into wireless power transmissions. The transmitter is further configured to receive a beacon signal. The wireless receiver in electrical communication with a device. The wireless receiver is configured to convert wireless power transmissions received from the transmitter into electrical energy to power the device. The wireless receiver is further configured to transmit the beacon signal. The controller is in communication with the transmitter. The controller is configured to determine pathways of the power transmission based on the beacon signal received by the transmitter from the wireless receiver.

Another aspect is directed to a building comprising a skin comprised of a plurality of electrochromic windows between an exterior environment and an interior environment of the building. The building further comprises a plurality of transmitters. Each transmitter is disposed on one of the electrochromic windows. Each transmitter is in electrical communication with at least one power source and is configured to convert electrical energy from the at least one power source into wireless power transmissions. These wireless power transmissions are configured to be received by a wireless receiver. The wireless receiver is configured to convert the wireless power transmissions into electrical energy to power a device. The building further comprises a network of window controllers in communication with the plurality of transmitters. The network of window controllers is configured to control phase and gain of the wireless transmissions from the plurality of transmitters based on the determined pathways of a beacon signal received by the plurality of transmitters from the wireless receiver.

These and other features and advantages will be described in further detail below, with reference to the associated drawings.

BRIEF DESCRIPTION OF THE DRAWINGS

The following detailed description can be more fully understood when considered in conjunction with the drawings in which:

FIGS. 3F-H depict inductive powering of an electrochromic insulated glass unit (IGU) where the wireless receiver is located in the secondary seal of the IGU and the wireless transmitter is external to the IGU.

Like reference numbers and designations in the various drawings indicate like elements.

DETAILED DESCRIPTION

Figure 1:
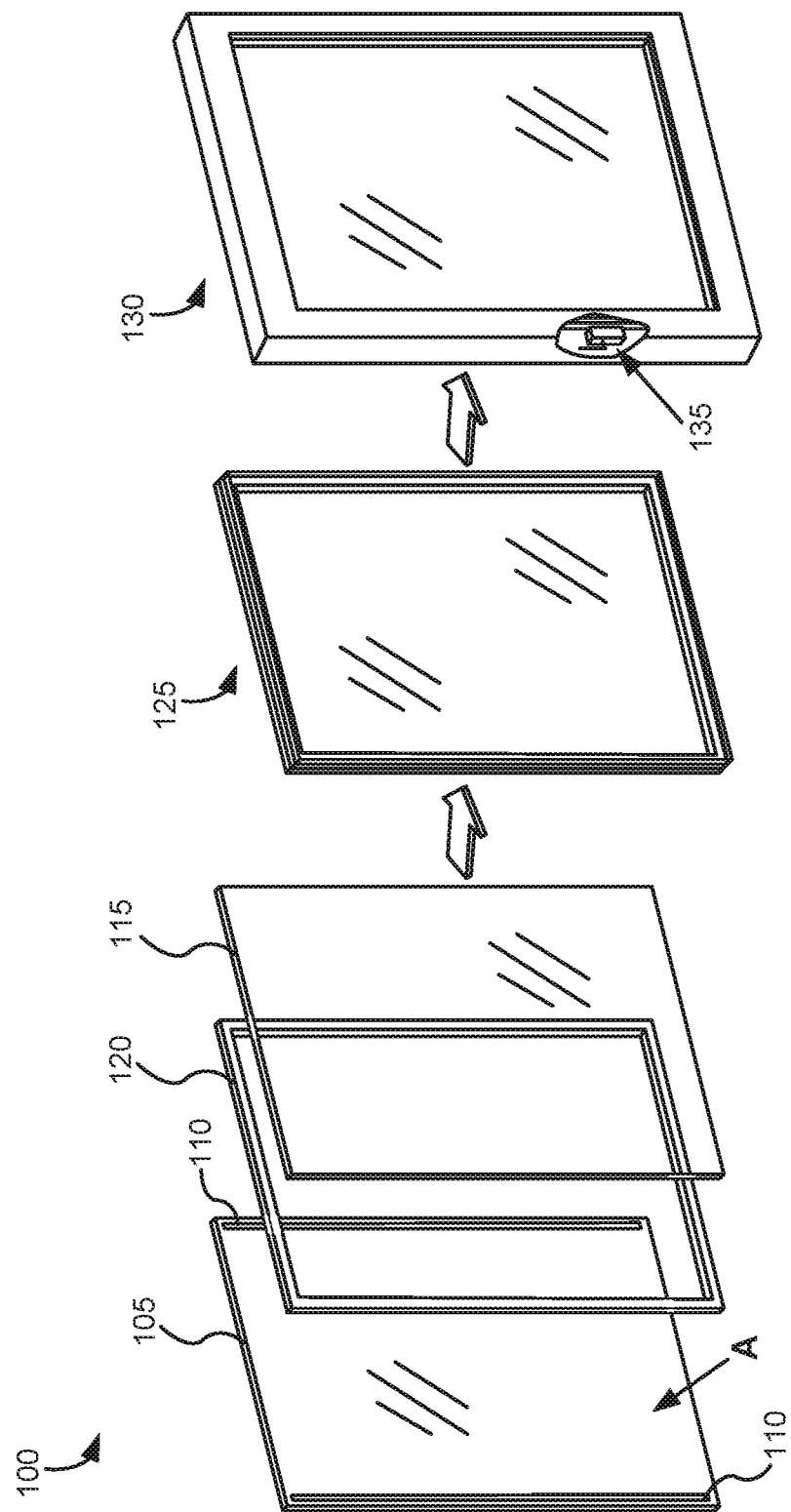
FIG. 1 depicts EC window fabrication including a wireless power receiver.

I. Introduction to Wirelessly Powered and Powering EC Windows

In the broadest sense, the disclosure describes EC devices, particularly in EC windows, that are configured to receive and/or transmit wireless power. As described herein, a "transmitter" generally refers to a device that takes electrical energy, e.g., from a power source, and broadcasts in a wireless power transmission. A "receiver" as described herein generally refers to a device configured to receive wireless power transmissions and convert the wirelessly transmitted power back into electrical energy. In specific embodiments, EC windows are powered by wireless power sources. In certain implementations, wireless power transmission is particularly well suited for supplying EC windows with power, because the EC windows function using low potentials, on the order of a few volts to transition an EC device and/or maintain the EC device's optical state. Under typical circumstances, EC windows may be transitioned a few times per day. Also, wireless power transmission can be used to charge an associated battery, so that indirect powering of EC windows via wireless power transmission can be achieved.

Installing windows with wires entails further considerations for the architect and builder, and in retrofit applications wires are particularly problematic due to the need for additional wiring infrastructure that was not previously installed in the building. The combination of these advanced technologies, wireless power transmission and EC windows, solves these problems and provides a synergy that saves energy, as well as time and money that would be spent integrating hard wire electrical connections of EC windows.

Dynamic, EC, insulated glass units (IGU's) for commercial and residential windows change light transmission properties in response to a small voltage, allowing control of the amount of light and heat passing through the windows. The EC device changes between a transparent "clear or bleached" state and a darkened (light and/or heat blocking) state using small potentials and can maintain optical states with even less power. Dynamic EC windows can filter the amount of light passing through the window, in one aspect providing visibility even in its darkened state and thus preserving visual contact with the outside environment while saving energy by, for example, blocking out heat generating solar rays during hot weather or keeping valuable heat in a building due to their insulating properties during cold weather. While EC windows are primarily discussed with reference to an insulated glass unit configuration, this need not be the case. For example, an EC window may have a monolithic laminate construction. One of skill in the in the art may readily understand how the disclosed concepts for wirelessly powering an electrochromic insulated glass unit may be applied in an analogous fashion to optically switchable windows having a different structure.

One example of such a dynamic window is a low-defectivity, highly-reliable EC window which includes solid-state and inorganic EC device stack materials. Such all solid-state and inorganic EC devices, methods of fabricating them, and defectivity criterion are described in more detail in U.S. patent application Ser. No. 12/645,111, titled "Fabrication of Low-Defectivity Electrochromic Devices," filed on Dec. 22, 2009 and naming Mark Kozlowski et al. as inventors; and in U.S. patent application Ser. No. 12/645,159 (now U.S. Pat. No. 8,432,603), titled "Electrochromic Devices," filed on Dec. 22, 2009 and naming Zhongchun Wang et al. as inventors; and in U.S. patent application Ser. No. 12/772,055 (now U.S. Pat. No. 8,300,298) and Ser. No. 12/772,075 (now U.S. Pat. No. 8,582,193), each filed on Apr. 30, 2010, and in U.S. patent application Ser. No. 12/814,277 (now U.S. Pat. No. 8,764,950) and Ser. No. 12/814,279 (now U.S. Pat. No. 8,764,951), each filed on Jun. 11, 2010—each of the four applications is titled "Electrochromic Devices," each naming Zhongchun Wang et al. as inventors; each of these six patent applications is incorporated by reference herein for all purposes. One aspect includes is a combination of an EC window, for example, but not limited to, an EC window described in any of these six U.S. patent applications, powered by wireless power transmission technology. The EC window may be powered directly via wireless power transmission, after conversion by a receiver to electrical energy, and/or the electrical energy may be used to charge a battery that is used to power the EC window.

Wireless power transmission is the process that takes place where electrical energy is transmitted from a power source to an electrical load, without interconnecting wires. In the broadest sense, electrical current can pass through the environment, be it air, water or solid objects without the need for wires. Often wireless power transmissions are electromagnetic transmissions. Examples of useful (controlled) forms of wireless power transmission include magnetic induction, electrostatic induction, lasers, ultrasound, radio waves and microwave energy. Wireless transmission finds particular use in applications where instantaneous or continuous energy transfer is needed, but interconnecting wires are inconvenient, problematic, hazardous, or impossible. In some embodiments, power is transferred via RF, and transformed into electrical potential or current by a receiver in electrical communication with an EC device, particularly an EC window. One particularly useful method of transferring power via RF transmissions is described in U.S. Patent Publication 2007/0191074, from U.S. patent application Ser. No. 11/699,148 filed on Jan. 29, 2007, titled "Power Transmission Network and Method," by Daniel W. Harrist, et al., which is hereby incorporated by reference in its entirety.

In other embodiments, power is transferred via magnetic induction using a first resonator powered by an external power supply and a second resonator which converts the magnetic field energy created by the first resonator into power that supplies the EC device of the EC window. One particularly useful method of transferring power via magnetic induction is described in U.S. Patent Publication 2007/0222542, from U.S. patent application Ser. No. 11/481,077 filed on Jul. 5, 2006, titled "Wireless Non-radiative Energy Transfer," by John Joannapoulos, et al., which is hereby incorporated by reference in its entirety. Another useful method of controlling wireless inductive power is described in U.S. Pat. No. 7,382,636, filed on Oct. 14, 2005, titled "System and Method for Powering a Load," by David Baarman, et al., which is hereby incorporated by reference in its entirety. EC windows described herein can incorporate such methods of controlling wireless power transmission.

Certain embodiments include more than one wireless power transmission source, that is, the disclosure is not limited to embodiments where a single wireless power transmission source is used. For example, in embodiments where a wireless power transmission network is used, one wireless power transmission method, for example, RF power transmission is used in part of the network, while another method, for example, magnetic induction, is used in another part of the network.

One aspect of the disclosure is an EC window powered by a wireless power transmission source. In one embodiment, the EC window can be of any useful size, e.g., in automotive use, such as in a sunroof or a rear view mirror where wiring is inconvenient, for example having to pass through a windshield of a car. In one embodiment, the EC window uses architectural scale glass as a substrate for the EC device of the window. Architectural glass is glass that is used as a building material. Architectural glass is typically used in commercial buildings, but may also be used in residential buildings and typically, but not necessarily, separates an indoor environment from an outdoor environment. Architectural glass is at least 20 inches by 20 inches and can be as large as about 80 inches by 80 inches. In some embodiments, the EC device is all solid state and inorganic. The window will have a receiver, for example, an RF receiver or resonator, as part of a window assembly.

FIG. 1 depicts an EC window fabrication, 100, where the window assembly includes a receiver, 135, for receiving wireless power transmissions, converting the transmissions to an electrical energy and powering an EC device of the window with the electrical energy, either directly or indirectly, for example, via powering the EC device directly or charging a battery that is used to power the EC window. An EC pane, 105, having an EC device (not shown, but for example on surface A) and bus bars, 110, which power the EC device, is matched with another glass pane, 115. During fabrication of IGU, 125, a separator, 120, is sandwiched in between and registered with substrates 105 and 115. IGU 125 has an associated interior space defined by the faces of the substrates in contact with separator 120 and the surfaces of the interior perimeter of separator 120. Separator 120 is typically a sealing separator, that is, includes a spacer and sealing between the spacer and each substrate where they adjoin in order to hermetically seal the interior region and thus protect the interior from moisture and the like. Typically, once the glass panes are sealed to the separator, secondary sealing may be applied around the outer perimeter edges separator 120 of the IGU in order to impart not only further sealing from the ambient, but also further structural rigidity to the IGU. The IGU is supported by a frame to create a window assembly, 130. A cut out of the window frame is shown to reveal wireless power receiver 135 which includes an antennae in this example. Receiver 135 is proximate the IGU, in this example, inside the frame of window assembly 130. The wireless power transmission receiver may be a component of a window controller.

In one embodiment, the wireless power transmission source transmits power via radio waves. In such an embodiment, the EC window includes a radio frequency (RF) receiver, where the radio frequency receiver configured to convert the radio frequency to electrical energy (e.g., an electrical current or potential) used to power an EC device in the EC window. Powering the EC device includes at least one of powering an optical transition or an optical state of the EC device. In one embodiment, the radio frequency receiver resides in or near the IGU of the EC window. For example, the receiver can be in the window frame that supports the IGU, in an area near the spacer that separates the glass panes of the IGU, or both. Preferably, but not necessarily, the receiver does not obscure the viewable area of the IGU, for example, as depicted in FIG. 1. Some examples of RF transmitters and RF receivers used for wireless transmission are described elsewhere herein.

In another embodiment, power is wirelessly transferred via inductive coupling of magnetic fields. In general terms, a primary coil (that converts electrical energy, e.g., AC, running through the coil into a magnetic field) supplied by a power source generates a magnetic field and a secondary coil is coupled to the magnetic field and thereby produces electrical energy via induction. The electrical energy produced by the secondary coil is used to power the EC device, in particular embodiments an EC device of an EC window. In a specific embodiment where resonance coupled magnetic energy is utilized, power is wirelessly transferred via a first resonator, which receives power from an external supply hard wired to the first resonator, and a second resonator, which acts as the receiver by producing an electric current via coupling of the magnetic resonance fields of the first and second resonators. Although embodiments utilizing magnetic induction need not necessarily use resonance coupled magnetic fields, in those that do, near-field resonance from localized evanescent magnetic field patterns is a relatively efficient method of wireless power transfer.

In another embodiment, power is wirelessly transferred via capacitive coupling of electric fields. Generally speaking, both a transmitter and a receiver take the form of an electrode and together a capacitive transmitter-receiver pair forms a capacitor. By providing an alternating voltage to the transmitter an oscillating electric field is generated that induces an alternating potential on the receiver electrode. An alternating potential at the receiver is then used to cause an alternating current to flow in the load circuit.

In yet another embodiment, power is wirelessly transferred via magnetodynamic coupling. In this method power is generated by two moving armatures, each of which has a permanent magnet. One armature acts as the transmitter, and the other armature acts as the receiver. A power source is used to drive the rotation of the transmitting armature using, for example, an electric motor. The transmitter thus creates a rotating magnetic field and the nearby receiving armature, which experiences the rotating magnetic field generated by the transmitter, begins to rotate in a synchronous manner. The receiving armature may then be used to create an electric current using induction.

In yet another embodiment, power is wirelessly transferred using ultrasound transmissions. In this example, a receiver is equipped with piezoelectric transducers that harvest energy wirelessly transmitted as ultrasound. In some cases piezo transducers may be attached to the surface of a lite and collect the resonant vibrations of the lite that are caused by wind or movement within a building.

In yet another embodiment power is wirelessly transmitted using power beaming in which energy is transmitted in the form of a laser and then converted back into electrical energy using a photovoltaic cell. In one embodiment power beaming is performed using an infrared laser.

In one embodiment, the receiver, whether RF antenna or resonance coil, is located proximate the IGU of the EC window, e.g., near the IGU seal or the window frame so as not to obscure the viewable area through the glass of the IGU. Thus, in particular embodiments, the receiver is of relatively small dimensions. "Small dimensions" means, for example, that the receiver occupies not more than about 5% of the viewable area of the EC window. In one embodiment, the receiver occupies none of the viewable area of the EC window, that is, the receiver is of sufficiently small dimensions that the user of the window may not recognize the receiver as being part of the window, but rather the receiver is hidden from the view of the user, e.g., housed in the frame of the window. In one embodiment, where the receiver is housed in seal area of the IGU, the frame of the window can have one or more access ports for servicing the receiver or the receiver can be sealed permanently in the window frame. There may also be ports and/or materials transparent to the wireless power transmission so that the receiver can properly receive the wireless power transmissions without interference from the window frame material.

In particular embodiments, there is a controller, for example a microprocessor, that regulates the potential applied to the EC device and may optionally control other functions (alone or combined with other microprocessors) such as recharging a battery used to operate the window, wirelessly communicating with a remote control, such as a hand held, an automated heat and/or energy management system that communicates wirelessly with the window controller. In certain embodiments described in greater detail elsewhere herein, wireless power transmission is carried out via a network which includes one or more power nodes for transmitting wireless power transmissions to window receivers in particular areas and/or for receiving wireless power transmissions in particular areas. Wireless power transmission networks described herein can use various forms of wireless power transmission such as RF, magnetic induction or both, depending on the need. Depending on the building, one or more, sometimes several nodes are used to form a network of power nodes which feed power to their respective window receivers. For example, a network of power nodes may comprise wireless power transmitters distributed in one or more rooms or other building spaces such that each wireless power receiver can receive power transmissions from more than one transmitter in the network. In one implementation, for example, certain windows in a wireless power transmission network have wireless power transmitters (e.g., each window in the middle of a façade may have a transmitter) and the other windows have wireless power receivers that can receive power transmissions relayed from one or more of the transmitters in the network of power nodes.

In one embodiment, where radio frequency is used to transmit power and there is more than one power node, there is more than one frequency and/or polarization vector used in the power nodes, so that different levels or types of power are transferred from the various nodes to windows having different power needs.

In one embodiment, where magnetic induction is used for wireless power transfer, there also are one or more power nodes, but in this embodiment, the power nodes are themselves resonators. For example, in one embodiment, a first resonator, which receives power via a power supply, is resonance coupled to a second resonator, and the second resonator is resonance coupled to a third resonator, for example that delivers power to an EC window. In this way, the second resonator acts as a power node in a power transfer network from the first resonator, to the second resonator, to the third resonator, the third resonator acting as the receiver and transmitting power to the EC window via conversion of magnetic field to electrical power. In this way, near field magnetic energy can span longer distances in order to suit the needs of the particular building's EC windows.

Another embodiment is a method of powering an EC device, the method comprising: i) generating a wireless power; ii) transmitting the wireless power to a receiver; said receiver configured to convert the wireless power to an electrical energy used to power the EC device; and iii) delivering the electrical energy (e.g., current or potential) to the EC device and/or a battery used to power the EC device. In one embodiment, the EC device is an EC window. In other embodiments, generating the wireless power is performed via a wireless power transmitter that transmits power via a radio frequency and the electrical energy is a voltage potential. In another embodiment, generating the wireless power is performed via a wireless power transmitter that transmits power via magnetic induction, in a more particular embodiment, resonance coupled magnetic induction. In other particular embodiments, ii) and iii) are accomplished via at least one of the wireless power transmission networks as described above. In one particular embodiment of the above described embodiments, the EC device is part of an EC pane of an EC window. In an even more particular embodiment, the EC pane is of architectural glass scale. In another embodiment, at least one of i), ii) and iii) are performed via wireless communication. One embodiment includes using the electrical energy created by the receiver's conversion of wireless power transmission for charging a battery that is used to power the EC device.

II. Examples of Wireless Power Transmission Networks

Figure 2A:
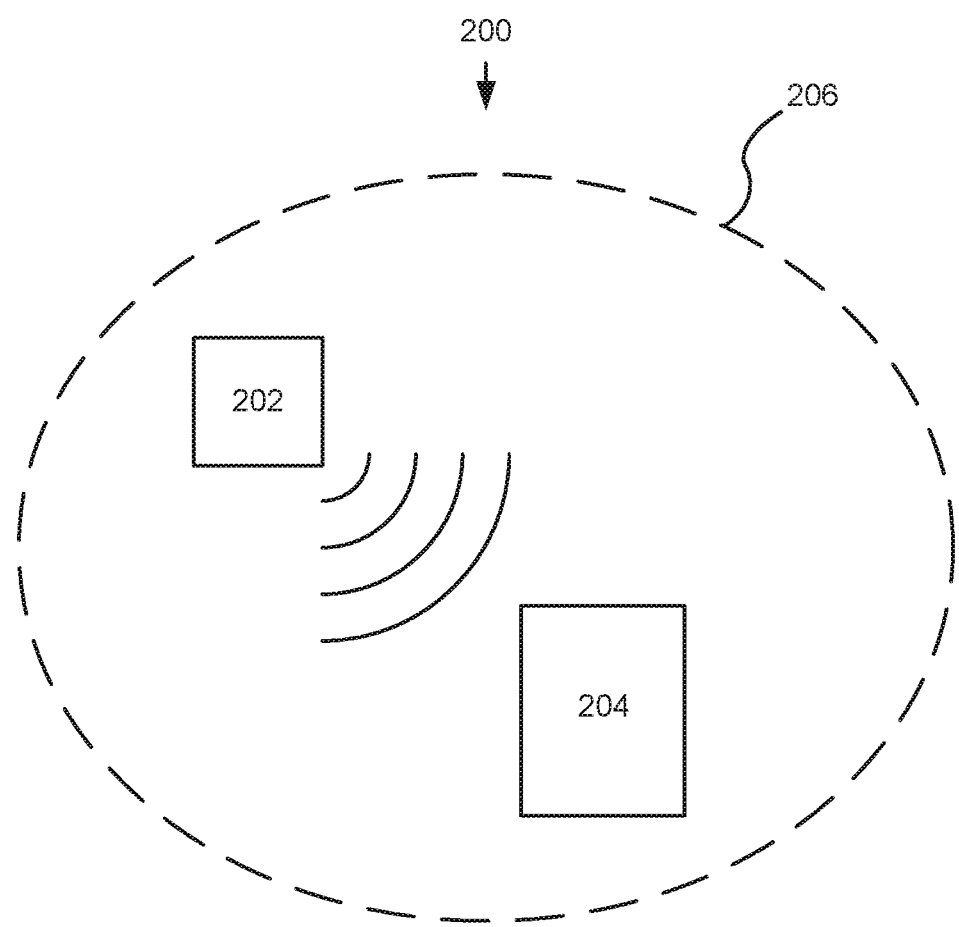
FIGS. 2A-2E are schematic representations of wireless power transmission networks as described herein.

FIG. 2A is a schematic representation of a wireless power transmission network, 200. The wireless power transmission network has a wireless power transmitter, 202, that transmits wireless power, for example via RF power or magnetic induction as described herein, to an EC window 204. The disclosure is not limited to EC windows; any EC device powered by wireless power transmission is within the scope of the disclosure. Electrochromic window 204 is configured with a receiver that converts the wirelessly transmitted power to electrical energy that is used to operate the EC device in the EC window and/or window controllers, sensors and the like. In one embodiment, the electrical energy is a voltage potential used to power the EC device's transitions and/or maintain optical states. Typically, the EC device will have an associated controller, e.g. a microprocessor that controls and manages the device depending on the input. Additionally, the EC device can be controlled and managed by an external controller which communicates with the device via a network. The input can be manually input by a user, either directly or via wireless communication, or the input can be from an automated heat and/or energy management system of a building of which the EC window is a component.

The wireless power transmission network is generally defined by area, 206, that is, transmission of power generally is localized to area 206, but not necessarily so. Area 206 can define an area where one or more windows reside and where wireless power will be transmitted. Transmitter 202 can be outside area 206 in some embodiments (and transmit power into the area) or inside area 206 as depicted in FIG. 2A. In one embodiment, the wireless power receiver resides proximate the IGU of the EC window. Preferably the receiver does not obstruct the view through the EC window. One of ordinary skill in the art would appreciate that a wireless power network as described can contain a plurality of EC windows to which power is supplied wirelessly via one or more transmitters. Also, the electrical energy produced via the wireless power can be used to augment a battery supply or a photovoltaic power supply in the EC window. In one embodiment, the photovoltaic power supply is used to augment battery charging performed via wireless power transmission.

Figure 2B:
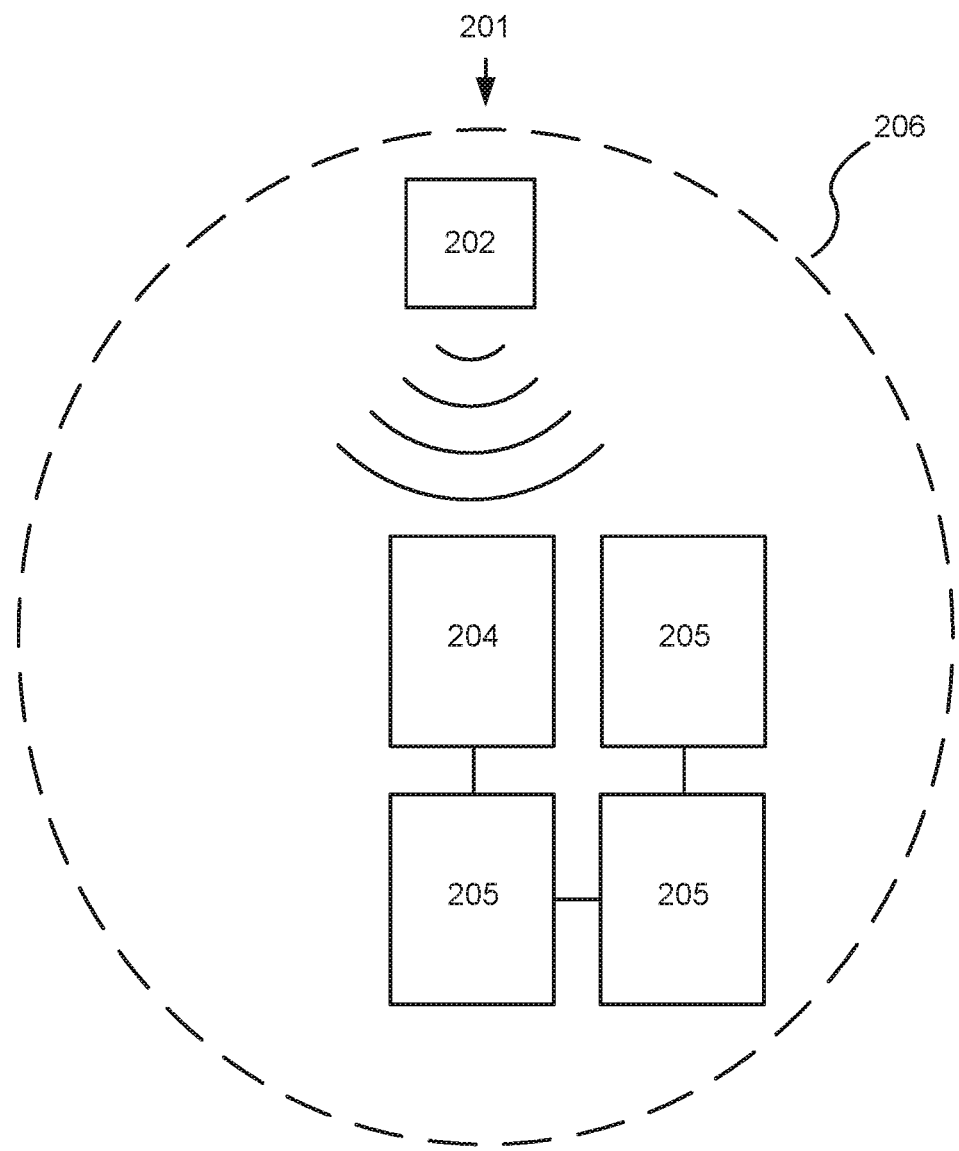

FIG. 2B is a schematic representation of another wireless power transmission network, 201. Network 201 is much like network 200 as described above in relation to FIG. 2A, except that the wireless power transmitted from transmitter 202 that is received by a receiver in EC window 204 is used to power not only window 204 but also windows 205. That is, the receiver in a single window is configured to convert wireless power transmissions into electrical energy in order to power more than one EC window, either directly or via a battery or batteries that are charged by the receiver. In this example, a receiver associated with window 204 converts the wireless power transmissions into electrical energy and transfers the energy via wires to windows 205. This has the advantage of not relying on a receiver for each window, and, although some wiring is used, it is localized to the window installation area, providing electrical communication between the windows, rather than having to be run throughout a building. Also, since EC windows do not have high power requirements, this configuration is practical.

Figure 2C:
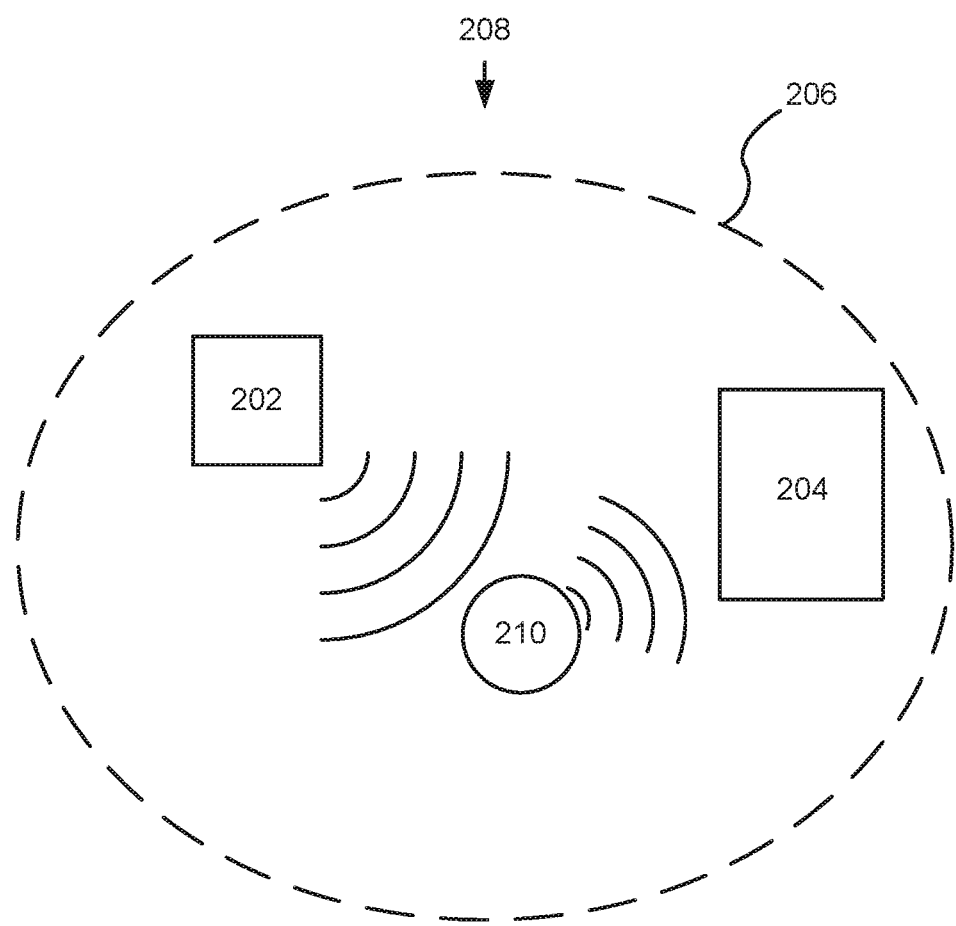

FIG. 2C is a schematic representation of another wireless power transmission network, 208. Network 208 is much like network 200 as described above in relation to FIG. 2A, except that the wireless power transmitted from transmitter 202 is not received directly by a receiver in EC window 204, but rather relayed via a power node 210. Power node 210 can either relay the power in the same form as that which it received (e.g., via an RF antenna or induction coil) or be configured to change the wireless power and transmit it to the receiver in a form more suited to the (ultimate) requirements of window 204. In one example, the power node receives the wireless power transmission in one form, either RF or magnetic induction, and transmits wireless power to window 204 in the other of the other of the aforementioned forms. One embodiment is power node including: a wireless power transmission receiver; configured to receive wireless power transmissions in one or more forms and convert the transmissions to electrical energy; and a wireless power transmitter configured to convert the electrical energy into wireless power transmissions in said one or more forms. In one embodiment, the wireless power transmitter is configured to convert the electrical energy into the same form of wireless power transmission than the wireless power receiver is configured to receive. Although the form is the same, there may be, for example, different frequency or polarity used so that the receiver of the power node can distinguish between the wireless transmissions from transmitter 202 and the transmitter of the power node 210. In one embodiment, the wireless power transmitter is configured to convert the electrical energy into a different form of wireless power transmission than the wireless power receiver is configured to receive.

Figure 2D:
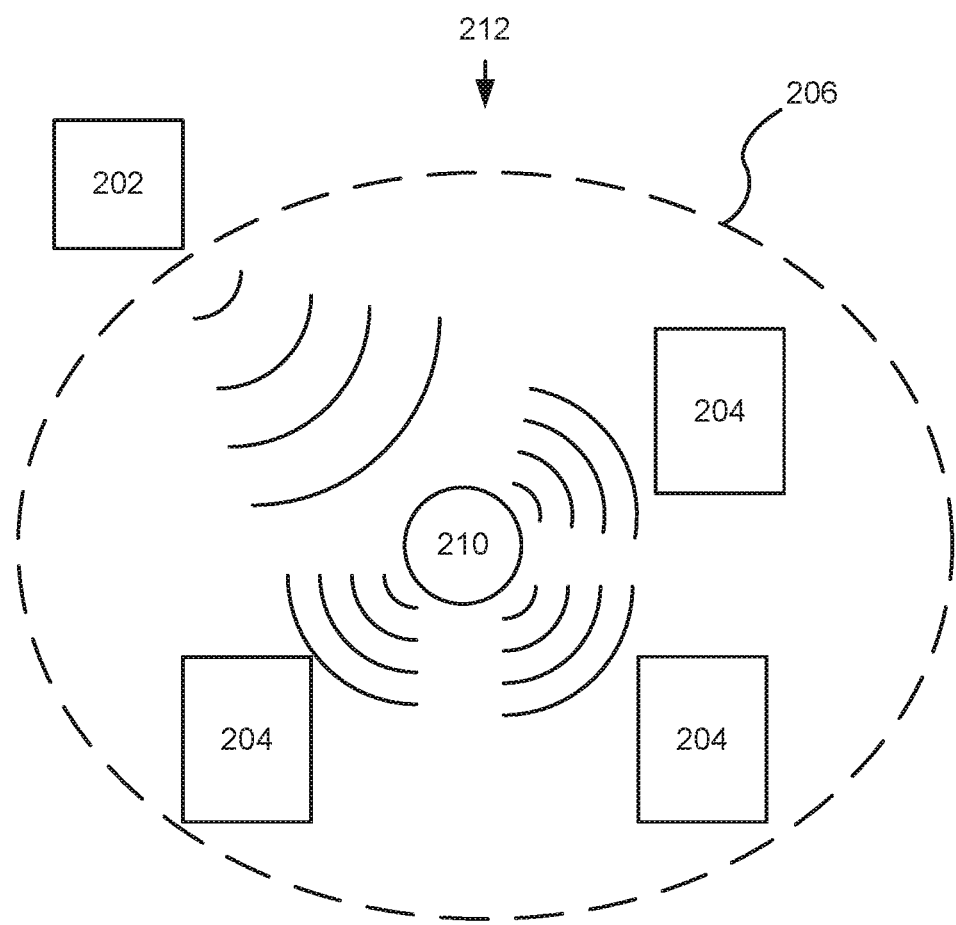

FIG. 2D is a schematic representation of another wireless power transmission network, 212. Network 212 is much like network 208 as described above in relation to FIG. 2C, except that the wireless power transmitted from transmitter 202 is relayed via a power node 210 to a plurality of windows 204. Again, power node 210 can either relay the power in the same form as that which it received (e.g., via an RF antenna or induction coil) or be configured to change the wireless power and transmit it to the receiver in a form more suited to the (ultimate) requirements of windows 204. In this example, transmitter 202 is outside of area 206. In this example, the power requirements of windows 204 are the same, however the disclosure is not so limited. That is, the wireless power transmitted from node 210 can be of a sufficient level so as to satisfy the power requirements of EC windows having different power needs, for example, where components for appropriately converting the wireless power transmissions from power node 210 to electrical energy are part of each window 204's receiver.

Figure 2E:
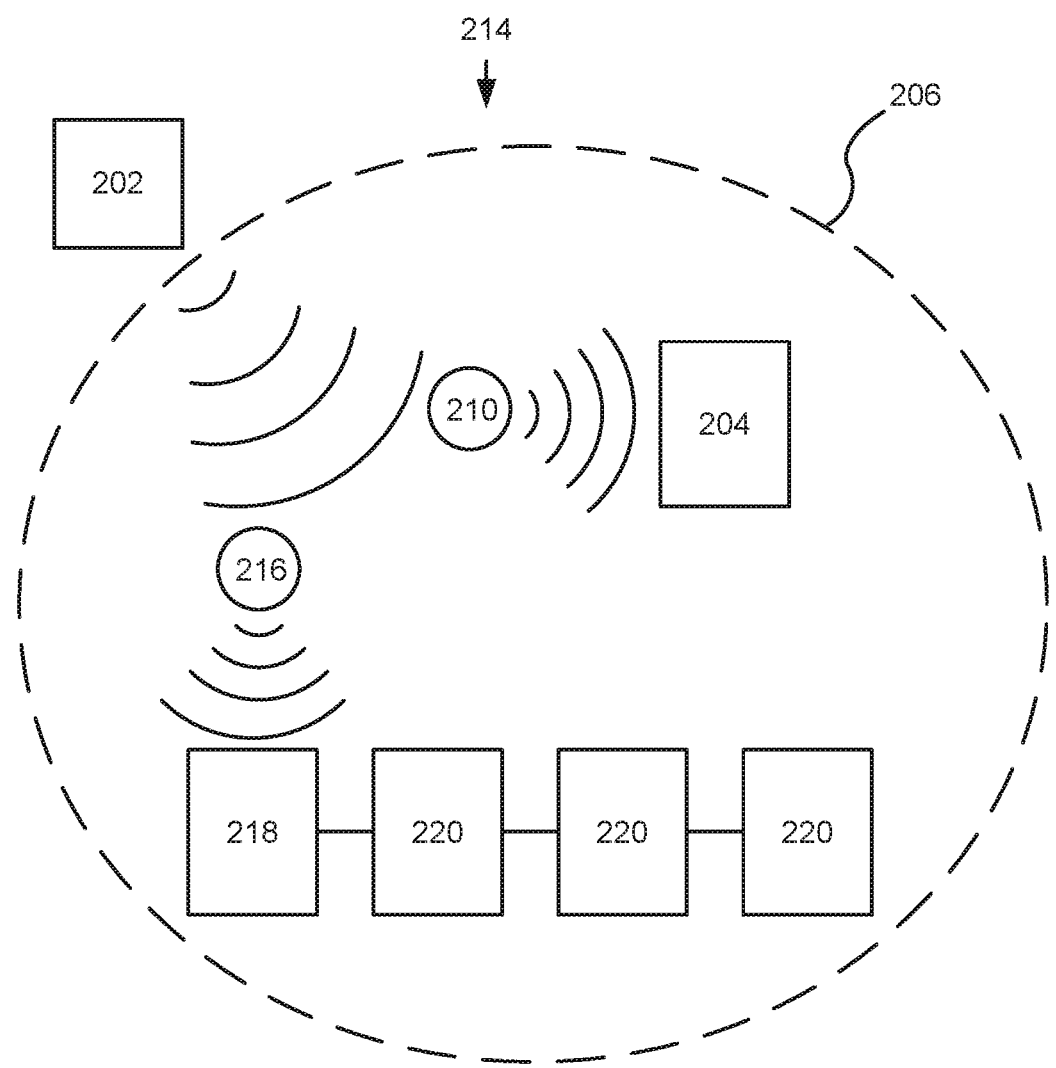

In one embodiment fulfilling the varying power requirements of different windows within a wireless power transmission network is accomplished using different power nodes for windows with different power needs. The power relayed from each node can be, for example, of different power level and/or transmitted in a different way. FIG. 2E is a schematic representation of one such wireless power transmission network, 214. Network 214 is much like network 212 as described above in relation to FIG. 2D, except that the wireless power transmitted from transmitter 202 is relayed via two power nodes, 210 and 216. Power node 210 can either relay the power in the same form as that which it received (e.g. via an RF antenna or induction coil) or be configured to change the wireless power and transmit it to the receiver (in window 204) in a form more suited to the (ultimate) requirements of window 204. Power node 216 relays the wireless power in a manner different than power node 210 that is power node 216 is configured to change the wireless power and transmit it to the receiver in window 218 in a form more suited to the (ultimate) requirements of window 218. In this example, window 218 is configured to supply power to itself and to windows 220 through wiring. Window 218 receives wireless power transmissions from node 216 and the receiver of window 218 converts the wireless power transmission into sufficient power to operate window 218 and windows 220. Thus, in embodiments described herein, different power nodes can receive the same form of wireless energy, for example from a single transmitter, but relay the wireless energy in different formats for different EC devices (via associated receivers), in this example EC windows having different power requirements. In this example, transmitter 202 is outside of area 206. In a specific embodiment, a single wireless power transmitter transmits a wireless power and each of a plurality of EC windows includes a receiver specifically configured to convert the wireless power to an electrical energy suited for the particular needs of that window. In another embodiment, each window has an equivalent receiver that converts the wireless power into the same electrical energy, but the electrical energy is converted to the particular needs of the window by one or more electronic components, in communication with the receiver, for example a rectifier, voltage converter, frequency changer, transformer, or inverter.

One embodiment is a wireless power transmission network including: i) a wireless power transmitter configured to transmit a wireless power; ii) a power node, configured to receive the wireless power and relay the wireless power; iii) a receiver configured to receive the relayed wireless power and convert the wireless power to an electrical energy; and iv) an EC device configured to receive the electrical energy. In one embodiment, the EC device is an EC window. In another embodiment, the power node comprises an RF antenna. In one embodiment, the power node comprises an induction coil. In another embodiment, the receiver is an RF receiver. In another embodiment, the receiver is an induction coil. In other embodiments, the power node is configured to change the wireless power prior to relaying the wireless power to the EC window, depending on the requirements of the EC window. In some embodiments, the wireless power network includes a plurality of power nodes wherein each power node is configured to relay power to one or more EC windows, each of the plurality of power nodes configured to relay wireless power according to the requirements of the EC windows comprising receivers corresponding to each of the plurality of power nodes.

Although certain embodiments are described herein with reference to EC devices, it would be understood that these embodiments can be used to power other optical devices in other implementations.

III. Locations and Other Details of Wireless Transmitters and/or Receivers

Figure 3A:
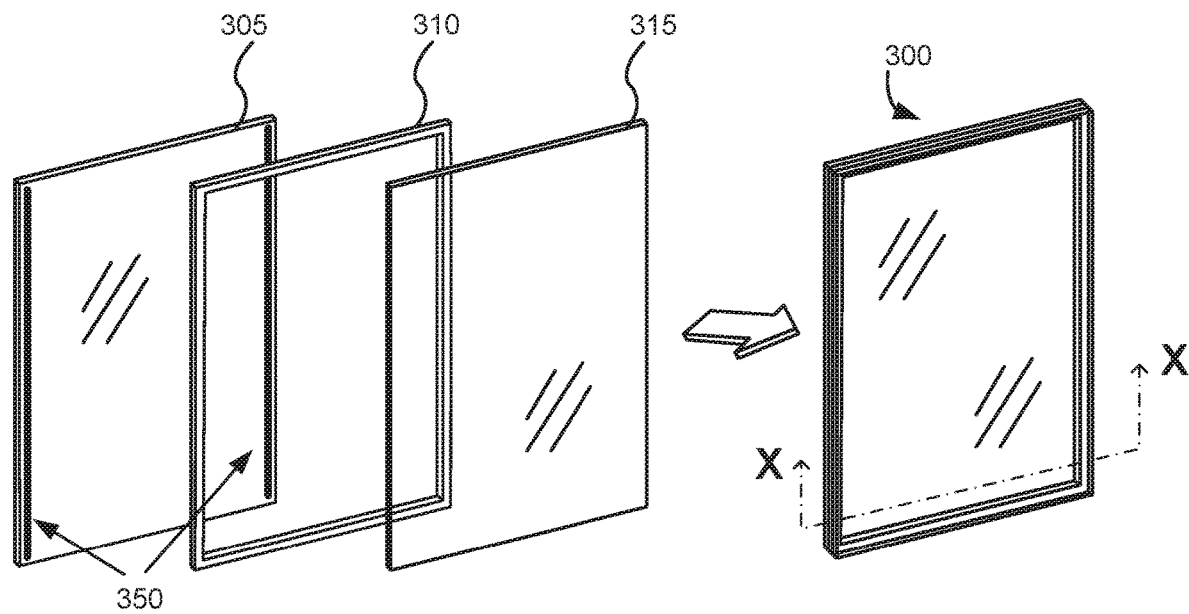
FIG. 3A depicts some general operations in the construction of an insulated glass unit (IGU) of an EC window, according to embodiments.

FIG. 3A depicts some general operations in the construction of an EC window in the form of an insulated glass unit (IGU) 300 with an electrochromic lite 305, according to embodiments. During construction of the IGU 300, the spacer 310 is sandwiched in between and registered with the electrochromic lite 305 and the second lite 315. The IGU 300 has an associated interior space defined by the faces of the lites and the interior surfaces of the spacer 310. The spacer 310 together with a primary seal may seal, e.g. hermetically, the interior volume enclosed by lites 305 and 315 and spacer 310. Once lites 305 and 315 are coupled to the spacer 310, a secondary seal is applied around the perimeter edges of IGU 300 in order to impart further sealing from the ambient environment, as well as further structural rigidity to the IGU 300. The secondary seal may be a silicone based sealant, for example. In this example, a pair of opposing bus bars 350 is shown (an electrical power distribution component of the electrochromic device) on electrochromic lite 305. The bus bars 350 are configured outside spacer 310 in the final construct.

FIGS. 3B-3E depict a portion of the cross-section X-X of the IGU of FIG. 3A, according to different implementations of components of the IGU configured for wireless power transfer. These implementations include components for receiving and/or transmitting wireless power and delivering power to the bus bars of the electrochromic lite. It would be understood that although one portion of the cross-section X-X is shown, the cross-section of the IGU includes a substantially mirror image portion. FIG. 3F depicts an implementation of an electrochromic IGU that is configured for wireless power transfer using magnetic induction from a transmitter located in or proximate to a window frame. FIG. 3G depicts an implementation of an electrochromic IGU that is configured with a transmitter in the glazing pocket between the window frame and the IGU.

Figure 3B:
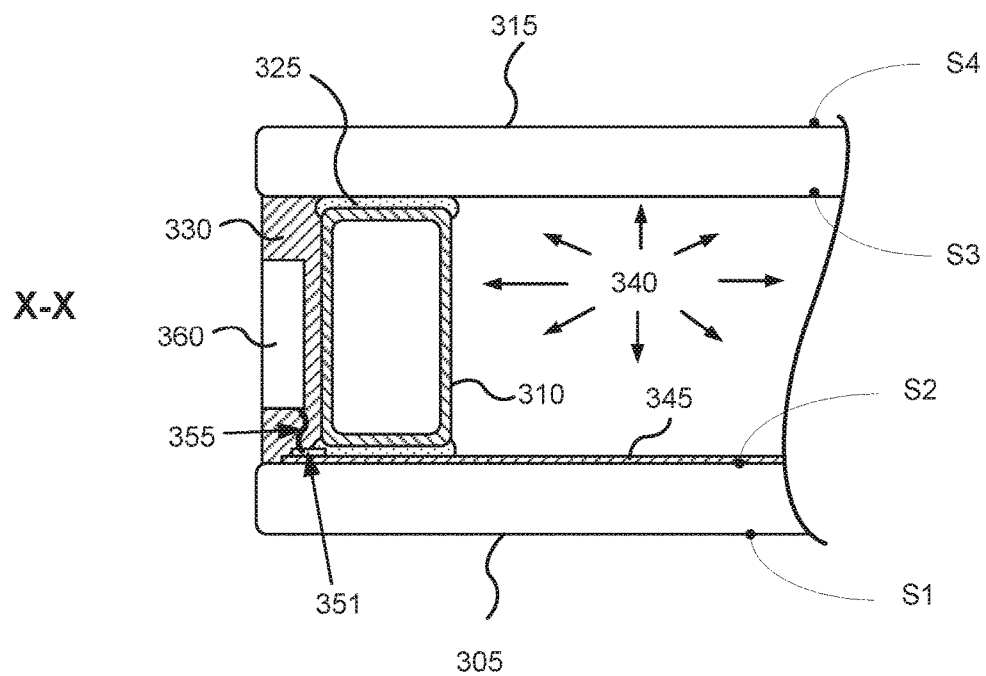
FIGS. 3B-3E depicts the cross-section X-X of the IGU of FIG. 3A, according to different implementations configured for wireless power transfer.

In the implementation shown in FIG. 3B, the electrochromic lite 305 is depicted as the lower lite and lite 315 is depicted as the upper lite. The spacer 310 is mated on opposite sides to both lites 305, 315 with an adhesive sealant which forms the primary seal, 325, of the IGU. The primary seal area is defined by the top and bottom (as depicted) outer surfaces of the spacer 310 and the inner surfaces of the lites 305, 315. Once mated, there is a sealed volume, 340, defined within the IGU. Typically the volume 340 is filled with an inert gas or evacuated. The spacer 310 may have desiccant inside (not shown). Outside the perimeter of the spacer 310, but typically not extending beyond the edges of the lites, is a secondary sealant material, 330, which forms the secondary seal of the IGU. The electrochromic device, 345, disposed on the transparent substrate of the electrochromic lite 305 is a thin film coating, on the order of hundreds of nanometers up to a few microns thick. The bus bars 351 supply electricity to the electrochromic device 345, each to a different transparent conductive layer of an electrochromic device stack to create a voltage potential across the inner layers of the device 345 and thereby drive the optical transitions. The IGU includes wiring 355 to deliver power to the bus bars 351. In this implementation, the bus bars 351 are outside the spacer 310, and in the secondary seal reducing any likelihood that, the wiring 355 to the bus bars 351 will interfere with the primary seal of the IGU. In other implementations, an IGU may have a first bus bar in the secondary seal and a second bus bar in the primary seal or in the sealed volume of the IGU or a bus bar in the primary seal and a second bus bar in the sealed volume of the IGU.

With continued reference to FIG. 3B, the IGU configured for wireless power transfer includes an onboard receiver 360 that is located in the secondary seal 330 of the IGU. As depicted, the receiver 360 is exposed in an area at the edge of the secondary seal 330 and with wiring 355 forms an electrical connection to the bus bars 350. In another example, the receiver 360 may be completely enclosed in the secondary seal 330. While the illustrated example is described as having the bus bars 350 located outside the spacer 310 and the electrochromic device 345 extending to the secondary seal 330, the bus bars 350 and electrochromic device 345 may optionally in other implementations extend only part way under the spacer 310, or extend only within the viewable area through the IGU within the inner perimeter of the spacer 310. In these latter two scenarios, wiring 355 would run either through spacer 310 to the bus bars 350 or transverse at least a portion of the primary seal 325 between the spacer 310 and the lites to connect the receiver with the bus bars.

Figure 3C:
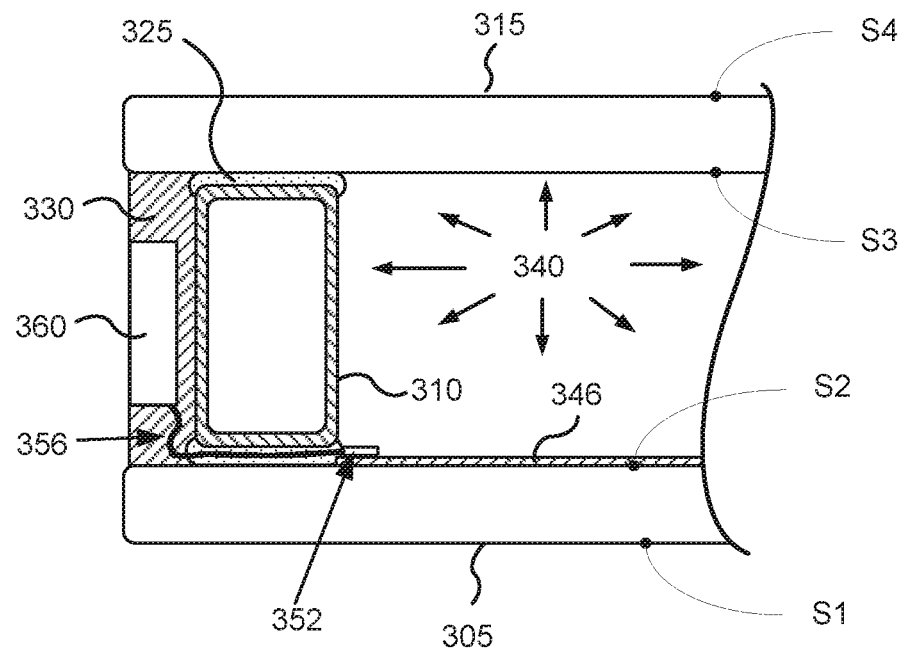

FIG. 3C shows an implementation of an IGU where a pair of bus bars 352 and an electrochromic device 346 extend only within the viewable area of the IGU defined by the inner perimeter of the spacer 310. In this illustrated example, wiring 356 transverses the primary seal 325 between the spacer 310 and the lites 305, 315 to electrically connect the receiver 360 in the secondary seal 330 with the bus bars 351. In another example, the receiver 360 may be completely enclosed in the secondary seal 330. Additional wiring configurations to power bus bars are described in U.S. patent application Ser. No. 15/228,992, filed on Aug. 4, 2016, titled "Connectors for Smart Windows," which is incorporated herein by reference in its entirety. According to some aspects, the receiver or another portion of the IGU may further include a battery for storing and delivering power to the bus bars. According to some aspects, a receiver may be part of a window controller, and in some aspects may also include a transmitter (e.g., an RF transmitter).

Figure 3D:
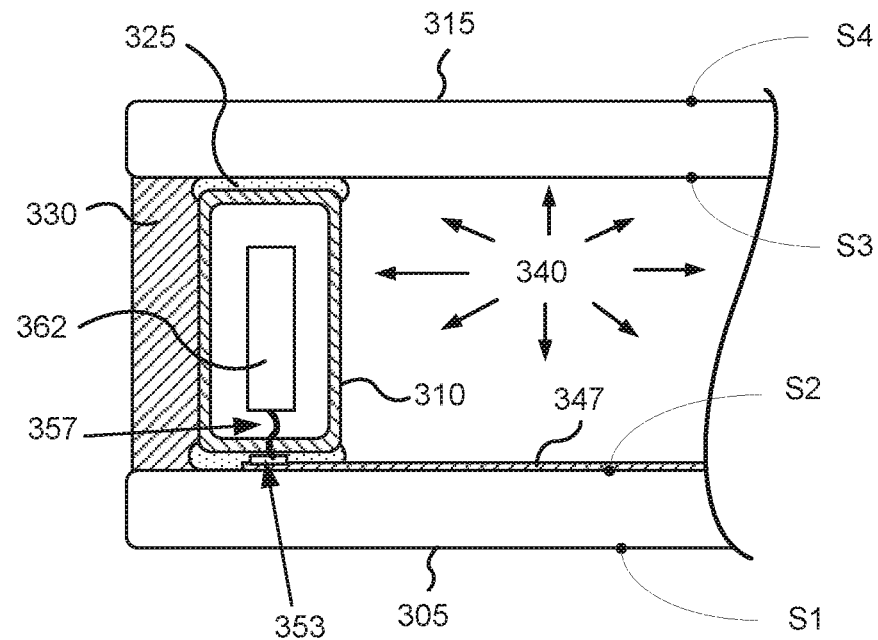

FIG. 3D depicts an implementation of an IGU where a pair of bus bars 353 and an electrochromic device 347 extending under the spacer 310 i.e. between the spacer 310 and the transparent substrate of the electrochromic lite 305 and not beyond the outer perimeter of the spacer 310. In the illustrated implementation, an onboard receiver 362 is located within the inner volume of the spacer 310 rather than being located in the secondary seal 330. In implementations such as this where the bus bars 353 do not extend beyond the outer perimeter of the spacer 310, locating the receiver 362 within the spacer 310 can simplify wiring 357 electrically connecting the receiver 362 to the bus bars 353. In one aspect, the spacer 310 may be, for example, a plastic or foam spacer. Optionally, the spacer 310 may have a preformed pocket into which the receiver 362 is inserted. In one case, the wiring 357 end connector to at least one of the bus bars 353 may be a piercing connector that is pushed through the foam spacer body or e.g., through an aperture formed in a plastic spacer, in order to establish electrical communication with the bus bar 353. In one example, a separate wiring may run around the perimeter of the spacer 310, inside the spacer or not, in order to establish electrical contact with the other bus bar, or e.g., a bus bar tab may run from the opposing bus bar to the same side of the device as bus bar 330 so that the receiver's wiring may contact both bus bars using the two proximate bus bar tab connections. In another aspect, the spacer 310 may be made of metal, such as, e.g. aluminum, in which case inductive coupling can occur through the spacer body (steel spacers may block such coupling).

Figure 3E:
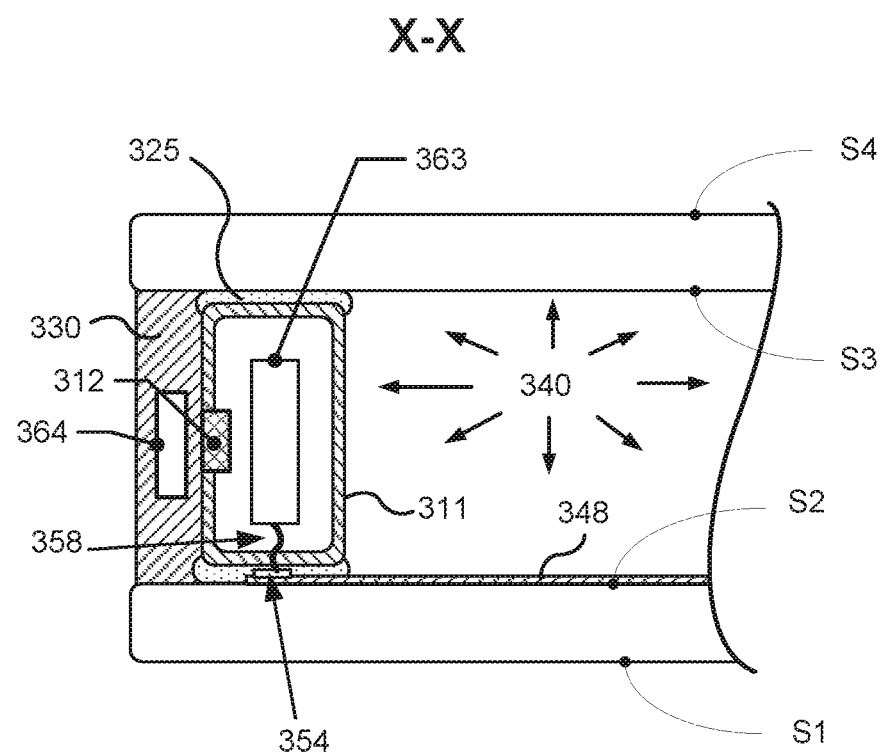
Figure 3F:
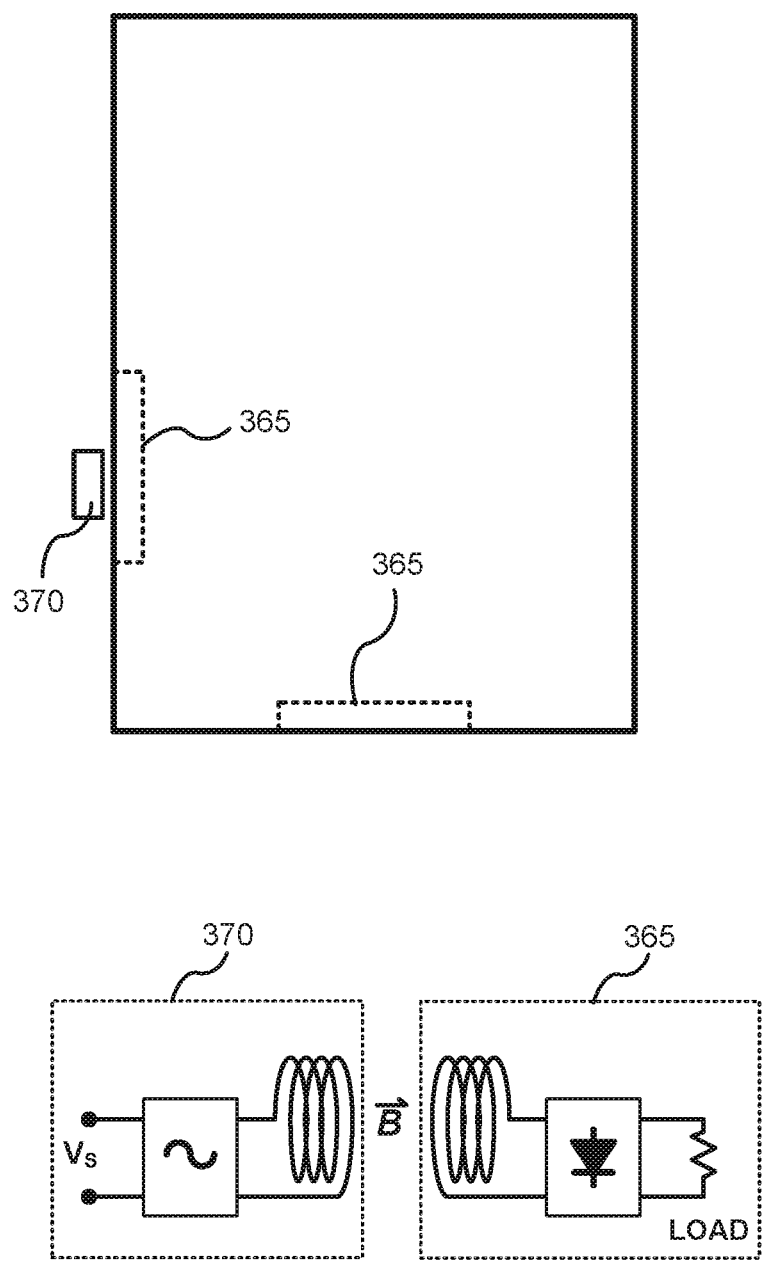

FIG. 3E depicts an implementation of an IGU with a pair of bus bars 354 and an electrochromic device 348 extending under the spacer 311 i.e. between the spacer 311 and the transparent substrate of the electrochromic lite 305 and not beyond the outer perimeter of the spacer 311. The IGU includes a receiver 363 located within the inner volume of the spacer 311 and wiring 358 electrically connecting the receiver 363 to the bus bars 354. The spacer 311 may be made of stainless steel or another material that would substantially inhibit the passage of a time-varying magnetic field from reaching the receiver 363. In this example, a portion of the spacer 311 is removed and replaced with a key 312 made of a material (e.g., a plastic, foam, or aluminum) that allows passage of magnetic energy. Optionally, such as depicted in FIG. 3E, a transmitter 364 is located in the secondary seal 330. The transmitter 364 transmits power wirelessly through the key 312 in spacer 311 to the receiver 363. In one case, the transmitter 364 may be electrically connected to a power source through wiring. Alternatively, the transmitter 364 may include a receiver for accepting wireless power transmissions.

In one aspect, a receiver may be located within a sealed volume of an IGU. In such case, if the transmitter is located laterally to the receiver, depending upon the spacer material, either the inductive couple can be established through the spacer or a key is used if it is a steel spacer. Alternatively, the transmitter can be configured to transmit wireless power through one of the lites (e.g., glass panes) of the IGU, e.g., from S4 (interior surface) or S1 (exterior surface) of the IGU.

In some implementations, a receiver includes or is in electrical communication with a local energy storage device such as a battery or supercapacitor. In some cases, excess power received is stored in an energy storage device and used in the event that the transmitted power becomes insufficient or unavailable (e.g., a power outage). In some cases, a local energy storage device can be located outside of the IGU (e.g., located within a wall or within a window frame) and electrically connected to the receiver. In one example, the local energy storage device is placed into a wall connected to the receiver by a wire passing through the window frame. Examples of some energy storage devices that may be used are described in International PCT Patent Application PCT/US16/41176, filed on Jul. 6, 2016 and titled, "POWER MANAGEMENT FOR ELECTROCHROMIC WINDOW NETWORKS CROSS REFERENCE TO RELATED APPLICATIONS," which is hereby incorporated by reference in its entirety.

FIG. 3F depicts an implementation of an electrochromic IGU that is configured for wireless power transfer using magnetic induction from a transmitter 370 located in or proximate to a window frame into which the IGU is installed. The transmitter 370 oscillates current through a conductive coil creating an alternating magnetic field that is converted back to alternating current by a conductive coil in receiver 365. A rectifier in the circuitry of the receiver 365 then converts the alternating current into direct current for delivery to the EC device and/or to a battery. In some cases, the coil diameter of the transmitter 370 may differ from the coil diameter of the receiver 365, or one coupling partner may have redundant coils to account for misalignment of the components with each other. In the illustrated example, the receiver 365 is depicted as having a larger footprint than the transmitter 370. The illustrated IGU is configured with two receivers 365 allowing the IGU to be compatible with installation into frames having transmitters 370 in different locations. By having redundant receivers 365, the installation process is simplified as the possibility of misaligning a transmitter and receiver during installation is reduced or eliminated. In other examples, the IGU may have a single receiver 365.

When installing an IGU, glazing blocks (also referred to herein as setting blocks) may be provided to help support the IGU in the frame. The setting blocks are located in the glazing pocket which is the space between window frame and the IGU. Setting blocks also help prevent the windows from breaking or popping out during earthquakes by helping accommodate a degree of movement/deformation of the building with respect to the windows by, for example, isolating the windows from the surrounding movement/ deformation of the building. Such blocks are often rubber, though other durable and deformable materials may be used. The blocks may be provided on the bottom of the window, the sides of the window, and the top of the window. Often, two or more blocks are provided for every side of the window where the blocks are present. Additional details of window framing components such as glazing blocks may can be found in PCT Patent Application No. PCT/US15/62530, filed on Nov. 24, 2015, and titled, "INFILL ELECTROCHROMIC WINDOWS," which is hereby incorporated by reference in its entirety.

FIG. 3G depicts an implementation of an electrochromic IGU 301 that is configured for wireless power transfer having a transmitter 371 located in the glazing pocket (the space between window frame 375 and the IGU 301). Setting blocks 365 are also located between the IGU 301 and the window frame 375. In this implementation, the receiver 366 is located in the IGU 301, for example, in the secondary seal. Further detail is shown in the expanded view of a portion and a cross-section B-B shows further detail. According to one aspect, the transmitter 371 may be enclosed in a material similar to that of the setting blocks 365. In the illustrated implementation, the transmitter 371 has the same or approximately the same width as the setting blocks 365. In another implementation, the form factor of the transmitter 371 is smaller than that of the setting block 365, such that there is a void space between the transmitter 371 and the receiver 366 in the IGU. In another implementation, the transmitter 371 is located in a portion of the window frame 375. In this illustrated implementation, the window frame 375 includes a pressure plate 375a that is used to hold the IGU 301 in place. In another implementation, the transmitter 370 is located on the pressure plate 375a. In each of these implementations the major axis of the coils in the transmitter and the receiver are approximately collinear to increase the efficiency of wireless power transfer. In some cases, there may be wood, plastic, aluminum, glass, or another material that does not substantially dampen the wireless power transfer between the transmitter and receiver.

Figure 3H:
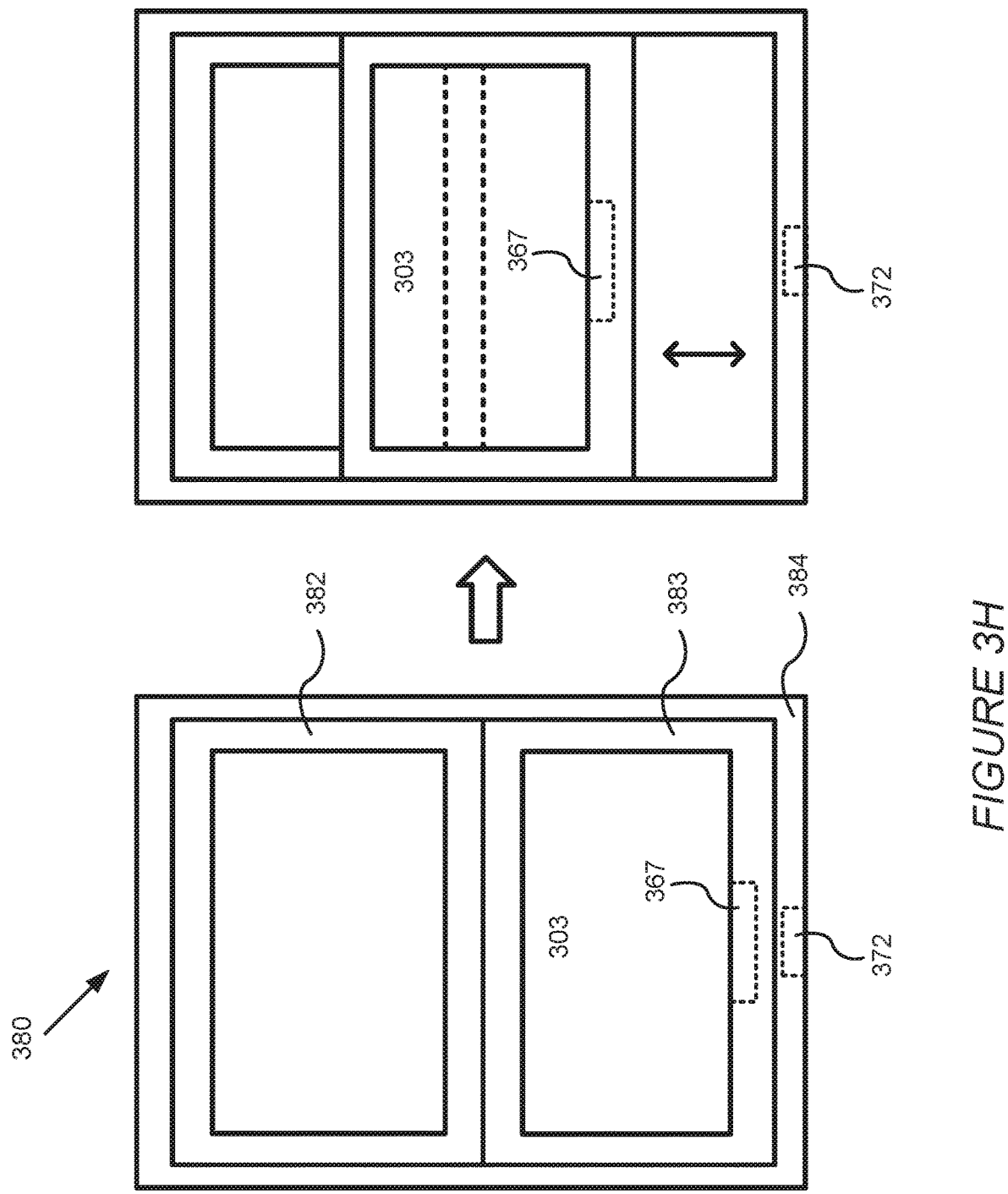

FIG. 3H is a schematic drawing depicting an implementation of an EC window, 380, incorporating an IGU that includes an electrochromic lite. The EC window 380 includes an outer frame, 384, in which a fixed frame, 382, and a movable frame, 383, are mounted. The fixed frame 382 is fixedly mounted within the outer frame 384 so that it does not move. The movable frame 383 is movably mounted in the frame 384 so that it may move from a closed position to an open position, for example. In the window industry, the EC window 380 may be referred to as a "single hung window," the fixed frame may be referred to as a "fixed sash," and the movable frame may be referred to as a "movable sash." The movable frame 383 includes an IGU 300 with an electrochromic lite and a receiver 367 configured to receive wireless power from a transmitter 372 located in the outer frame 384. In examples in which wireless power transfer occurs through electromagnetic induction, the depicted configuration is optimized, i.e. power is transferred, when the frame is in a closed position. In an example in which wireless power transfer between the receiver 367 and the transmitter 372 occurs through electromagnetic induction, power transfer is maximized when the movable frame 383 is in a closed position. In another example, the receiver 367 and the transmitter 372 may be positioned such that maximum wireless power transfer occurs when the movable frame 383 is in an open position. In another implementation, a movable sash window includes a plurality of transmitters and/or receivers such that wireless power transfer can occur at various window positions or this can also be accomplished if the magnetic couple can be established to within the operating range of the window's movement.

While FIG. 3H shows an EC window having one movable frame with an electrochromic lite, additional receivers and transmitters may be used with an EC window having two or more movable frames, each having an electrochromic lite. In another aspect, a single transmitter may be used to transmit power wirelessly to receivers on multiple moveable frames. One of ordinary skill in the art would appreciate that the described embodiments having one or more movable frames could include configurations such as horizontally-sliding windows, sliding doors, tilt out windows, and the like.

While the implementations depicted in FIGS. 3F-I have been described with reference of wireless power transfer by magnetic induction, one skilled in the art may readily understand that other forms of wireless power transfer may be used in the described embodiments. For example, instead of having conductive coils to transmit power via electromagnetic induction, the transmitter and receiver may have electrodes allowing power to be transferred via capacitive coupling.

In some implementations, power is transferred via radio frequency (RF) waves, and transformed into electrical potential or current by a receiver in electrical communication with an EC window. One example of a method of transferring power via RF waves is described in U.S. Patent Publication No. US20160020647, published on Jan. 21, 2016, filed on Jul. 21, 2014, and titled "Integrated Antenna Structure Arrays for Wireless Power Transmission," by Michael A. Leabman, et al., which is hereby incorporated by reference in its entirety. Certain implementations include more than one wireless power transmitter, that is, the disclosure is not limited to implementations where a single wireless power transmission source is used.

In certain RF embodiments, the RF power transmissions can be used to transmit power to a RF receiver located in an area within a range of about 100 feet of the RF transmitter. In one example, RF power transmissions can be used to transmit power to a RF receiver located within a range of about 75 feet of the RF transmitter. In another example, RF power transmissions can be used to transmit power to a RF receiver located within a range of about 50 feet of the RF transmitter. In yet another example, RF power transmissions can be used to transmit power to a RF receiver located within a range of about 25 feet of the RF transmitter. In yet another example, RF power transmissions can be used to transmit power to a RF receiver located within a range of about 20 feet of the RF transmitter. In yet another example, RF power transmissions can be used to transmit power to a RF receiver located within a range of about 15 feet of the RF transmitter.

Figure 4:
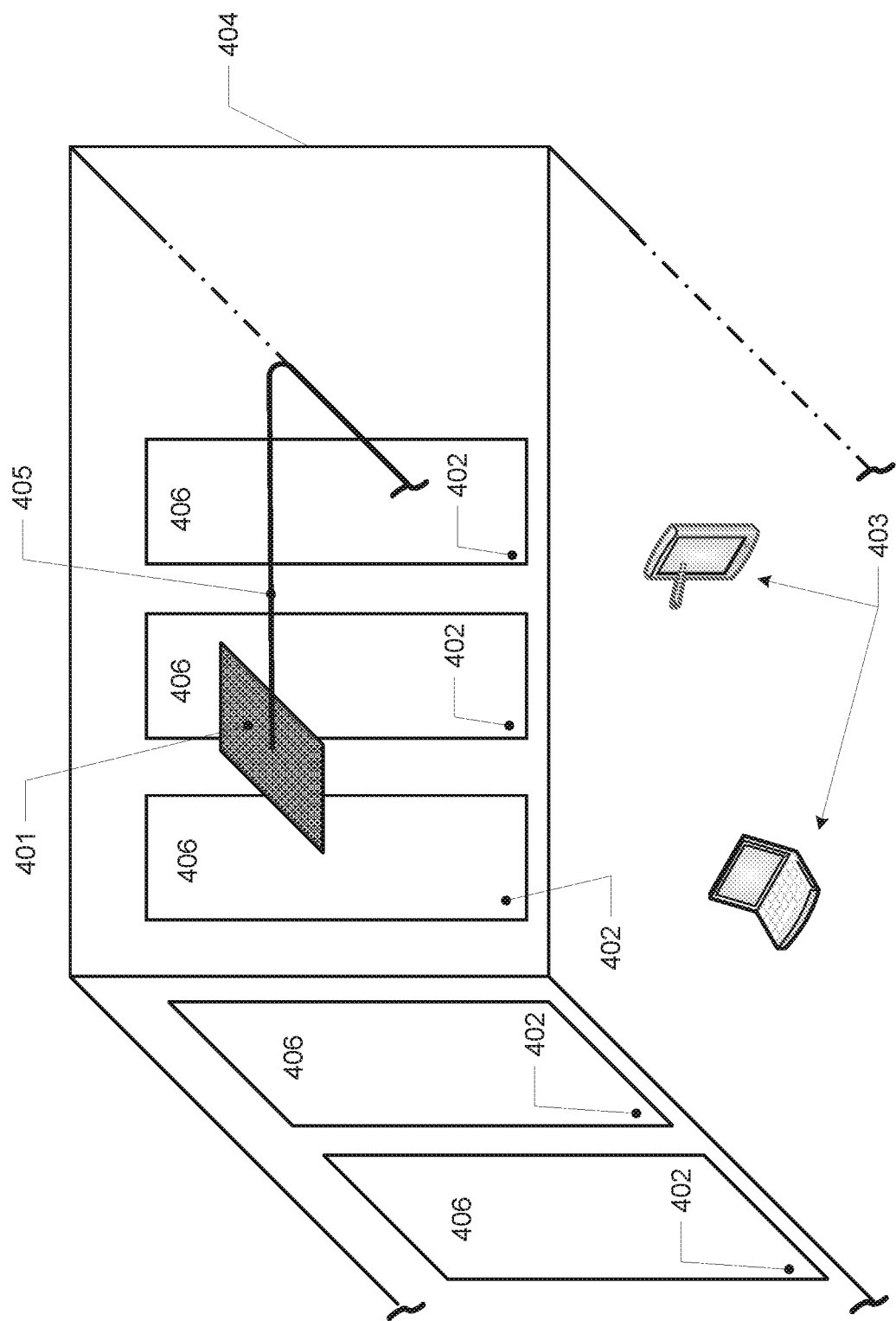
FIG. 4 depicts a schematic drawing of the interior of a room configured for wireless power transmission.

FIG. 4 depicts the interior of a room 404 that is configured for wireless power transmission (e.g., RF power transmission). The room 404 includes a plurality of electrochromic windows 406. In this example, the room 404 includes a transmitter 401 that is connected through a wire 405 to the electrical infrastructure of the building with the room 404. The transmitter 401 converts electrical power in the form of a current passing through the wire 405 into electromagnetic transmissions that are transmitted to one or more of the receivers 402 (in this case, located in the corner of each electrochromic window 406 in the room 404) that convert the electromagnetic transmissions back into an electrical signal to power their associated electrochromic devices. To reduce losses in power transmission resulting from the absorption and reflection of electromagnetic waves (particularly in the case of RF waves), transmitters may be placed in a central location such as a ceiling or a wall that preferably has line of sight to all receivers in a room. In the illustrated example, the transmitter 401 is located in a center portion of the ceiling of the room. Optionally, the transmitter 401 may be in the form of a ceiling tile or lighting fixture so as to blend in with the room's aesthetics. Electrical devices receiving wireless power transmissions typically have at least one associated receiver that can convert the electromagnetic transmissions into useable electrical energy and power. When one or more of the EC windows 406 are configured to receive power wirelessly from a transmitter 401, the transmitter 401 may also be configured to wirelessly power additional electronic devices 403 such as a laptop or mobile device having a receiver.

When power is transferred via radio waves, the RF transmitter or transmitters are typically placed in a location that is central to the devices being powered. In many cases this means the RF transmitter will be located on a ceiling or a wall in close proximity (e.g., within the range of the RF transmitter/receiver, for example, within 15 feet, within 20 feet, within 25 feet, within 50 feet, within 75 feet, within 100 feet) to the devices. For example, the RF transmitter may be located on the ceiling/wall such that it can power multiple EC windows in close proximity. In one embodiment, an RF transmitter is located alongside a master controller or is a component of the master controller. In one embodiment, an RF transmitter is integrated into a wall unit that has a user interface for controlling the tint state of the EC window. In on example, the wall unit may also perform plug-and-play window commissioning. In one embodiment, each EC window has a designated RF transmitter that is mounted to the ceiling directly in front of the window in close proximity allowing for greater power transfer. In yet another embodiment, an EC window that is powered either by wire or wirelessly may also have a transmitter with antennas on the surface of a lite. By placing antennas on a lite, the antennas tend to be located at an unobstructed point in a room. In some embodiments, this may allow for broadcasting power transmissions through both sides of the lite. In cases where the RF receiver has one or more designated RF transmitters that are not changing in location, the RF receiver may not to have to communicate the location and instructions for power transmission to the RF transmitter.

In some embodiments, the wireless receiver and/or wireless transmitter may be a component of a window controller that is part of the EC window (i.e. an onboard window controller). In some implementations, the onboard controller may be positioned on a pane of the IGU, for example, on a surface that can be accessed from the interior of the building. In the case of an IGU having two panes, for example, the onboard controller may be provided on surface S4. In some implementations, the onboard controller may be located between the lites in an IGU. For example, the onboard controller may be in the secondary seal of the IGU, but have a control panel on an outward surface, e.g., S1 or S4 of the IGU. In other cases, the onboard controller is separable from the window (e.g., dockable) and read a chip associated with a dock. In such embodiments the onboard controller may be configured in the field for the specific window to which it is associated by virtue of mating with the dock and reading the chip therein. In some embodiments, the onboard controller is substantially within the thickness of the IGU so that the controller does not protrude into the interior of the building (or exterior environment) very much. Details of various embodiments of onboard window controllers can be found in U.S. patent application Ser. No. 14/951,410, filed on Nov. 24, 2015 and titled "SELF-CONTAINED EC IGU," which is hereby incorporated by reference in its entirety.

To improve wireless transmission, RF transmitters may employ directional antenna designs in which RF transmissions are directed at a receiver. Directional RF antennas include designs such as Yagi, log-periodic, corner reflector, patch, and parabolic antennas. In some cases, antenna structures may be configured to emit waves at a particular polarization. For example, antennas may have vertical or horizontal polarization, right hand or left-hand polarization, or elliptical polarization. Elsewhere herein transmitters and receivers configured for RF transmissions (electromagnetic radiation having frequencies between about 3 kHz and about 300 GHz) are referred to as RF transmitters and RF receivers. In some embodiments, the RF transmitter and/or the RF receiver includes an array of antenna elements. For example, an RF transmitter may include an array of antennas elements that operate independently of each other to transmit controlled three-dimensional radio frequency waves which may converge in space. Waves may be controlled to form constructive interference patterns, or pockets of energy, at a location where a receiver is located through phase and/or amplitude adjustments. In certain embodiments, an array of antennas covers about 1 to 4 square feet of surface area on a flat or parabolic panel. Antennas elements may be arranged in rows, columns, or any other arrangement. In general, greater numbers of antennas allow for greater directional control of the transmitted electrical power. In some cases, an antenna array includes more than about 200 structures, and in some cases an antenna array may consist of more than about 400 structures.

In multipath embodiments, multiple transmission paths may be simultaneously used between an RF transmitter and RF receiver may be used to reduce the power transmitted along any one path, for example, to reduce power below a predefined level. Various transmission paths may arrive at a receiver by reflecting off of walls and other stationary objects. In some cases, an RF transmitter may transmit power along 5-10 paths, in some cases along 5 or more paths, and in some cases along 10 or more paths.

A typical RF transmitter may be able to deliver about 10 watts of power to a single receiver located in close proximity to the transmitter, e.g., less than 10 feet from the transmitter. If multiple devices are simultaneously powered, or if RF receivers are located at greater distances from the RF transmitter, the power delivered to each receiver may be reduced. For example, if power is transmitted simultaneously to four RF receivers at a distance of 10-15 feet, the power delivered at each RF receiver may be reduced to 1-3 watts.

In some implementations, an RF transmitter includes one or more radio frequency integrated circuits (RFICs), where each RFIC controls transmissions by adjusting the phase and/or magnitude of RF transmissions from one or more antennas. In certain embodiments, each RFIC receives instructions for controlling one or more antennas from a microcontroller containing logic for determining how the antennas should be controlled to form pockets of energy at the location of one or more RF receivers. In some instances, the location of one or more RF receivers may be passed to a transmitter by an antenna network using geo-location and positioning methods such as those described in U.S. Patent Application No. 62/340,936, filed on May 24, 2016 titled "WINDOW ANTENNAS," which is hereby incorporated by reference in its entirety. In some instances, the location of one or more RF receivers may be manually determined during installation and the RF transmitter may be configured to transmit the positions of the receivers. To receive information pertinent to delivering wireless power to electrochromic windows or other devices, an RF transmitter may be configured to communicate with a window antenna network or another network that can, e.g., provide receiver location information and other information related to power transmission. In certain embodiments, an RF transmitter includes a component for wireless communication over a protocol such as Bluetooth, Wi-Fi, Zigbee, EnOcean and the like. In certain embodiments, the same hardware used for wireless power transmission may also be used for communication (e.g., Bluetooth or Wi-Fi). In certain embodiments, the antennas of a transmitter may be simultaneously used for both power transmission and communication with RF transmissions using multi-mode.

In some embodiments, an RF transmitter may determine the location of an RF receiver that is also configured for wireless communication using a guess-and-check method. To perform the guess-and-check method, an RF transmitter first transmits a plurality of power transmissions where each transmission corresponds to a different location in 3D space, thus performing a rough sweep of RF receivers in close proximity to the RF transmitter. If a receiver receives power, it then communicates with the transmitter confirming the successful power transmission. In some cases, the RF transmitter is also informed of the quantity of power that was received by the receiver. An RF transmitter may then repeat the guess-and-check for a plurality of points in 3D space in close proximity to points of successful power transmission to determine optimal transmission settings for delivering power wirelessly to an RF receiver.

In some embodiments, an RF transmitter includes an array of planar inverted-F antennas (PIFAs) integrated with artificial magnetic conductor (AMC) metamaterials. The PIFA design can provide a small form factor, and AMC metamaterials can provide an artificial magnetic reflector to direct the orientation that energy waves are emitted. Further information regarding how PIFA antennas may be used with AMC metamaterials to create a transmitter can be found in US Patent Application titled "Integrated Antenna Arrays for Wireless Power Transfer," having Publication No. 20160020647, published Jan. 21, 2016, which is hereby incorporated by reference in its entirety.

Figure 5:
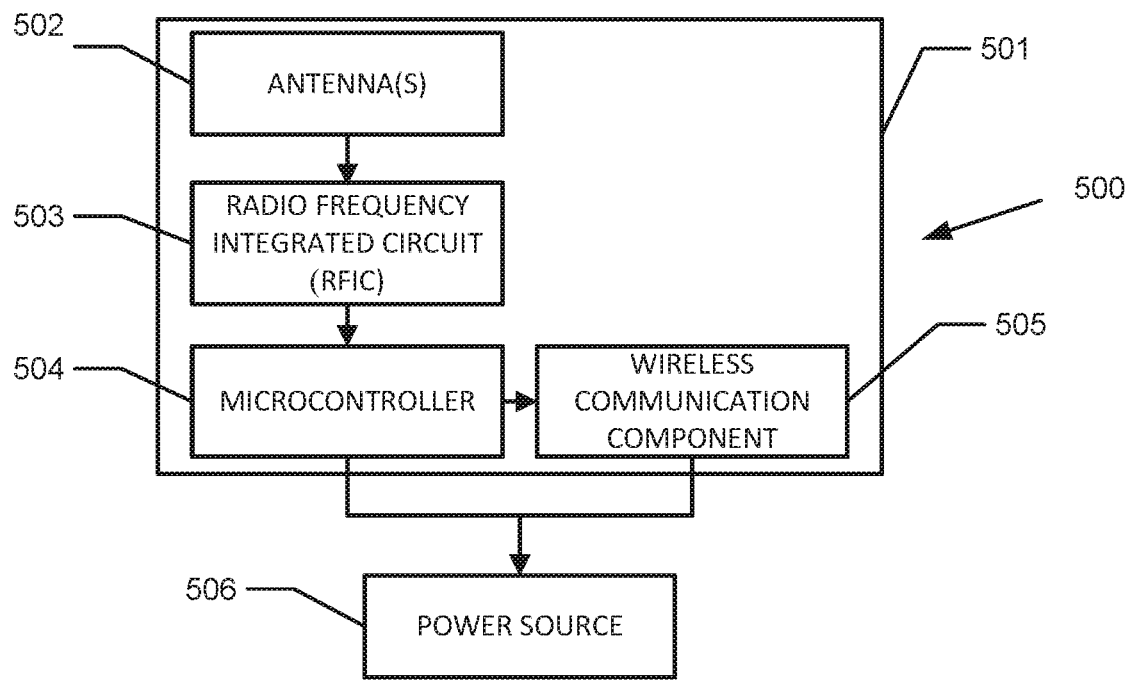
FIG. 5 depicts a schematic drawing of components of an RF transmitter structure.

FIG. 5 illustrates the components of an RF transmitter 500. The RF transmitter is encased by a housing 501, which may be made from any suitable material that does not substantially impede the passage of electromagnetic waves such as plastic or hard rubber. Inside the housing 501, the RF transmitter 500 contains one or more antennas 502 that may be used to transmit radio frequency waves in bandwidths, e.g., that conform with Federal Communications Commission (or other governmental regulator of wireless communications) regulations. The RF transmitter 500 further includes one or more RFICs 503, at least one microcontroller 504, and a component for wireless communication 505. The RF transmitter 500 is connected to a power source 506, typically the wired electrical infrastructure of a building.

In some cases, the component for wireless communication 505 may include a micro-location chip allowing the RF transmitter's position to be determined by an antenna network that communicates via pulse-based ultra-wideband (UWB) technology (ECMA-368 and ECMA-369). When a receiver is equipped with a micro-location chip the relative position of a device having the receiver may be determined within 10 cm, and in some cases within 5 cm. In other cases, the component for wireless communication 505 may include an RFID tag or another similar device.

Wireless power receivers (e.g., RF receivers) may be located in a variety of locations within close proximity to a transmitter to receive wireless power transmissions, such as a location within the same room as a transmitter. In the case of a receiver paired to an electrochromic IGU, the receiver may be an onboard receiver that is structurally attached to the IGU. An onboard receiver may be located in a window controller, located in a cartridge attached connected to the window controller, located proximate the IGU (e.g., inside the frame of the window assembly), or located a short distance away from an IGU but electrically connected to the window controller. In some cases, an onboard receiver may be located within the secondary seal or within a spacer of an IGU.

In some implementations, the antennas of an onboard receiver are located on one or more lites of an IGU. By placing antennas on surfaces of the lites of the windows, the antennas are usually located at an unobstructed vantage point in a room and may receive power transmissions through both sides of the IGU.

In certain implementations, an onboard receiver is located on the lite and wired to the window controller located in a pod sitting in the wall. The pod in the wall can be made to be serviceable. For example, during installation, the dongle with the window controller can be dropped into the notch in the wall. In certain implementations, the onboard receiver is built upon a non-conductive substrate (such as flexible printed circuit board) onto which antenna elements are printed, etched, or laminated, and the onboard receiver is attached to the surface of a lite of the IGU.

In some implementations, when one or more IGUs are configured to receive power wirelessly from a transmitter, the transmitter is also configured to wirelessly power additional electronic devices such as a laptop or other mobile device.

Figure 6:
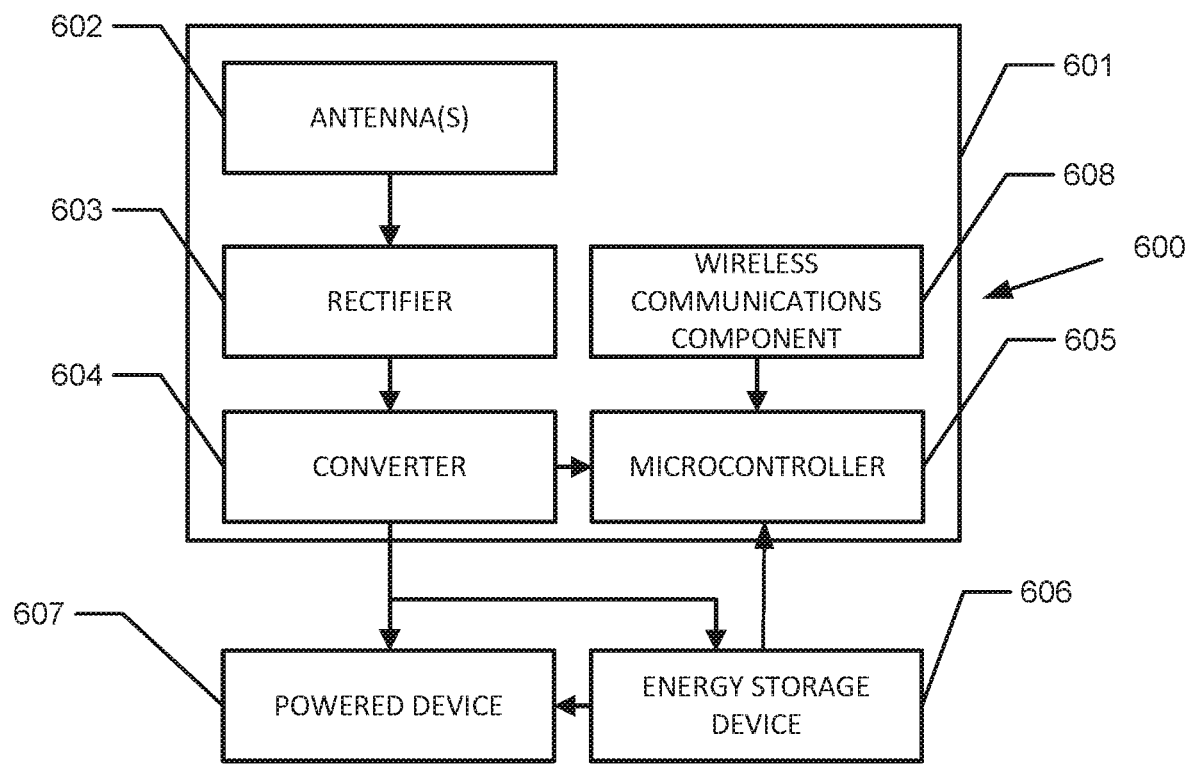
FIG. 6 depicts a schematic drawing of components of an RF receiver structure.

FIG. 6 is a block diagram depicting the structure of a wireless RF receiver 600 that may be used with electrochromic windows. Similar to the RF transmitter, the RF receiver includes one or more of antenna 602 that may be connected in series, parallel, or a combination thereof, to a rectifier. In operation, the antenna elements 602 pass an alternating current signal corresponding to the alternating RF waves that have been received to a rectifying circuit 603, which converts the alternating current voltage to a direct current voltage. The direct current voltage is then passed to a power converter 604, such as a DC-DC converter that is used to provide a constant voltage output. Optionally, the receiver 600 further includes or is connected to an energy storage device 606 such as a battery or a supercapacitor that stores energy for later use. In the case of an onboard receiver of a window, the receiver 600 and/or energy storage device 606 may be connected to a powered device 607, which may include one or more of a window controller, window antennas, sensors associated with the window, and an electrochromic device. When the RF receiver includes or is connected to an energy storage device, a microcontroller or other suitable processor logic may be used to determine whether received power is used immediately by the powered device 607 or is stored in the energy storage device 606 for later use. For example, if an RF receiver harvests more energy than is currently needed by a powered device (e.g., to tint a window), the excess energy may be stored in a battery. Optionally, the RF receiver 600 may further include a wireless communication interface or module 608 configured to communicate with a window network, an antenna network, a BMS, etc. Using such a communication interface or module, the microcontroller or other control logic associated with the receiver 600 can request power to be transmitted from a transmitter. In some embodiments, the RF receiver includes a micro-location chip that communicates via pulse-based ultra-wideband (UWB) technology (ECMA-368 and ECMA-369), thereby allowing the RF receiver's position to be determined by, e.g., a window or antenna network, which can provide the location to the transmitter. Other types of locating devices or systems may be employed to assist the RF transmitter and associated transmission logic to wirelessly deliver power to the appropriate locations (the locations of the receivers).

In some cases, some or all of the components of the RF receiver 600 are contained in a housing 601, which may be made from any suitable material for allowing electromagnetic transmissions such as plastic or hard rubber. In one case, an RF receiver shares a housing with a window controller. In some instances, the wireless communications component 608, microcontroller 605, converter 604, and energy storage devices 606 have shared functionality with other window controller operations.

As explained, a receiver (e.g., an RF receiver) may have a component that provides location information and/or instructs a transmitter to transmit power. In some instances, the receiver or a nearby associated component such as an electrochromic window or window controller provides the location of a receiver and/or instructs the transmitter where power transmissions are to be sent. In some embodiments, a transmitter may not rely on instructions from a receiver to determine power transmissions. For example, a transmitter may be configured during installation to send power transmissions to one or more specified locations corresponding to the placement of one or more receivers at fixed positions or at movable positions that relocate at specified time intervals. In another example, instructions for power transmissions may be sent by a module or component other than the receiver; e.g., by a BMS or a remote device operated by a user. In yet another example, instructions for power transmissions may be determined from data collected from sensors, such as photosensors and temperature sensors, from which a relationship has been made to the power needs of electrochromic windows.

The antenna array of an RF receiver may include antenna elements having distinct polarizations, for example, vertical or horizontal polarization, right hand or left-hand polarization, or elliptical polarization. When there is one RF transmitter emitting RF signals of a known polarization, an RF receiver may have antenna elements of a matching polarization. In cases when the orientation of RF transmission is not known, the antenna elements may have a variety of polarizations.

Figure 7:
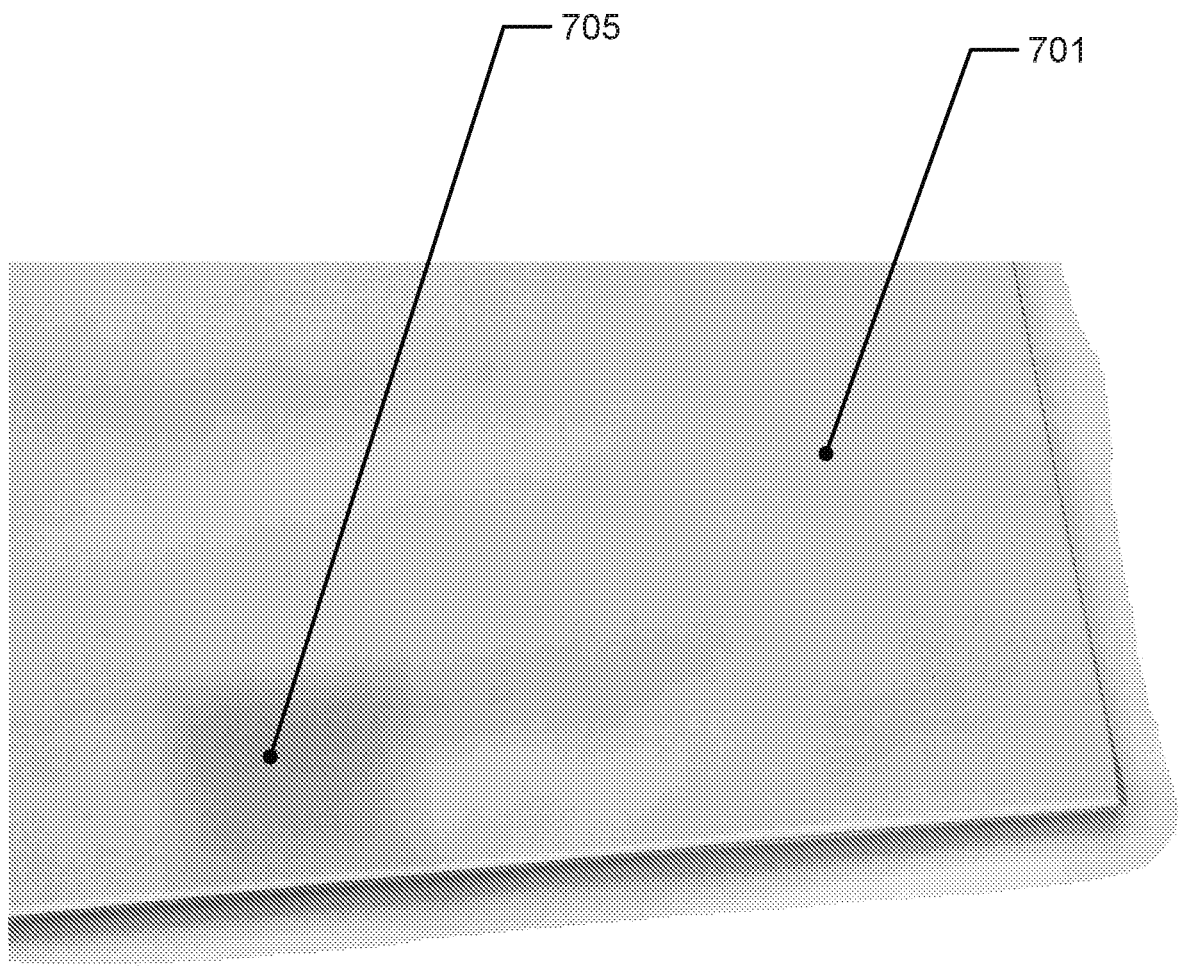
FIG. 7 depicts an illustration of a patch antenna on a glass substrate, according to an embodiment.

In certain embodiments, an RF receiver includes an array of antenna elements (also referred to an antenna array) comprising between about 20 and 100 antenna elements that, as a group, are capable of delivering between about 5 to 10 volts to powered devices. In some cases, the RF receiver has an array of antenna elements in the form of patch antennas having length and width dimensions. In one example, the length and width of a patch antenna is in a range from between about 1 mm and about 25 mm. A patch antenna can be located on a transparent substrate of a EC window. Using antenna arrays (transmitter and/or receiver) on the transparent substrate provides bi-directional transmission and can enable unobstructed transmission since the window is typically located in an unobstructed point in a room. FIG. 7 is a photograph of a patch antenna 705 on a glass substrate 701. In other cases, other antenna designs are used including meta-material antennas, and dipole antennas. In some instances, the spacing between antennas of a RF receiver is extremely small; for example, between 5 nm and 15 nm. Antennas for higher frequency in the gigahertz range are relatively small, for example, 2-3 inches in either direction.

Wireless power transmission configurations enable window powering that could not otherwise be attained. For instance, in some systems, a trunk line (e.g., a 24 V trunk line) is used to route power throughout a building, intermediate lines (often referred to as drop lines) connect the local window controllers to the trunk line, and a window line connects the window controllers to the windows. According to one aspect, EC windows are powered by wireless power transmission and each window includes a local power storage device. In this case, the trunk lines are not needed at the EC window.

Wireless power transmission enables building power systems that could not otherwise be attained. For instance, in some building systems, a trunk line (e.g., a 24 V trunk line) is used to route power throughout a building, intermediate lines (often referred to as drop lines) connect the local window controllers to the trunk line, and a window line connects the window controllers to the windows. According to one aspect, certain EC windows are powered by wireless power transmission and each window includes a local power storage device for storing power until needed. In this case, the trunk lines are not needed at the EC window. The local power storage device can optionally have a charging mechanism such as, for example, a trickle charging mechanism. The charging mechanism may be based on wireless power transmissions or wired. Generally the use of wireless power (and communication) transmission eliminates the need for the expensive cables that can carry both power and communication.

IV. Some Examples of Wireless Power Transmission Network Configurations

Electrochromic windows are often part of a large window network in which power transmission is coupled to the network infrastructure. Since window networks may have various sizes and applications, there may be various configurations in which wireless power may be implemented within a window network. In some cases, only one segment between nodes of a power transmission network may be wireless, and in some cases, there may be multiple cascading segments of a power transmission network in which power is transmitted wirelessly. A window network may also interface with other networks or devices that power may be transmitted to or received from. For the purpose of illustration, several configurations of power transmission networks in a building will now be described. These configurations are not meant to be limiting. For example, additional configurations may include combinations of the configurations described below or elsewhere herein. While these illustrative examples are given in the context of a building, one of skill in the art may easily understood how analogous configurations may be implemented for applications such as automobiles, planes, boats, trains, and the like.

In each of these configurations, the device to be wirelessly powered (e.g., a window or a mobile device) has a receiver, which may be part of a single component or may be separate components. In addition to receiving wireless power, the receiver may also be configured to send and/or receive communication signals. For example, the receiver may be configured to broadcast omnidirectional beacon signals that are received by a wireless power transmitter (e.g., by reflecting off surfaces or directly propagating). These signals received by the transmitter can be used to inform the wireless power transmitter of the paths to return wireless power transmissions to the device to be charged.

Configuration I

In a first power transmission network configuration, one or more electrochromic windows in a window network and/or one or more other devices (e.g., mobile devices) are each configured with a receiver to receive wireless power broadcast from a remote transmitter (e.g., a remote transmitter acting as a standalone base station). The remote transmitter is wired to the electrical infrastructure of the building and/or has its own power source. Typically, each receiver will have an energy storage device within which the wirelessly transmitted power may be stored until it is used by the electrochromic window(s) and/or device(s). By supplying power to operate a window from the energy storage device such as a battery, power may be wirelessly transmitted at lower levels than is required for operation of the electrochromic window(s) or mobile device(s). Although the windows are described in many examples herein as being in the form of IGUs, other implementations could include windows in the form of a laminate structure.

An embodiment of this first power transmission network configuration is illustrated in FIG. 4. As depicted in FIG. 4, a single transmitter 401 may be configured to deliver power transmissions to a specific set of EC windows, for example, the EC windows 406 having receivers 402 in the room 404. In one implementation, a designated transmitter 401 may also be configured to power additional electronic mobile devices 403 such as phones, tablets, or laptops. In some embodiments such as when inductive coupling is used as describe elsewhere herein, the remote transmitter may be very close to a receiver (e.g., less than 6 inches) while in other cases such as when power is transmitted wirelessly using RF or microwaves, the remote transmitter may be much farther away from its intended receiver (e.g., 15-30 feet). In the latter cases, the transmitter may be located in or on a wall, the ceiling (as depicted in FIG. 4) or on a shelf, desktop or on the floor of the space. In some cases, a window network may have a plurality of transmitters in which the transmitters are configured such that each receiver only receives power from one transmitter. In some cases, two or more transmitters may be configured to broadcast wireless power transmission to a single receiver.

In some implementations described herein, the transmitter is an RF transmitter manufactured by a company such as Powercast Corporation, Energous Corporation, or is the Cota™ system made by Ossia™. In certain cases, the RF transmitter may initially receive an omnidirectional beacon signal broadcast from the receiver of the device to be wirelessly powered. By computing the phase of each of the incident waves of the beacon signal, a transmitter may determine the position of the receiver of the device to be wirelessly powered, thus informing the directionality of RF power transmissions. In some cases, a remote transmitter may broadcast power along the reflection of each of the incident waves of the beacon signal. In other cases, the remote transmitter may broadcast power along optimal reflection paths, for example, of incident waves with the strongest signals received by the RF transmitter. In these cases, a remote transmitter may broadcast focused RF waves along a plurality of different beam paths, each of which may reflect off surfaces (e.g., walls and ceilings) before reaching a receiver of the device to be wirelessly powered, such that power may be transmitted around obstacles between the remote transmitter and the receiver of the device to be wirelessly powered. By transmitting power along multiple pathways, the power transmitted along each pathway may be significantly less than the total power transferred wirelessly to a receiver.

In other cases, an RF receiver of the device to be wirelessly powered broadcasts multiple unidirectional beacon signals in different directions at different times. An RF transmitter receives the unidirectional beacon signal(s) and is configured to compute the phase of each of the incident waves of the beacon signal to determine the directionality of the paths of RF power transmissions and/or the position of the receiver. In one implementation, the remote RF transmitter may broadcast power back along the path (e.g., reflection path or direct propagation path) of each of the incident waves of the beacon signal. In another implementation, the remote transmitter may broadcast power along certain optimized paths, for example, of incident waves with the strongest beacon signals received by the RF transmitter. In this implementation, the power of the transmissions may depend on the number of optimized paths. In either of these implementations, the remote transmitter can broadcast focused RF waves along a plurality of different beam paths. Some of these paths may reflect off surfaces (e.g., walls and ceilings) before reaching the receiver of the device to be wirelessly powered, such that power may be transmitted around obstacles between the remote transmitter and the powered device. By transmitting power along multiple pathways, the power transmitted along each pathway may be significantly less than the total power transferred wirelessly to a receiver of the powered device.

Figure 13A:
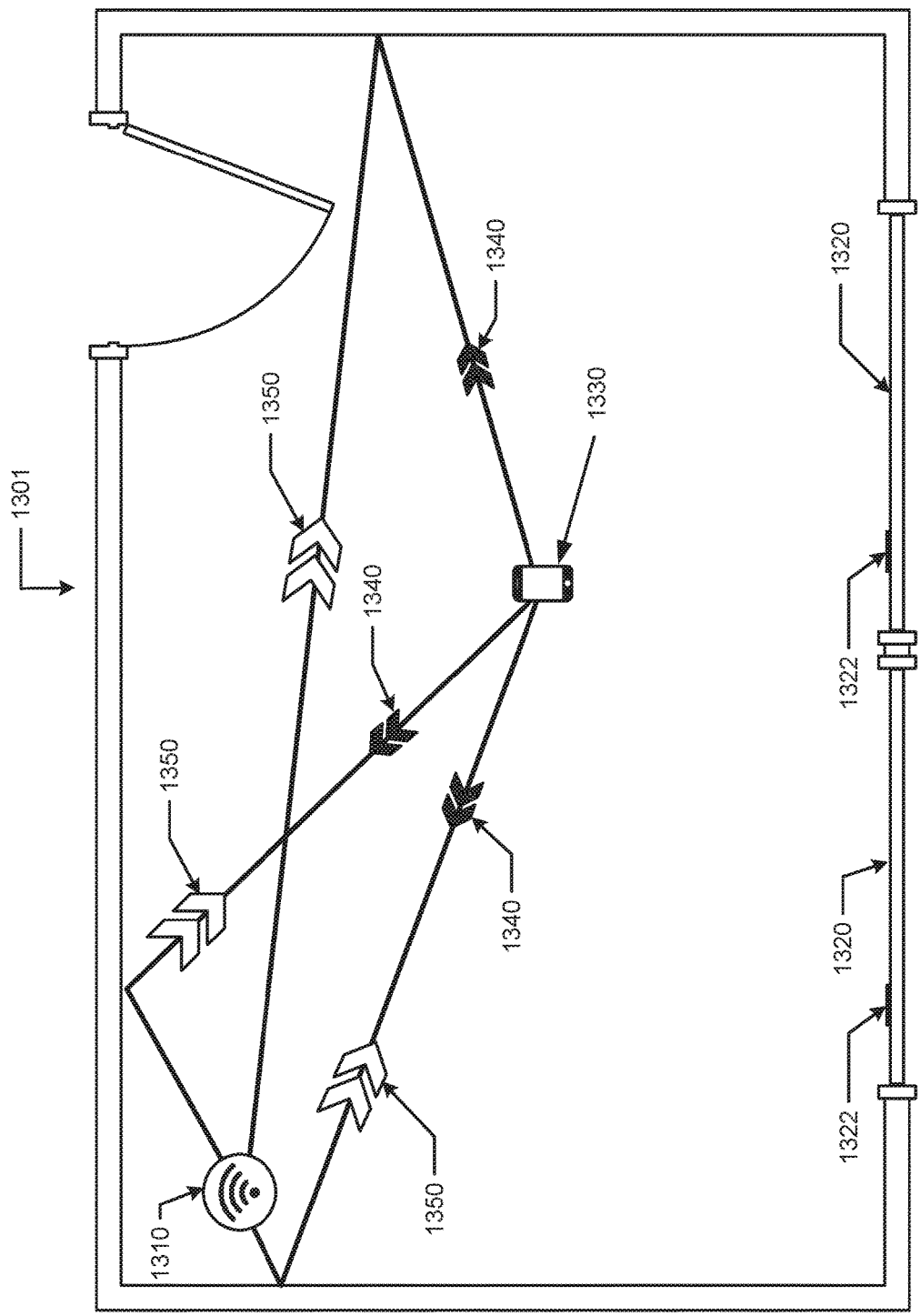
FIG. 13A depicts a schematic drawing of a top view of an interior of a room configured for wireless power transmission with a remote transmitter of a standalone base station.
Figure 13B:
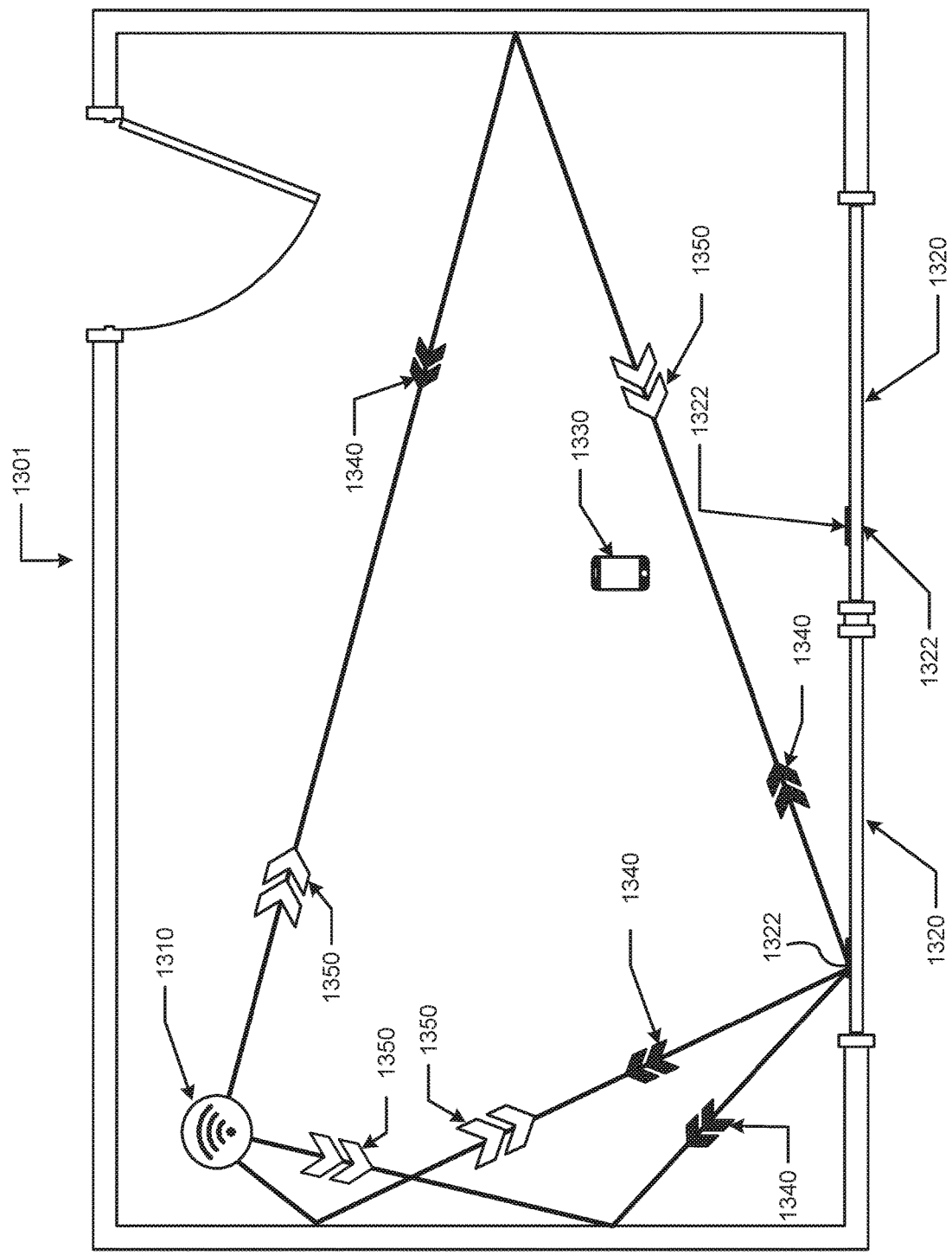
FIG. 13B depicts another schematic drawing of the top view of the interior of the room configured for wireless power transmission of FIG. 13A.

Another embodiment of this first power transmission network configuration is illustrated in FIGS. 13A and 13B. In this illustrated embodiment, depicts a top view of a room 1301 having a transmitter 1310 (e.g., RF transmitter) acting as a standalone base station. The transmitter or standalone base station 1310 is configured to power the IGUs 1320 wirelessly and/or power other devices having receivers such as the mobile device 1430 depicted as a cell phone, although other mobile devices may be implemented. A similar embodiment with a standalone base station may be implemented to power a curtain wall of IGUs in a room, for example.

FIGS. 13A and 13B depict schematic drawings of a top view of the room 1301 that is configured for wireless power transmission, including a RF transmitter or standalone base station 1310. Room 1301 includes two IGUs 1320 along a wall and a mobile device 1330 in the form of a cell phone. Although not shown, other devices with receivers may be in the room 1301. Each of the IGUs 1320 has a receiver (e.g., an RF receiver) configured on the glass of the IGU 1322. In other implementations, the receivers 1322 may be located within the IGUs 1320 (e.g., in the secondary seal of the IGUs), in or on a framing element, or in or on the wall adjacent the IGUs 1320. The mobile device 1330 has a receiver such as an RF receiver. The RF transmitter or standalone base station 1310 may be connected to the electrical infrastructure of the building and/or have an internal power source. The RF transmitter or standalone base station 1310 is configured to convert electrical power into electromagnetic transmissions. Devices, such as the IGUs 1320 and the mobile device 1330, have at least one associated receiver, configured to convert the electromagnetic transmissions from the standalone base station 1310 into an electrical signal to power their associated devices into useable electrical energy and power. In the illustrated example, the standalone base station 1310 is located in a corner of the room 1301. According to another implementation similar in certain respects to the example illustrated FIG. 4, to reduce losses in power transmission resulting from the absorption and reflection of electromagnetic waves (particularly in the case of RF waves), the standalone base station may be placed in a central location such as in the middle of the ceiling or the center of a wall that may have a more clear line of sight (less obstructed) to receivers in the room 1301.

FIG. 13A depicts an instance when the RF transmitter or standalone base station 1310 is receiving incident waves from an omnidirectional beacon signal broadcast from a receiver of the mobile device 1330. In some cases, a user may request the initiation of wireless charging via an application on the mobile device 1330 that causes the mobile device 1330 to broadcast a substantially omnidirectional beacon signal. The three arrows 1340 depict the direction of the substantially omnidirectional beacon signal along the pathways that successfully reach the standalone base station 1310 as the waves of the omnidirectional beacon signal are reflected from the walls of the room 1301. By computing the phase of the waves received at the standalone base station 1310, the corresponding directions of the power transmission from the RF transmitter or standalone base station 1310 can be determined. The three arrows 1350 depict the directions along the return pathways of power transmission back to the receiver of the mobile device 1330. The arrows 1340 and arrows 1350 illustrated how the directions of the waves of the received beacon signal can be used to determine the pathways used to deliver power wirelessly to the mobile device 1330.

The receivers 1322 may be in or on the window controllers or otherwise associated with IGUs 1320. In this example, the receivers 1322 are also configured to broadcast a substantially unidirectional beacon signals to provide the RF transmitter or standalone base station 1310 with transmission paths for wireless power transfer. If the base station 1310 is moved, or the window or associated power receiver moves, then the beacon method can be a useful reconfiguration method as the wireless power emanations can be automatically updated. FIG. 13B depicts an instance when RF transmitter or standalone base station 1310 is receiving incident waves from an omnidirectional beacon signal broadcast from the receiver 1322 of one of the IGUs 1320. The instantaneous energy paths, power and beacon signals, shown in FIGS. 13A and 13B may occur simultaneously or at different times. In FIG. 13B, the three arrows 1340 depict the directions along the return pathways of power transmission back to the receiver of the mobile device depict the directions of the beacon signal along pathways that successfully reach the RF transmitter or standalone base station 1310 as the beacon signal is reflected from the walls of the room 1301. By computing the phase of each of the incident waves of the omnidirectional beacon signal, the pathways of the power transmission can be determined. The three arrows 1350 depict the directions along the return pathways of power transmission back to the receiver 1322 of one of the IGUs 1320.

Another embodiment of this first power transmission network configuration is shown in FIG. 2B. As depicted in FIG. 2B, a window with a receiver 204 may receive power from a transmitter 202, which is electrically connected to additional windows 205 such that these additional windows receive power through a window having a receiver. In the embodiment described in relation to FIG. 2B, the window 204 need not be at the end of a linear chain of windows, e.g., it can be anywhere in a linear chain of windows or, e.g., serve as a central receiver hub to other windows in a star network topology, ring network topology and the like (not shown in FIG. 2). Fully interconnected (meshed) wireless power networks of windows are also within the scope of embodiments herein, e.g., where each window includes a wireless power transmitter and receiver. An external power transmitter, e.g., remote from window network, transmits power to one or more of the windows in the network. In turn, one or more windows of the network can transmit power and/or receive power from other windows in the network. This configuration may add cost but allow for greater flexibility in powering schemes and redundancy for potential blockages of wireless power signals.

Configuration II

In a second power transmission network configuration, one or more of the electrochromic windows of the network has a transmitter and can act as a base station configured to wirelessly power devices. For example, an IGU with a wireless power transmitter can act as an IGU base station powering other IGUs and/or devices such as mobile devices. Each IGU base station (also referred to herein as a "source window" or as a "window base station") has an associated transmitter that is configured to deliver power wirelessly to receivers. Generally, the IGU base station is servicing devices with receivers within a predefined range of the wireless transmitter at the IGU. The receivers may also be configured to send a substantially omnidirectional beacon signal. In one implementation, a curtain wall has one or more wireless-powering base station IGUs configured to deliver power wirelessly to other IGUs in the curtain wall that are equipped with a receiver. Generally, the receiving electrochromic window or device has an energy storage device in which the wirelessly transmitted power may be stored until it is used by the electrochromic window or the other device such as a mobile device. By supplying power to operate the window or device from an energy storage device such as a battery, power may be wirelessly transmitted at lower levels than is required for operation of the electrochromic window or mobile device. In some cases, wireless power transmitting windows may also include a photovoltaic power source, e.g., an integrated transparent PV film and/or a power feed from a remote PV array. In addition or alternatively, the electrochromic window and/or window controller may also receive power from a conventional power supply.

Figure 8:
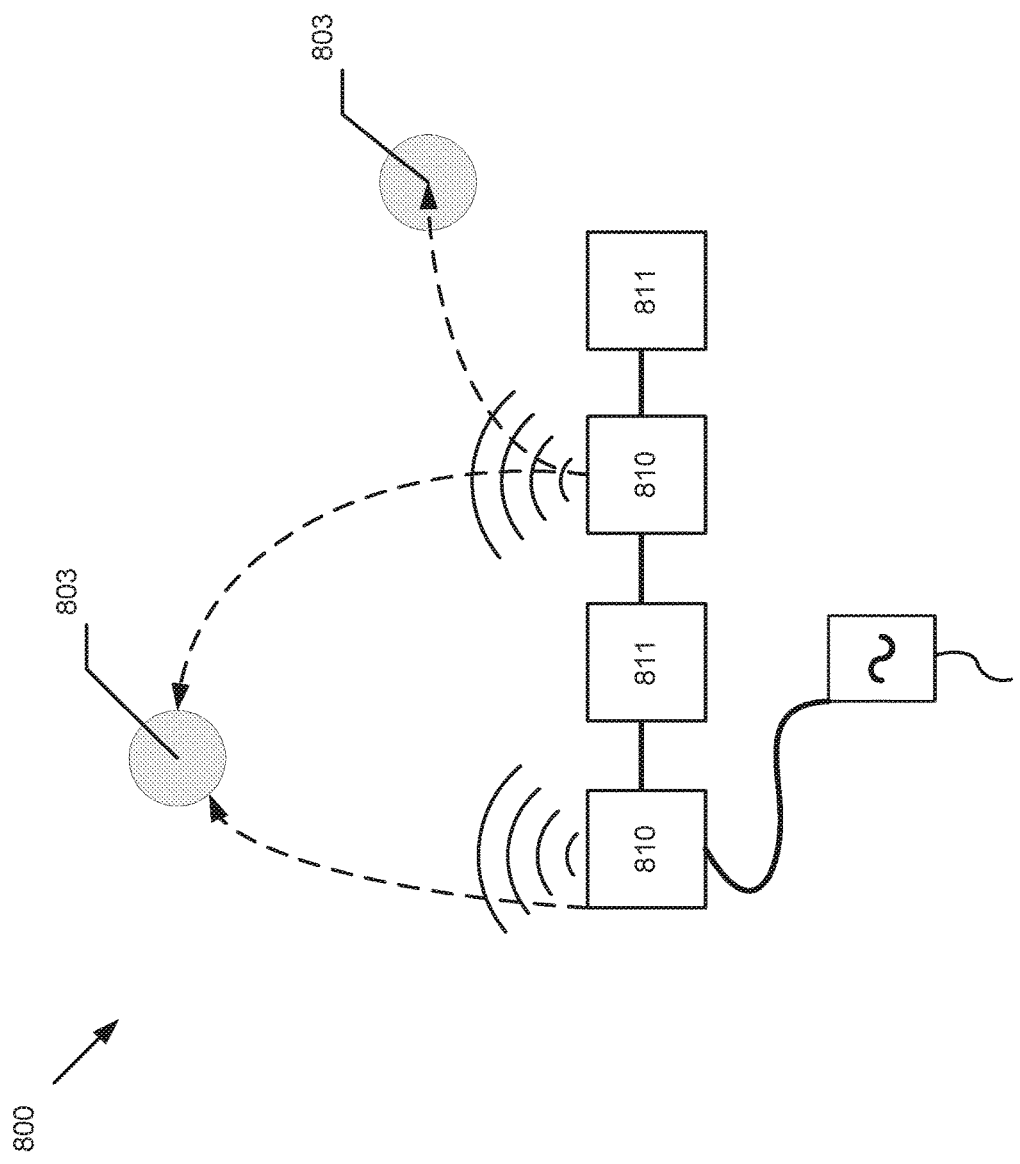
FIG. 8 depicts a schematic drawing of electrochromic windows that are configured to wirelessly transmit power to other electronic devices.

One implementation of the second power transmission network configuration is illustrated in FIG. 8. In this illustrated example, a window network 800 has electrochromic windows 810 (in this example linked to a central power source 820) configured with transmitters to broadcast power wirelessly to other electronic devices 803. Each of the electronic devices 803 is equipped with a remote wireless receiver such as cellular devices and laptops in close proximity to the window network. In some cases, a transmitter may be located inside a window controller. In some cases, a transmitter may be attached to a window frame, in a window frame, in the secondary seal of an IGU, in the spacer of an IGU, or in close proximity to a window (e.g., on a nearby wall). In some cases, such as when power is transmitted wirelessly using RF, the antenna array of a transmitter may be on the surface (e.g., viewable portion) of a window lite as described elsewhere herein. In some embodiments, a transmitter may be configured to broadcast power signals out of both sides of a lite. Windows configured for transmitting wireless power may be powered by wire through the electrical infrastructure of a building 820 or in some cases they may be powered wirelessly, for example by inductive coupling. Optionally, the window network 800 also includes additional electrochromic windows 811 that are not configured with a wireless power transmitter. In the illustrated example, the additional electrochromic windows 811 are electrically connected through wires to the electrochromic windows 810 to receive power. In another implementation, the additional electrochromic windows 811 may additionally or alternatively have receivers configured to receive wireless power transmissions from the electrochromic windows 810.

Figure 14A:
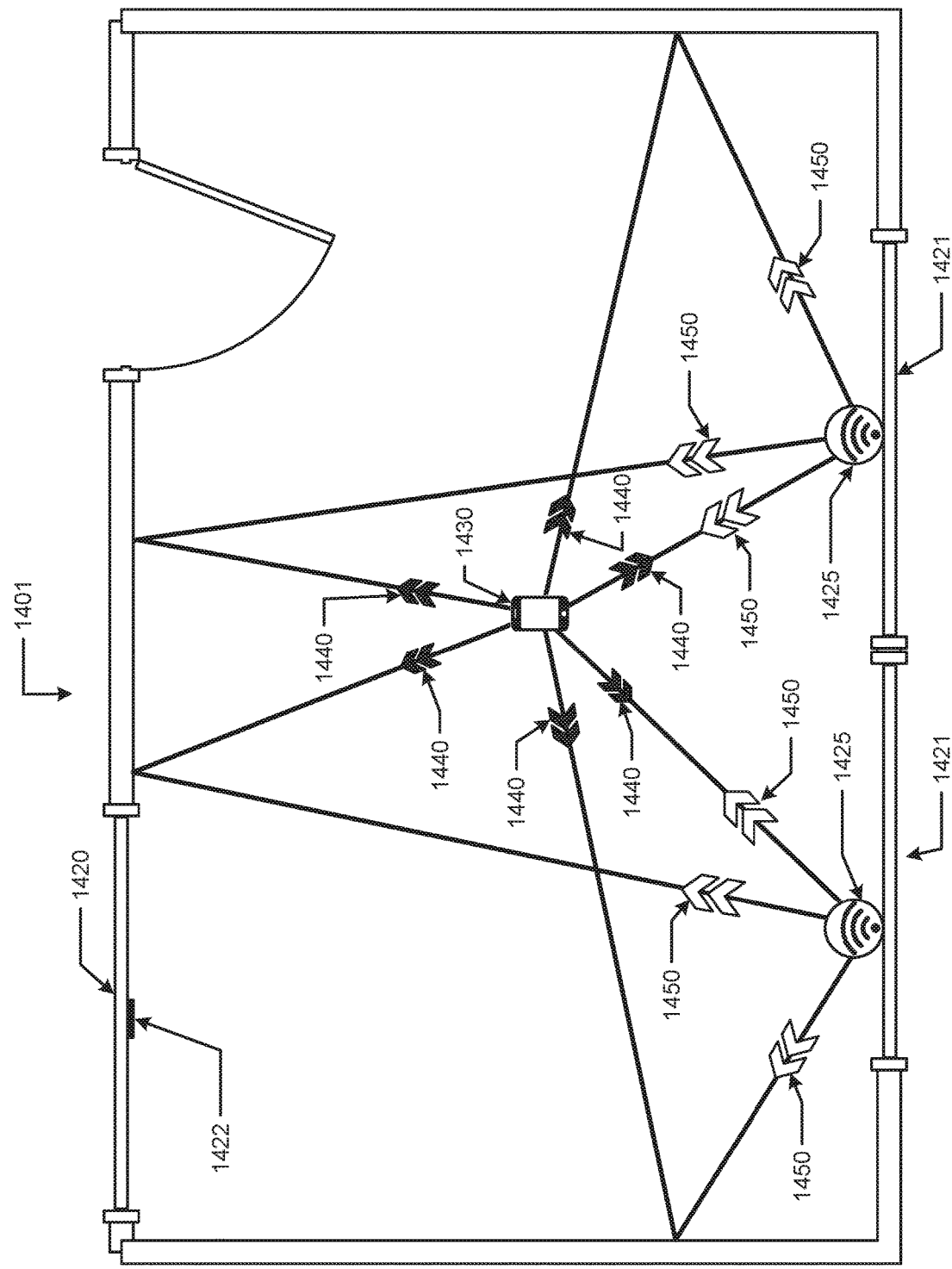
FIG. 14A depicts a schematic drawing of a top view of a room having IGU base stations configured for wireless power transmission of other IGUs and mobile devices.
Figure 14B:
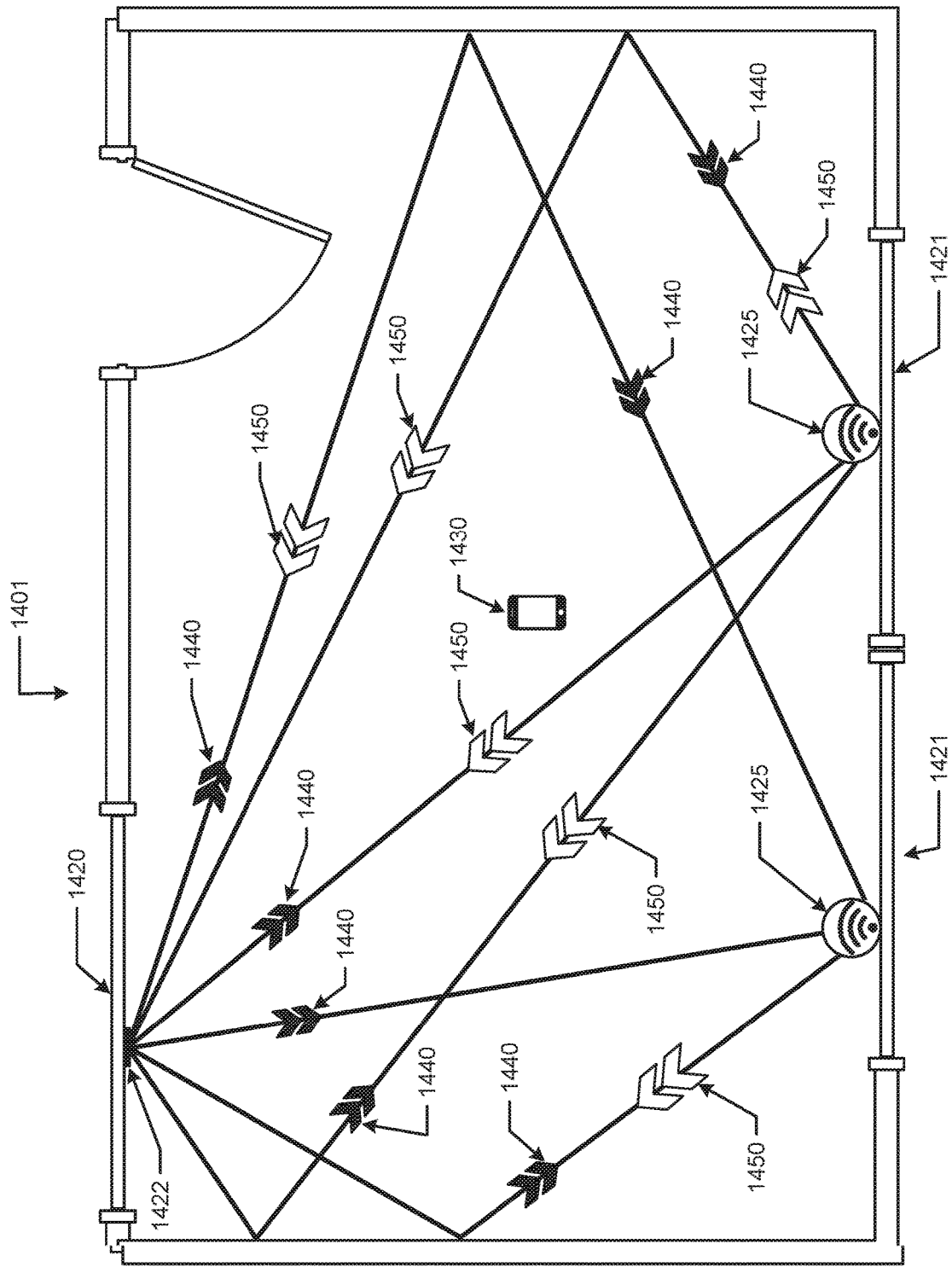
FIG. 14B depicts another schematic drawing of the top view the room configured for wireless power transmission of FIG. 14A.

Another embodiment of the second power transmission network configuration is illustrated in FIGS. 14A and 14B. FIG. 14A and FIG. 14A depict schematic drawings of a top view of a room 1401 configured for wireless power transmission. In the illustrated example, the room 1401 includes two IGUs 1421 with transmitters (e.g., RF transmitters) 1425 acting as IGU base stations in a first wall. The room 1401 also includes an IGU 1420 in an opposing wall with a receiver 1422 (e.g., an RF receiver) for receiving wireless power. The two transmitters 1425 are configured to wirelessly power the other IGU 1420 and/or other devices having a receiver (e.g., an RF receiver) such as the mobile device 1430. Although the mobile device 1430 is depicted here as a cell phone, it would be understood that other mobile devices could be implemented. The transmitters 1425 on IGUs 1421 may be connected to the electrical infrastructure of the building and/or have an internal power source. The transmitters 1425 are configured to convert electrical power into electromagnetic transmissions that are received by one or more receivers that convert the wireless power into electrical current to power their associated devices.

FIG. 14A depicts an instance when the transmitters 1425 are receiving incident waves from the mobile device 1430. According to one aspect, a user may request the initiation of wireless charging via an application on the mobile device 1430, which causes the mobile device 1430 to generate a substantially omnidirectional beacon signal. The four arrows 1440 depict the direction of the beacon signal along several pathways that successfully reach the transmitters 1425 as the beacon signal is reflected from the walls of the room 1401. By computing the phase of the incident waves received at the transmitters 1425, the corresponding paths of the power transmission can be determined. The four arrows 1450 depict the return paths that may be used to deliver power wirelessly to the mobile device 1430.

FIG. 14B depicts an instance when the transmitters 1425 are receiving incident waves from a substantially omnidirectional beacon signal broadcast from a receiver 1422 disposed on the IGU 1420. The events depicted in FIGS. 14A and 14B may occur simultaneously or at different times. In FIG. 14B, the arrows 1440 depict the direction of the omnidirectional beacon signal along six paths that successfully reach the transmitters 1425 of the transmitters 1425. In some cases, these paths may reflect off of the walls or other objects and in other cases these paths may go directly between the receiver 1422 and the transmitters 1425. By computing the phase of each of the incident waves, the path of the power transmission can be determined. The arrows 1440 and 1450 depict how power can be transmitted back along the same paths of the received beacon signal to deliver wireless power to the receiver 1422 of the IGU 1420.

Configuration III

In a third power transmission network configuration, a window network has one or more source windows (also referred to herein as "window base stations" or "IGU base stations) and one or more receiving windows. The one or more source windows are configured to distribute power wirelessly to the window network. Typically, the source windows are configured to receive power from the electrical infrastructure of a building by wire, or wirelessly (e.g., via RF or inductive coupling) from a transmitter. Additional receiving windows in the window network are powered through a receiver that converts wireless power transmissions from one or more of the source windows back into electrical energy. Typically, receivers have an associated energy storage device in which the wirelessly transmitted power may be stored until power is needed to enable power to be transmitted at lower levels than may be required to operate a window transition. According to one aspect, a window network may have one or more windows having both a receiver and a transmitter such that they can both receive and broadcast wireless power transmissions.

Figure 9:
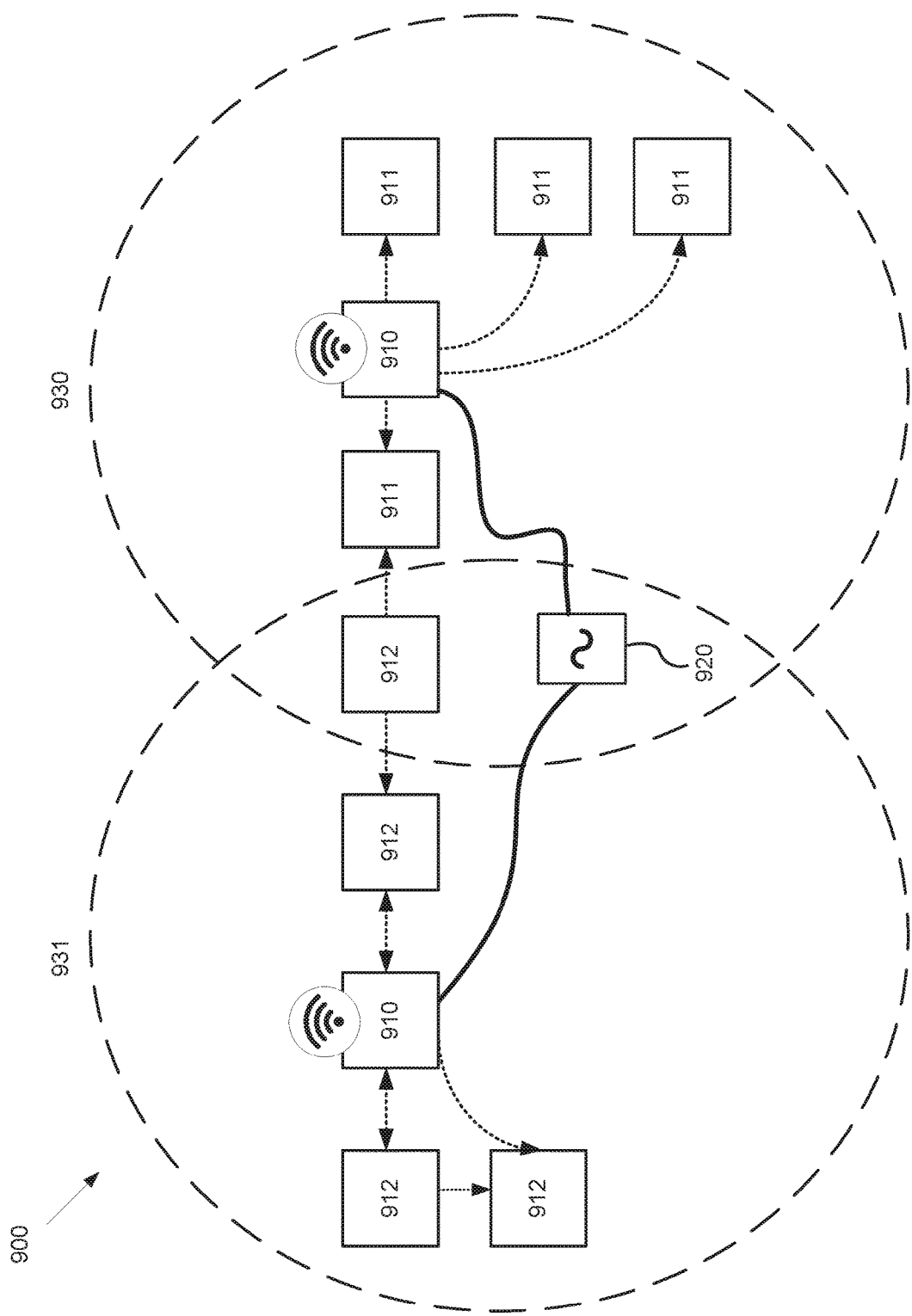
FIG. 9 depicts a schematic drawing of a window network in which power is wirelessly transmitted between windows.

An embodiment of the third power transmission network configuration is illustrated in FIG. 9. As depicted in FIG. 9, the window network 900 has one or more source windows 910 that are used to distribute power wirelessly to the window network and, e.g., mobile devices or other devices in the space having a receiver. The window network 900 has two wireless power distribution areas 930 and 931, which may, e.g., represent an area over which the source windows can effectively distribute wireless power. As depicted, there may be some overlap (common space) to these areas, where a window or windows can receive power effectively from either or both source windows 910.

Considering area 930 of the window network 900, the network has additional windows 911 that are configured to receive power from source windows on the network. While not shown, windows that receive power wirelessly 911 may be electrically connected by wire to one or more additional windows such that each additional window receives power by being connected to a receiver (as described in relation to windows 204 and 205 in FIG. 2B).

Considering area 931 of the window network 900, the network also has windows 912 having both a receiver and a transmitter such that they can both receive and broadcast wireless power transmissions. By having the ability to receive and send power, these windows may be daisy chained together such that each window becomes a power node in the wireless power distribution network, thus increasing the distance from which power originating at source window may be delivered wirelessly. In this sense, each window configured with a receiver and a transmitter may be thought of as a power repeater, rebroadcasting a power signal to the next window and supplementing the received power with energy that has been stored in an energy storage device. When daisy chaining windows together the electrical wiring required for window operation may be great be reduced, for example, wiring may be reduced by 10× compared to a standard electrochromic window network. This reduction wiring may be advantageous in applications such as when an older structure that does not have an adequate electrical infrastructure in places is retrofitted with electrochromic windows. Another advantage to using this configuration is that the window network may also be used to distribute power to other electronic devices having a remote wireless receiver in a building, thus potentially eliminating the need to for a wired distribution network within a structure.

Figure 10:
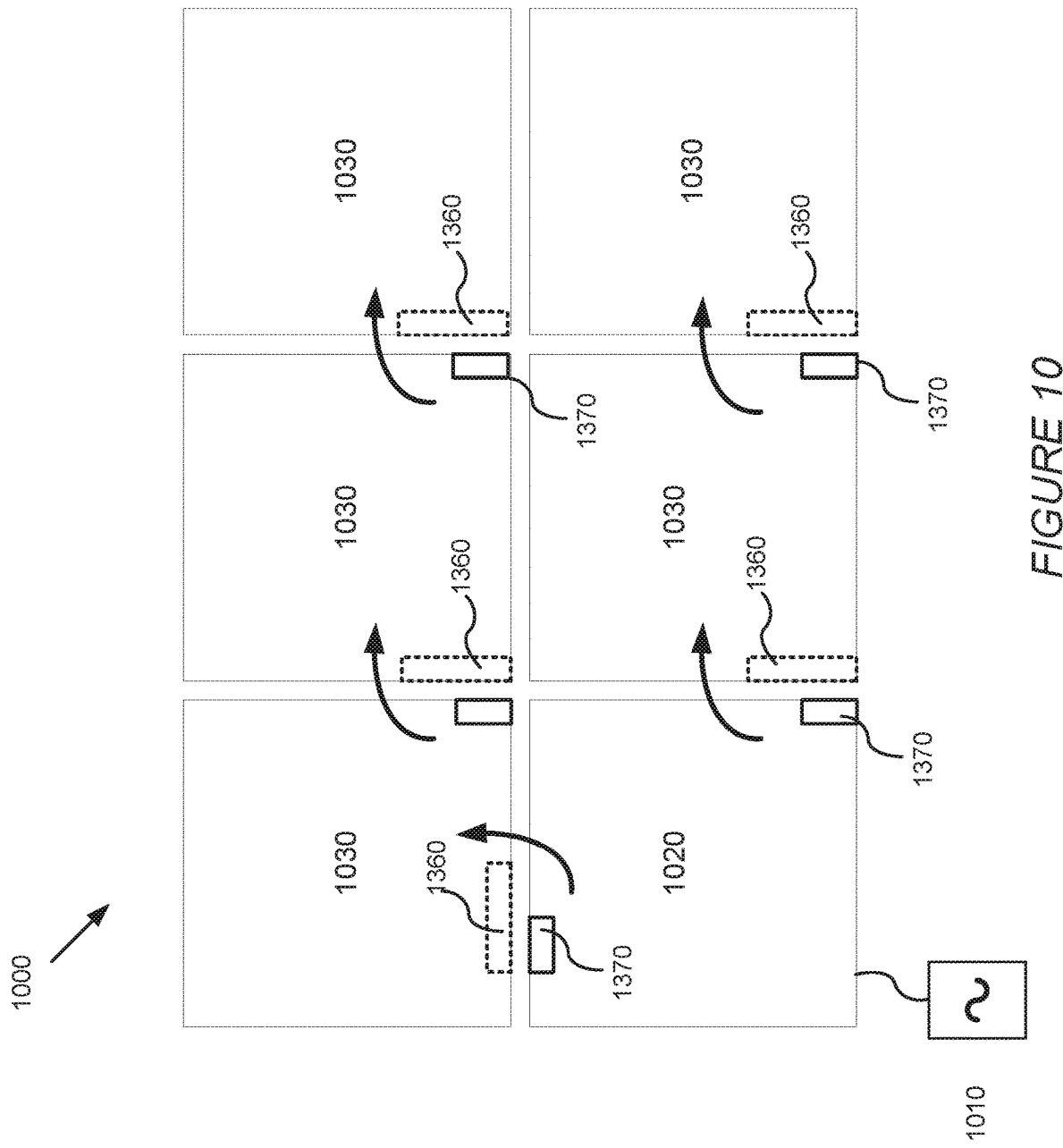
FIG. 10 depicts a schematic drawing of a plurality of electrochromic windows forming a curtain wall in which power is transmitted between windows using inductive coupling.

In another implementation of the third power transmission network configuration depicted in FIG. 10, a curtain wall of electrochromic windows 1000 is powered through single source window 1020. Window 1020 may receive power through a wired connection to a power source, 1010, or it may receive power wirelessly. Using magnetic induction as described elsewhere herein, transmitters 1370 and receivers 1360 are used to (virtually) daisy chain the rest of the windows 1030 on the curtain wall so that they receive power through source window 1020. A daisy chain in this sense is a wireless chain, and in this example, window 1020 is a divergent node, having two daisy chains emanating from it via two transmitters 1370. In some embodiments, transmitters 1370 and receivers 1360 are located in the secondary seal of each window, in some embodiments, they are located in the framing between each window. In some embodiments, wireless power transfer between windows on a curtain wall occurs by some other means such as electrostatic induction or radio waves.

Configuration IV

In a fourth power transmission network configuration, power is transferred wirelessly from a window frame to an IGU using inductive coupling as described elsewhere herein (e.g., the descriptions of FIGS. 3B-G). By transferring power wirelessly across the glazing pocket, the space required in the glazing pocket for wiring and electronic components used to power EC windows may be eliminated. This is advantageous in a market where the glazing pocket depth is being reduced in order to maximize the viewable area of each window. In addition to passing through the glazing pocket, time-varying magnetic fields may also pass through materials such as aluminum or foam in a window frame, glazing block, spacer (e.g., if the receiver is located within the spacer) or the window glass (e.g. if the receiver is located within an IGU and the transmitter is external to the IGU, e.g. transmitting wireless power toward the face of the glass).

Figure 11:
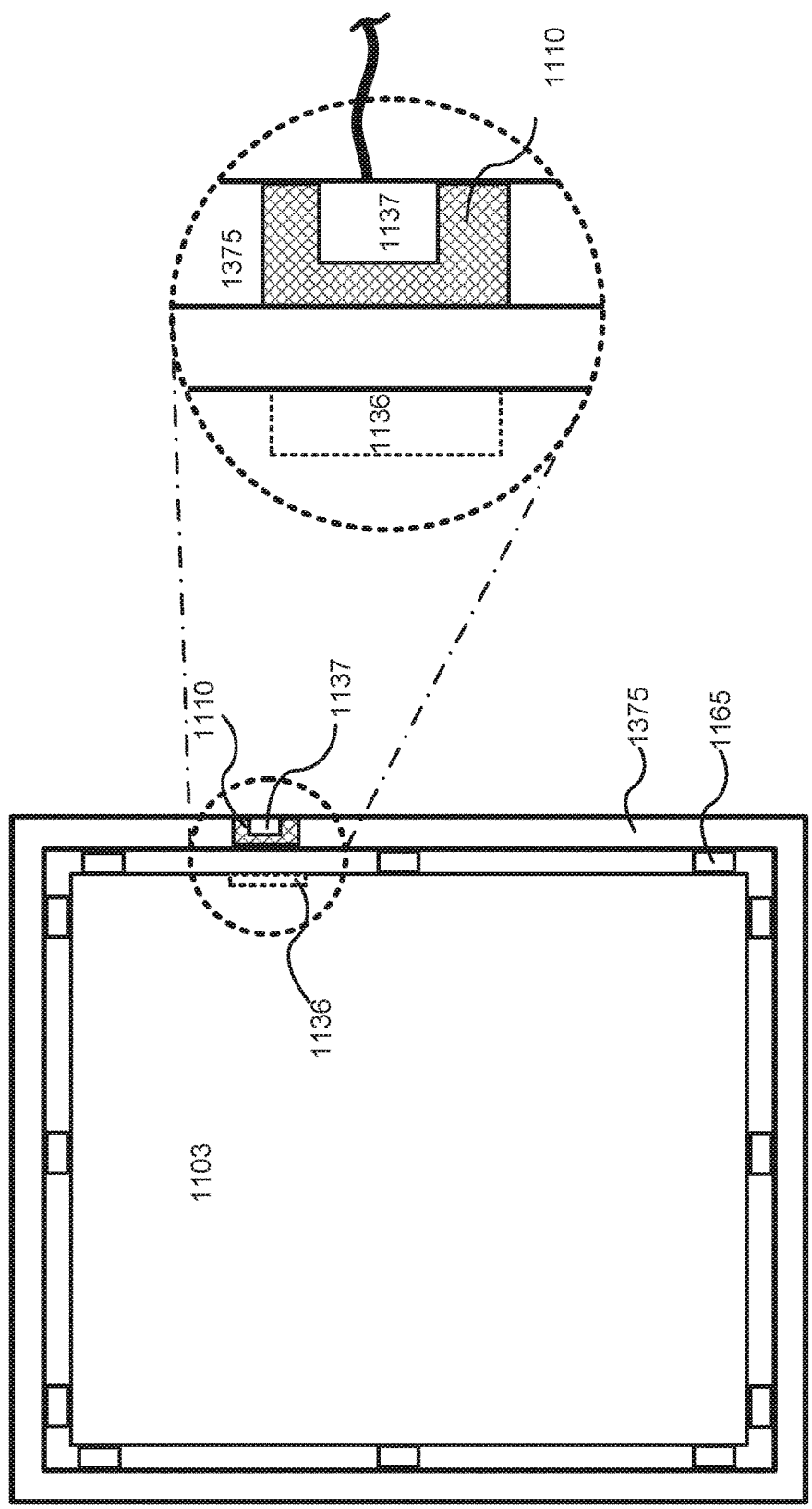
FIG. 11 depicts a schematic drawing of window frame in which a key has been inserted into the frame to allow for magnetic power transfer.

An embodiment of the fourth power transmission network configuration is illustrated in FIG. 11. The window depicted in FIG. 11 includes setting blocks 1165 between an IGU 1103 and a window frame 1375. The frame 1375 has an embedded transmitter 1137 that is made of stainless steel or another material that would substantially inhibit the passage of a time-varying magnetic field to a receiver 1136. In the illustrated example, a portion of the frame 1375 between the transmitter 1137 and the glazing pocket is removed and replaced with a key 1110 made of a material (e.g., a plastic) that allows passage of magnetic energy. In some cases, the key 1110 is inserted into the frame during manufacture of the window frame. In other cases, such as in retrofit applications in which a window frame is reused, a portion of the frame may be cut out to create a space for a transmitter and key prior to installation of the IGU. In the illustrated example, the transmitter 1137 has an exposed surface (from the perspective of an aperture formed by cutting a hole in the window frame) from which energy transmissions can be radiated. The exposed surface may have a protective coating such as a polymer or plastic material. This material may be substantially color matched to the frame (as the aforementioned key may also be).

In one embodiment of this configuration, a window controller may be attached to a window frame or positioned in close proximity to the window, thus separating the window controller from the IGU. In one embodiment the window controller first receives power wirelessly by any method disclosed elsewhere herein before powering the IGU via inductive coupling. By separating the window controller from the IGU, hardware may be more easily updated. For example, if an IGU needs replacing, it may not be necessary to replace or remove the window controller. On the other hand, if a window controller is updated, it may not be necessary to replace or remove the IGU. When a window controller is separated from the IGU, the IGU may contain active circuitry used to convert the received alternating current to direct current and control the voltage applied to the bus bars. In one embodiment, a plurality of transmitters may be operated out of phase from one another and passive circuitry may be in included in the secondary seal or spacer of an IGU to produces a direct current from the plurality of alternating currents that are out of phase.

Configuration V

Figure 12:
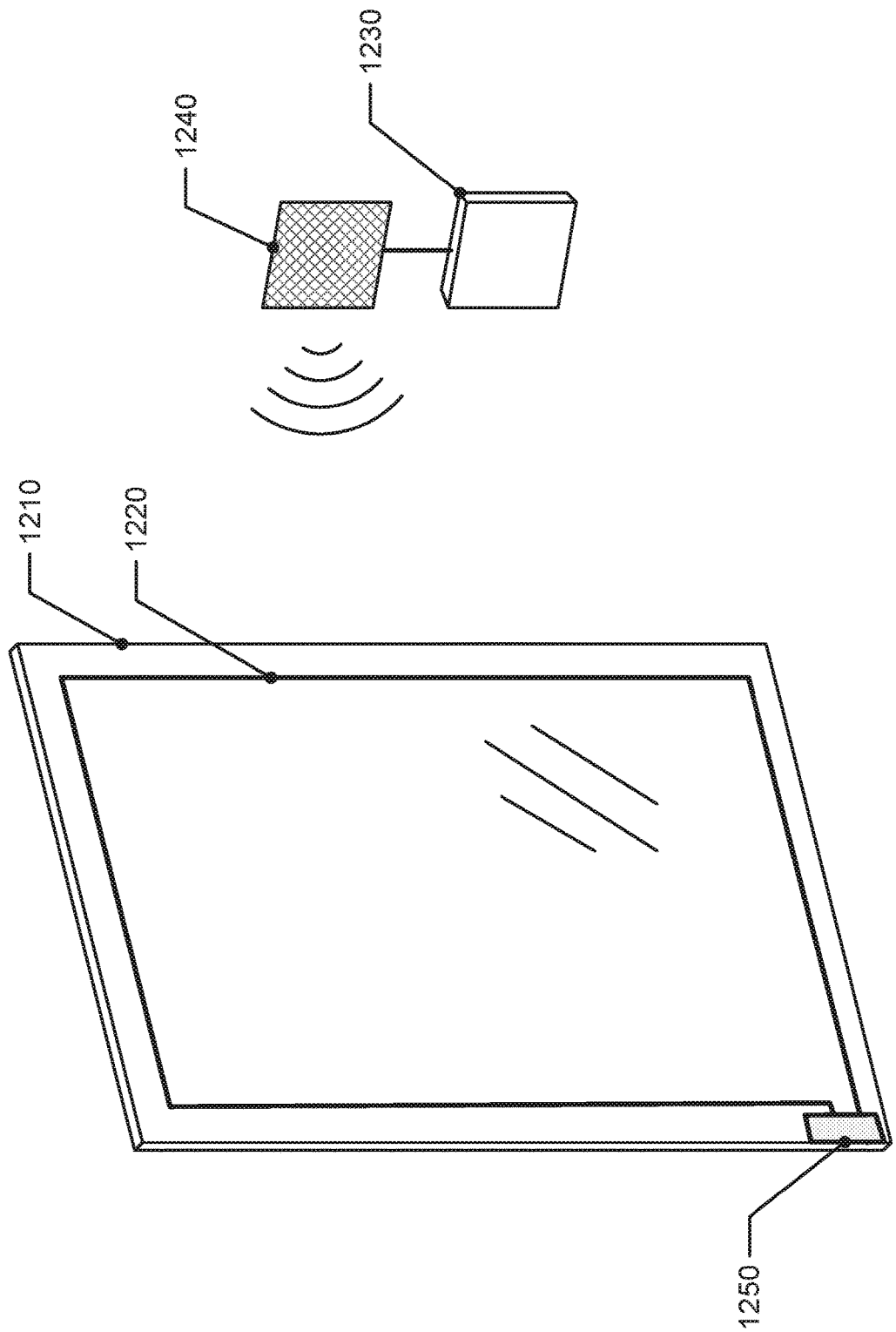
FIG. 12 depicts a wireless powering scheme for an electrochromic window.

In a fifth power transmission network configuration, a remote window controller is connected to and controls the wireless transmissions of a transmitter where the remote window controller is located at a distance from the window. An example of such a configuration is depicted in FIG. 12, where a window controller 1230 is connected to and controls the wireless power transmissions of a transmitter 1240 located at a remote distance from an electrochromic window 1210. In this illustrated example, the electrochromic window 1210 has passive electronics 1250 that are used to deliver the power directly to the EC device. The passive electronics 1250 are in electrical connection with a receiver that received wireless transmissions from the remove transmitter 1240. Typically in this configuration, the receiver will have an antenna on a surface of the lite (e.g., on the surface of the electrochromic device coating) for receiving electromagnetic transmissions. In some cases, such as the one depicted in FIG. 12, the antenna is a loop antenna 1220 that that goes along the perimeter of the viewable area. Antennas described herein that can be placed on the surface of a lite may be fabricated using methods such as those described in U.S. Patent Application No. 62/340,936, filed on May 24, 2016 and titled "WINDOW ANTENNAS," which is hereby incorporated by reference in its entirety.

In certain implementations of the fifth configuration, the window controller controls the duty cycles and pulse width modulation of transmissions having the same frequency that are sent from a plurality of antennas (e.g., an antenna array of the transmitter) such that a net voltage difference may be delivered to the bus bars. In some cases, the receiver may be equipped with a plurality of antennas that receive out-of-phase electromagnetic transmissions such that a net voltage is applied to the bus bars.

Configuration VI

A sixth power transmission network configuration includes both a standalone base station and a window acting as a base station i.e. a window base station (also referred to herein as an "IGU base station" or a "source window"). It may be desirable to have both a standalone base station and a window base station in an area being serviced depending on the needs of the devices being powered and the geometry of the space. For example, there may be a need for multiple base stations in a room with a transmission-blocking obstacle where the obstacle will block transmissions from a single base station at any location in the room. The other windows and/or other devices, such as mobile devices or other electronic devices, are configured with receivers to wirelessly receive power broadcast from the transmitters of both the standalone and window base stations. In one aspect, an IGU with a wireless power transmitter can act as an IGU base station and the IGU base station along with the standalone base station can powering other IGUs and/or additional devices. For instance, a curtain wall may have one or more wireless-powering base station IGUs which can deliver wireless power to the rest of the IGUs having receivers in the curtain wall. The devices being powered by the IGU base stations typically have a receiver with an energy storage device in which the wirelessly transmitted power may be stored until it is used. By supplying power to operate an IGU from an energy storage device such as a battery, power may be wirelessly transmitted at lower levels than is required for operation of the electrochromic window(s) or mobile device(s).

Figure 15A:
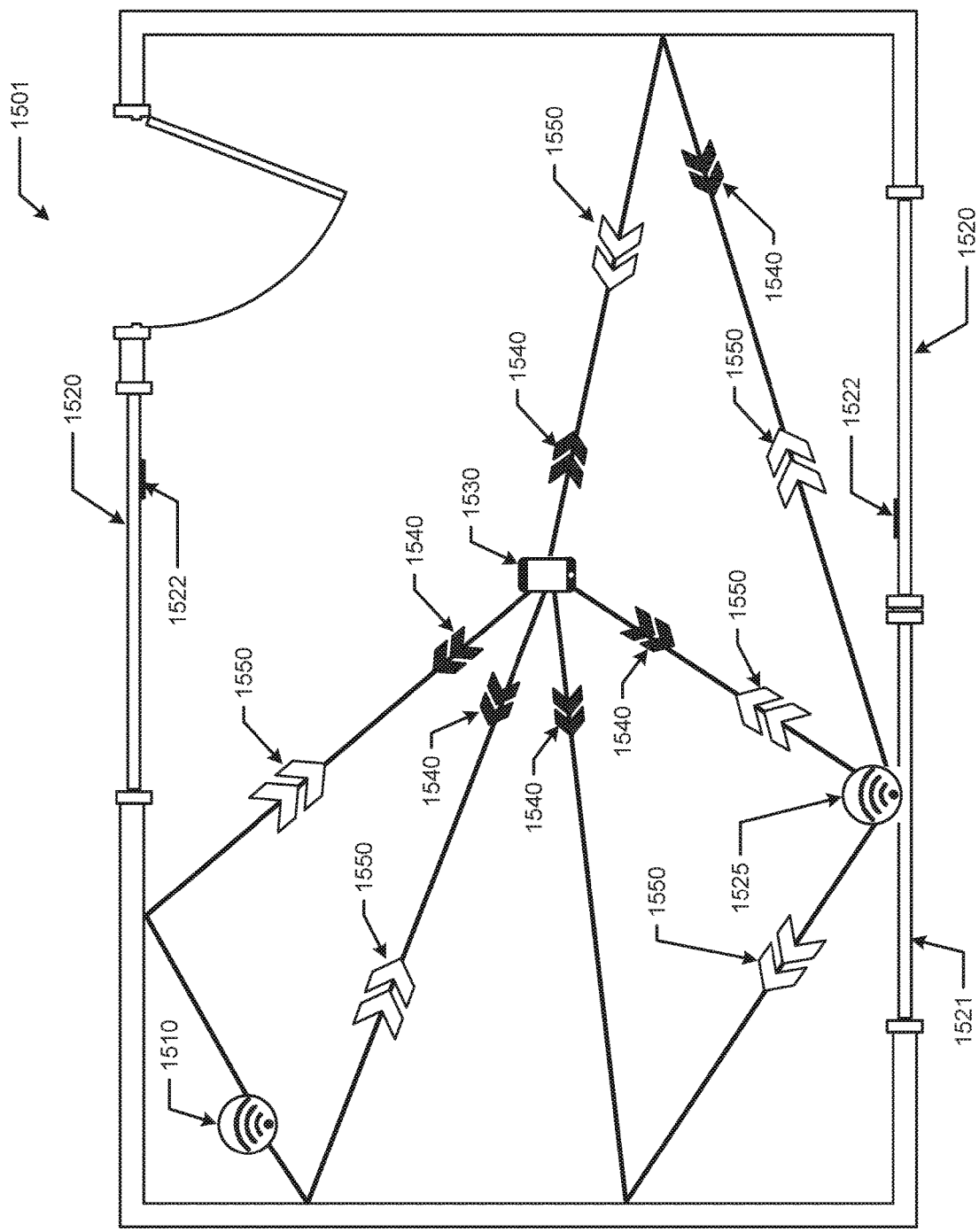
FIG. 15A depicts a schematic drawing of a top view of a room having a standalone base station and an IGU base station configured for wireless power transmission of other IGUs and mobile devices.
Figure 15B:
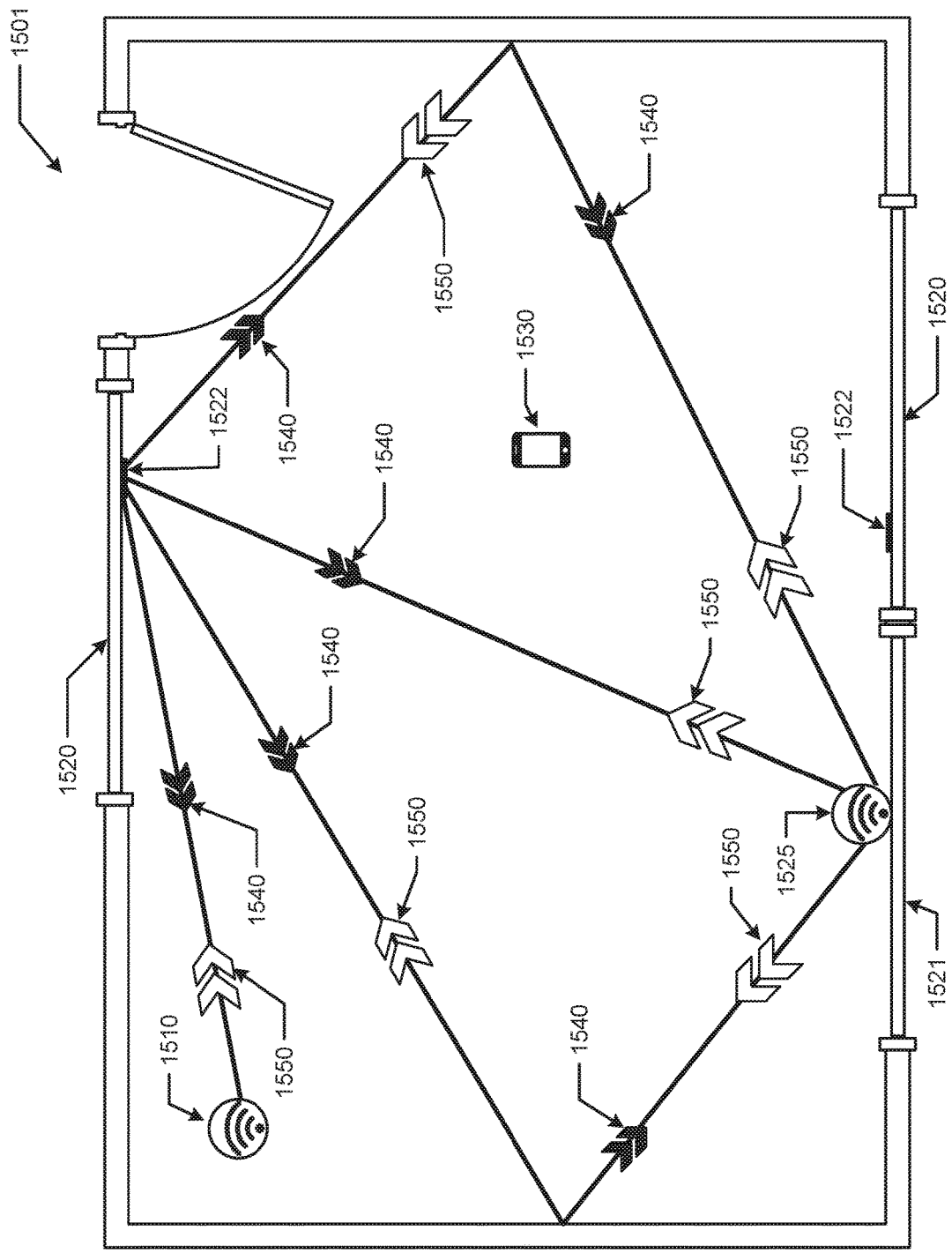
FIG. 15B depicts another schematic drawing of the top view the room configured for wireless power transmission of FIG. 15A.

An embodiment of components in this sixth power transmission network configuration is illustrated in FIGS. 15A and 15B. FIGS. 15A and 15B depict schematic drawings of a top view of a room 1501 configured for wireless power transmission with this sixth configuration. The room 1501 includes an RF transmitter 1510 acting as a standalone base station and an IGU 1521 with an RF transmitter 1525 disposed thereon acting as an IGU base station. The transmitters are connected to the electrical infrastructure of the building and/or have an internal power source. In this illustrated example, the RF transmitter 1510 of the standalone base station and the RF transmitter 1525 of the IGU base station are configured to wirelessly power the other IGUs 1521 having receivers 1522 and/or other devices having receivers such as the mobile device 1530. Although the mobile device 1530 is illustrated in the form of a cell phone, it would be understood that other mobile devices (e.g., laptop, tablet, etc.) can be implemented. In the depicted example, the transmitter 1510 of the standalone base station is located in the corner of the room 1501. In another implementation, to reduce losses in power transmission resulting from the absorption and reflection of electromagnetic waves (particularly in the case of RF waves), the transmitter 1510 of the standalone base station may be placed in a central location such as in the middle of the ceiling or the center of a wall that preferably has a line of sight to all receivers in the room 1501.

FIG. 15A depicts an instance when the transmitter 1510 acting as the standalone base station and the transmitter 1525 on/in the IGU acting as the IGU base station are receiving incident waves from an omnidirectional beacon signal broadcast from a receiver of the mobile device 1530. For example, a user may request the initiation of wireless charging via an application on the mobile device 1530 that causes the device to generate a substantially omnidirectional beacon signal. The arrows 1540 depict the direction of the substantially omnidirectional beacon signal along several pathways that successfully reach the transmitters 1510, 1525 as the beacon signal is propagated about the room 1501. By computing the phase of the incident waves received at each transmitter 1510, 1525 the corresponding paths of the power transmission to be used by each respective transmitter 1510, 1525 can be determined. The arrows 1550 depict directions of the return pathways to deliver power wirelessly to the mobile device 1530. The arrows 1540 and 1550 depict how the pathways of the received beacon signal may be used to deliver power wirelessly along the return pathways to the mobile device 1530.

FIG. 15B depicts an instance when the transmitters 1510, 1525 are receiving incident waves from a substantially omnidirectional beacon signal broadcast from the receiver 1522 of one of the IGUs 1520. The events depicted in FIGS. 15A and 15B may occur simultaneously or at different times. In FIG. 15B, arrows 1540 depict the direction of the omnidirectional beacon signal along several paths that successfully reach one of the two transmitters 1510, 1525. In some cases, these paths may reflect off of walls or other objects, and in other cases these paths may take a direct path between the receiver and transmitter. By computing the phase of each of the incident waves, the path of the power transmission can be determined. Arrows 1550 depict how power can be transmitted back along the same paths of the received beacon signal to deliver wireless power to the receiver 1522 of the IGU 1520 from which the beacon signal was sent.

Multiple Transmitters

In certain implementations, the power transmission network includes multiple transmitters. For example, the power transmission network configurations illustrated in FIGS. 14A and 14B include two IGUs 1421 with transmitters 1425 acting as IGU base stations. As another example, the power transmission network configuration illustrated in FIGS. 15A and 15B include an IGU 1521 with a transmitter 1525 acting as an IGU base station and a remote transmitter 1510 acting as a standalone base station.

With a single base station in a network, the ability to resolve the exact angle of the received signal may be limited by directional antennas of the transmitter at the single base station. A configuration with multiple base stations allows for additional sources of reflected signals (or direct signals), which could allow for a more accurate determination of: 1) the direction of the path of the signals, 2) the location of the device being powered wirelessly such as a mobile device or an IGU, at greater distances, and/or 3) the location of other objects in the space.

In one embodiment, multiple base stations can be implemented to determine a 3D mapping of the space. For example, if the entire skin of the building were covered or substantially covered in source windows, a 3D mapping could be generated based on the reflected signals (and/or direct signals). In some cases, the "reflected signal model" may be combined with other location awareness technology (e.g., a UWB chip in a mobile device) to create a more fault tolerant location system. For example, the signals from transmitters at multiple base stations at different locations can be used to triangulate the location of a device and in some instances account for the physical layout of a building, e.g., walls and furniture. Additionally, networks may make use of data measured by internal, magnetic, and other sensors on the devices therein to improve location accuracy. For example, using sensed magnetic information, the orientation of an asset within a building can be determined. The orientation of the asset can be used to refine the accuracy of the footprint of the space that an asset occupies. In one case, the determined 3D mapping can be used to optimize the pathways used for power transmissions from the base stations in a building. For example, pathways can be determined that avoid furniture or other objects in the space.

According to certain implementations, the electrochromic windows of a building have transmitters that can be used as the wireless power transmission source for the building. For electrochromic windows between the interior and exterior environment of the building such as, e.g., windows in a glass façade, the windows can be configured to transmit wireless power inside and/or outside the building. According to one aspect, the entire skin of the building may be covered in EC windows with transmitters acting as window base stations to provide a source of wireless power throughout the building.

According to various implementations, the transmitters may be configured to communicate via various forms of wireless electromagnetic transmission; e.g., time-varying electric, magnetic, or electromagnetic fields. Common wireless protocols used for electromagnetic communication include, but are not limited to, Bluetooth, BLE, Wi-Fi, RF, and ultra-wideband (UWB). The direction of the reflected path and the location of the device may be determined from information relating to received transmissions at the transmitters such as the received strength or power, time of arrival or phase, frequency, and angle of arrival of wirelessly transmitted signals. When determining a device's location from these metrics, a triangulation algorithm may be implemented that in some instances accounts for the physical layout of a building, e.g., walls and furniture.

Examples of Windows Configured to Provide and/or Receive Wireless Power

One aspect of the present disclosure relates to insulated glass units (IGUs) or other window structures that receive, provide, and/or regulate wireless power within a building. In certain implementations, the window structures include at least one antenna for receiving and/or transmitting wireless power. The window structures, such as those in the form of an IGU, include multiple lites. In various implementations, an optically switchable device, such as an electrochromic device, is disposed on at least one of the lites.

In certain cases, the antenna is in the form of a window antenna located on one or more surfaces of the window structure such as an IGU. In some cases, the window antenna(s) is in the viewable area (i.e. area through which a viewer can substantially see through the window in the clear state) of the window structure. In other cases, the window antenna(s) is placed outside the viewable area, e.g., on a window frame.

In various implementations, an IGU or other window structure with multiple lites includes both an electrochromic device coating(s) and a window antenna(s). In some cases, an electrochromic device coating and a window antenna layer are co-located on the same surface of a lite. In other cases, the electrochromic device coating is on a different surface than the antenna layer. For example, the electrochromic device may be on a surface to the exterior side of an interior antenna or may be placed on a surface to the interior side of an exterior antenna.

During a typical IGU fabrication sequence, a first lite is received into the fabrication line for various fabrication operations and then a second "mate" lite is introduced into the line for further operations. In various implementations described herein, an IGU comprises a first lite with an electrochromic device coating disposed on one of its surfaces (e.g., S1 or S2) and a second "mate" lite (also referred to as antenna lite) having a window antenna layer disposed on at least one of its surfaces (e.g., S3 and/or S4). In one implementation, an IGU comprises a first lite with an electrochromic device coating disposed on an inner surface S2 and a mate lite has a window antenna layer disposed on either the inner third surface S3 or the fourth surface S4. In one example, the antenna array is etched from the ITO on the S3 surface. Fabricating the EC device coating and antenna layer on different lites can provide flexibility during IGU fabrication. For example, a mate lite with or without the antenna layer can be introduced into the IGU fabrication sequence, as needed, without changing the general fabrication sequence.

Figure 16:
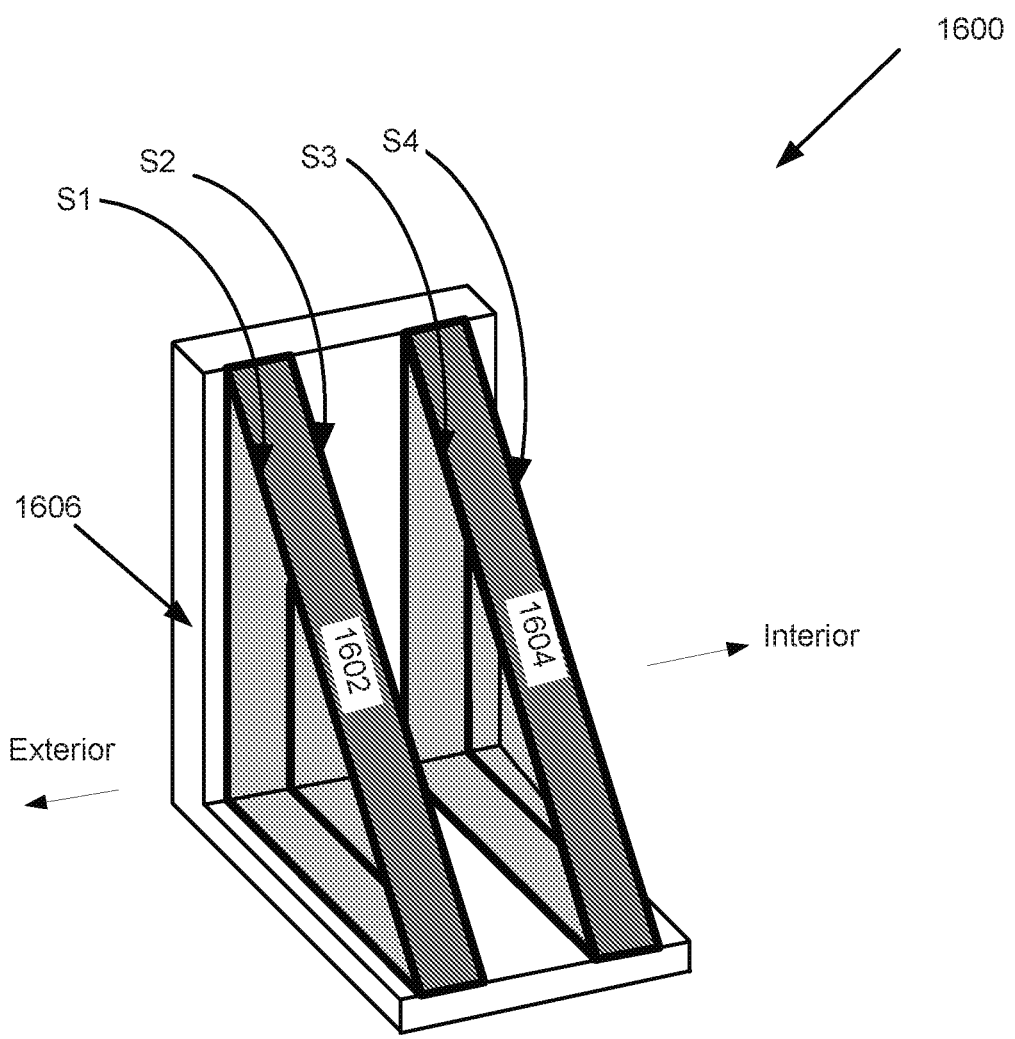
FIG. 16 depicts an isometric view of a corner of an IGU configured to receive, provide, and/or regulate wireless power, according to various implementations.

FIG. 16 depicts an isometric view of a corner of an IGU 1600 configured to receive, provide, and/or regulate wireless power, according to various implementations. Generally, the structure of the IGU 1600 can represent any of the window structures described above unless stated otherwise. The IGU 1600 comprises a first lite 1602 with a first surface S1 and a second surface S2. The IGU 1600 further comprises a second mate lite 1604 with a third surface S3 and a fourth surface S4. The first lite 1602 and the second mate lite 1604 are shown attached to a framing structure 1606. Although not shown, the IGU 1600 also includes a spacer between the first lite 1602 and the second mate lite 1604, sealant between the spacer and the first and second lites, and/or various other IGU structures. The IGU 1600 is shown as typically installed with the first surface S1 facing the exterior environment and the fourth surface S4 facing the interior environment. During a typical fabrication process of the IGU 1600, the first lite 1602 would be received into the fabrication line for various fabrication operations and then the second mate lite 1604 introduced for further operations to complete the IGU 1600. In one implementation of the IGU 1600 shown in FIG. 16, an electrochromic device coating is located on the second surface S2 of the first lite 1602 and an antenna layer is located on one or both of the third surface S3 and the fourth surface S4 of the second mate lite 1604.

Certain embodiments employ an antenna as part of or with a window controller and together with a window network. Among the components that may be used with such embodiments are: antenna(s) associated with the IGU; a window controller associated with an IGU and connected to the antenna(s); a window network connected to the window controller; and logic for selectively providing wireless power. Some embodiments allow certain mobile devices and windows to receive wireless power via antennas in the building. Such embodiments may be designed or configured to couple the device to the antenna for various wireless power services. Such embodiments also permit the building administration (or other entity controlling the window network) to allow or limit wireless power transmissions based on the device, location, etc. Some embodiments may permit controlled deployment of wireless power services within the building, particularly in a room or other regions near windows having an antenna. Such services can be selectively turned on or off by a building administrator or other entity given authority to control access to the service. With such control, the entity can give particular tenants or devices access to the wireless power service.

Controlling wireless power may be implemented such that some or all regions of building do not have wireless power transmissions, by default, but permit transmissions when a known device is detected to have entered the building or a particular location in the building. Such detection may be based on GPS, UWB, or other suitable technology. Similarly, wireless power transmissions may be turned on when a building tenant or the owner of the mobile device has paid to activate the service.

In some embodiments, a building may be outfitted with a combination of windows configured to receive and/or transmit wireless power transmissions and windows without this capability. For example, the $20^{th}$ floor of a building may have windows without wireless power capability while the $1^{st}$ floor with a café has windows having wireless power capability. In another example, each floor may be outfitted with a combination of windows with and without wireless powering capability, for example, every other window may have wireless power capability, or every third window may have wireless power capability. In some embodiments, a building may have windows for providing wireless powering and the services of the window may be controlled by a building administrator. For example, a building administrator may offer wireless power services to a building tenant based for an additional fee. Since a building may have a combination of windows with and without antenna layers, the implementation with the antenna layer(s) on the mate lite (S3 and/or S4) and the EC device coating on the first lite (e.g., S1 or S2) is particularly advantageous since it allows for flexibility in introducing the mate lites with or without wireless power capability into the general EC IGU fabrication sequence.

Features of antennas are described in International PCT Publication No. WO2017/062915 (International Patent Application No. PCT/US2016/056188), filed on Oct. 7, 2016 and titled "ANTENNA CONFIGURATIONS FOR WIRELESS POWER AND COMMUNICATION, AND SUPPLEMENTAL VISUAL SIGNALS," and International Patent Application No. PCT/US2017/031106, filed on May 4, 2017 and titled "WINDOW ANTENNAS;" each of which is hereby incorporated by reference in its entirety. Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

In one or more aspects, one or more of the functions described may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for electrochromic windows can be more generally implemented as or for switchable optical devices (including windows, mirrors, etc.)

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electrochromic window configured to transmit power wirelessly, the electrochromic window comprising:
    an electrochromic lite having an electrochromic device disposed on a transparent substrate; and
    an onboard transmitter in electrical communication with a power source via wiring to receive power, the onboard transmitter configured to convert electrical energy to wireless power transmissions that are transmitted to one or more wireless receivers,
    wherein each wireless receiver of the one or more wireless receivers is configured to convert the wireless power transmissions into electrical energy to power a remote mobile electronic device, and
    wherein the onboard transmitter is configured to direct the wireless power transmissions to each wireless receiver along multiple pathways determined from a substantially omnidirectional beacon signal broadcast from the wireless receiver.

2. The electrochromic window of claim 1, wherein the onboard transmitter comprises an array of antennas on a surface of the electrochromic lite, the array of antennas configured to transmit wireless power transmissions via radio frequency.

3. The electrochromic window of claim 2, wherein the array of antennas transmit radio frequency transmissions have a range of one of 100 feet from the onboard transmitter, 75 feet from the onboard transmitter, 50 feet from the onboard transmitter, 20 feet from the onboard transmitter, and 15 feet from the onboard transmitter.

4. The electrochromic window of claim 2, wherein at least one antenna of the array of antennas is a directional antenna configurable to direct radio frequency transmissions to a receiver of the remote mobile electronic device.

5. The electrochromic window of claim 1, wherein the onboard transmitter is one of a magnetic induction transmitter, an electrostatic induction transmitter, a laser transmitter, a radio wave transmitter, and a microwave transmitter.

6. The electrochromic window of claim 1, wherein the onboard transmitter is in an insulated glass unit of the electrochromic window, wherein the onboard transmitter is located in a spacer separating the electrochromic lite and another lite of the insulated glass unit, located at least partially in a secondary seal of the insulated glass unit or located at least partially in a primary seal of the insulated glass unit.

7. The electrochromic window of claim 1, wherein the onboard transmitter is on a surface of the electrochromic lite or another lite of the electrochromic window.

8. The electrochromic window of claim 1, wherein the onboard transmitter is in on a surface of the electrochromic lite with the electrochromic device.

9. The electrochromic window of claim 1, wherein the onboard transmitter comprises:
an electroconductive coil configured to generate a time varying magnetic field, wherein the time varying magnetic field is controlled by passing an alternating current through the electroconductive coil; and
circuitry for controlling the altering current passing through the electroconductive coil.

10. The electrochromic window of claim 1, wherein the onboard transmitter is configured to determine a location of a receiver of the remote mobile electronic device.

11. The electrochromic window of claim 10, wherein the onboard transmitter is configured to control wireless power transmissions based on the location determined.

12. The electrochromic window of claim 1, wherein the onboard transmitter is configured to receive the substantially omnidirectional beacon signal from a receiver of the remote mobile electronic device and configurable to direct the wireless power transmissions to the remote mobile electronic device based on pathways of the substantially omnidirectional beacon signal.

13. The electrochromic window of claim 1, wherein the multiple pathways are return pathways of the substantially omnidirectional beacon signal.

14. An insulated glass unit (IGU) base station comprising
a first lite;
a second lite;
a spacer disposed between the first lite and the second lite;
a primary seal between the spacer and the first lite and between the spacer and the second lite; and
a transmitter in electrical communication with at least one power source,
wherein the transmitter is configured to convert electrical energy from the at least one power source into wireless power transmissions configured to be transmitted to a wireless receiver of a device,
wherein the wireless power transmissions are configured to be converted by the wireless receiver into electrical energy to power the device,
wherein the transmitter is further configured to receive a substantially omnidirectional beacon signal broadcast from the wireless receiver,
wherein the transmitter is configured to direct the wireless power transmissions along multiple pathways determined from the substantially omnidirectional beacon signal.

15. The IGU base station of claim 14, wherein the transmitter is disposed on a surface of one of the first lite and the second lite.

16. The IGU base station of claim 15, wherein the device is one of an electrochromic device of an electrochromic window in a room having the IGU base station, or a mobile device.

17. The IGU base station of claim 14, wherein the transmitter is located in one of a secondary seal, the primary seal, the spacer, a window frame, or a glazing pocket.

18. The IGU base station of claim 14, further comprising at least one electrochromic device disposed on at least one of the first lite and the second lite.

19. The IGU base station of claim 18, further comprising an onboard window controller for controlling optical transitions of the at least one electrochromic device.

20. The IGU base station of claim 19, wherein the transmitter is in, or on, the onboard window controller.

21. The IGU base station of claim 14, wherein the transmitter has an effective range of one of about 100 feet, about 75 feet, about 25 feet, about 20 feet, or about 15 feet.

22. The IGU base station of claim 14, wherein the transmitter is configured to transmit wireless power transmissions including one or more of radio frequency transmissions, magnetic induction transmissions, resonance induction transmissions, and microwave transmissions, and laser power transmissions.

23. The IGU base station of claim 14, wherein the at least one power source includes a battery.

24. The IGU base station of claim 14, wherein the transmitter is configured to control phase and gain of the wireless power transmissions based on pathways of the substantially omnidirectional beacon signal.

25. The IGU base station claim 24, wherein the transmitter is in communication with a controller, wherein the controller is configured to determine pathways of the substantially omnidirectional beacon signal received by the transmitter and determine the phase and the gain of the wireless power transmissions based on the pathways determined.

26. The IGU base station of claim 14, wherein the transmitter is in electrical communication with an electrical infrastructure of a building to receive electrical energy from the at least one power source.

27. The IGU base station of claim 14, wherein the multiple pathways are return pathways of the substantially omnidirectional beacon signal.

* * * * *